(12) United States Patent
Pogén

(10) Patent No.: US 8,679,214 B2
(45) Date of Patent: Mar. 25, 2014

(54) GAS CLEANING SEPARATOR

(75) Inventor: Mats-Orjan Pogén, Billeberga (SE)

(73) Assignee: Alfa Laval Corporate AB, Lund (SE)

( * ) Notice: Subject to any disclaimer, the term of this patent is extended or adjusted under 35 U.S.C. 154(b) by 0 days.

(21) Appl. No.: 13/347,168

(22) Filed: Jan. 10, 2012

(65) Prior Publication Data

US 2012/0174547 A1 Jul. 12, 2012

Related U.S. Application Data

(62) Division of application No. 13/383,279, filed as application No. PCT/SE2009/050892 on Jul. 10, 2009.

(51) Int. Cl.
*B01D 45/12* (2006.01)

(52) U.S. Cl.
USPC ............ 55/461; 55/400; 55/401; 55/402; 55/403; 55/404; 55/405; 55/406; 55/407; 55/408; 55/409; 55/418; 55/419; 95/270; 95/11; 95/12; 95/13; 95/22; 95/23; 96/18; 96/417; 96/422

(58) Field of Classification Search
USPC .......... 55/400–409, 418, 419; 95/270, 11–13, 95/22–23; 96/18, 417, 422
See application file for complete search history.

(56) References Cited

U.S. PATENT DOCUMENTS

| 1,649,346 A | 11/1927 | Grimble et al. |
| 1,731,313 A | 10/1929 | Miller |
| 3,097,167 A | 7/1963 | Beyerle |
| 3,482,771 A | 12/1969 | Thylefors |
| 3,559,373 A | 2/1971 | Garrett |
| 4,284,504 A | 8/1981 | Alexander et al. |
| 4,316,728 A * | 2/1982 | Caesar ............................ 96/228 |
| 4,460,393 A | 7/1984 | Saget |
| 4,478,718 A | 10/1984 | Saget |
| 4,976,842 A | 12/1990 | Fowler |
| 5,323,876 A | 6/1994 | McAllister et al. |

(Continued)

FOREIGN PATENT DOCUMENTS

| DE | 19841452 A1 | 3/2000 |
| DE | 10300976 A1 | 7/2003 |

(Continued)

OTHER PUBLICATIONS

Extended European Search Report issued in corresponding European Application No. 12182240.7 mailed on Mar. 5, 2013.

(Continued)

*Primary Examiner* — Dung H Bui
(74) *Attorney, Agent, or Firm* — MGK, LLC

(57) ABSTRACT

The present invention relates to a separator and more specifically, but not exclusively, to a centrifugal separator for the cleaning of a gaseous fluid. A centrifugal separator is provided as comprising a housing defining an inner space, and a rotor assembly for imparting a rotary motion onto a mixture of substances to be separated. The rotor assembly is located in said inner space and is rotatable about an axis relative to the housing. The rotor assembly comprises an inlet for receiving said mixture of substances, an outlet from which said substances are ejected from the rotor assembly during use, and a flow path for providing fluid communication between the inlet and outlet, wherein the outlet is positioned more radially outward from said axis than the inlet.

19 Claims, 29 Drawing Sheets

(56) References Cited

U.S. PATENT DOCUMENTS

| | | | |
|---|---|---|---|
| 5,599,365 A * | 2/1997 | Alday et al. | 55/426 |
| 5,674,200 A * | 10/1997 | Ruschke et al. | 604/126 |
| 5,921,909 A | 7/1999 | Gustafsson | |
| 5,936,822 A | 8/1999 | Bazarian | |
| 5,941,811 A | 8/1999 | Ridderstrale et al. | |
| 6,162,163 A | 12/2000 | Karlsson | |
| 6,533,712 B1 | 3/2003 | Miller et al. | |
| 7,152,589 B2 | 12/2006 | Ekeroth et al. | |
| 7,241,392 B2 | 7/2007 | Maier | |
| 7,338,546 B2 | 3/2008 | Eliasson et al. | |
| 8,172,917 B2 | 5/2012 | Kup et al. | |
| 2001/0016549 A1 | 8/2001 | Herman et al. | |
| 2003/0233939 A1 | 12/2003 | Szepessy et al. | |
| 2004/0091799 A1 | 5/2004 | Lawton et al. | |
| 2005/0160723 A1 | 7/2005 | Seipler | |
| 2007/0249479 A1 | 10/2007 | Eliasson et al. | |
| 2008/0256912 A1 | 10/2008 | Kup et al. | |
| 2008/0264251 A1 | 10/2008 | Szepessy | |
| 2008/0315692 A1 | 12/2008 | Beetz | |
| 2010/0180854 A1 | 7/2010 | Baumann et al. | |

FOREIGN PATENT DOCUMENTS

| | | | |
|---|---|---|---|
| DE | 202004004215 U1 | 9/2005 | |
| DE | 202007009913 U1 | 12/2008 | |
| EP | 0429729 A1 | 6/1991 | |
| EP | 0803783 A1 | 10/1997 | |
| EP | 1008391 A2 | 9/2001 | |
| GB | 419187 A | 11/1934 | |
| GB | 2226382 A | 6/1990 | |
| RU | 2154535 C2 | 8/2000 | |
| RU | 2200634 C2 | 3/2003 | |
| RU | 2314166 C2 | 1/2008 | |
| RU | 2317429 C2 | 2/2008 | |
| SE | 526803 C2 | 11/2005 | |
| SU | 967581 A | 10/1982 | |
| SU | 1542579 A1 | 2/1990 | |
| WO | 96/25234 | 8/1996 | |
| WO | 96/33021 | 10/1996 | |
| WO | 9841329 | 9/1998 | |
| WO | 98/45046 | 10/1998 | |
| WO | 2002/20118 A1 | 3/2002 | |
| WO | 2002/34406 A1 | 5/2002 | |
| WO | 2004091799 A1 | 10/2004 | |
| WO | 2005/119020 A1 | 12/2005 | |
| WO | WO 2006119890 A1 * | 11/2006 | B04B 5/00 |
| WO | 2006/132577 A1 | 12/2006 | |
| WO | 2007030034 A1 | 3/2007 | |
| WO | 2007/133161 A1 | 11/2007 | |
| WO | 2009010248 A2 | 1/2009 | |

OTHER PUBLICATIONS

Extended European Search Report issued in corresponding European Application No. 12182236.5 mailed on Oct. 9, 2012.
Extended European Search Report issued in corresponding European Application No. 12182230.8 mailed on Nov. 7, 2012.
Extended European Search Report issued in corresponding European Application No. 12182226.6 mailed on Mar. 4, 2013.
Extended European Search Report issued in corresponding European Application No. 12182217.5 mailed on Nov. 7, 2012.
Extended European Search Report issued in corresponding European Application No. 12182205.0 mailed on Oct. 8, 2012.
Russian Official Action issued in corresponding Russian Application No. 2012106222 mailed on Feb. 19, 2013.
First Office Action issued in corresponding Chinese Application No. 200980160506.6 mailed on Mar. 25, 2013.
Extended European Search Report issued in corresponding European Application No. 12182217.5 mailed on Jul. 11, 2012.
Russian Office Action issued in corresponding Russian Patent Application No. 2012106320/20(009574) mailed on May 30, 2013.
Russian Office Action issued in corresponding Russian Patent Application No. 2012106324/05(009578) mailed on May 30, 2013.
International Search Report for PCT/SE09/050892, 2009.

* cited by examiner

| Modules | Versions |
|---|---|
| Separator | Different sizes<br>Different heat specs |
| Drive unit | Customer specific.<br>Hydraulic or Electric |
| Nipples ( IN and OUT) | Customer specific |
| Filter unit | With or without |
| Valve unit | With or without |
| Heat shield | Customer specific |
| Speed sensor | With or without |
| BlowBy gas from (hydraulic) drive unit w integrated pre-trap. | With or without |

US 8,679,214 B2

GAS CLEANING SEPARATOR

CROSS REFERENCE TO RELATED APPLICATION

This application is a division of U.S. patent application Ser. No. 13/383,279 filed Jan. 10, 2012, which claims priority to PCT Application No. PCT/SE2009/050892, filed Jul. 10, 2009, the subject matter of which applications is incorporated by reference herein in their entirety.

FIELD OF THE INVENTION

The present invention relates to a separator and more specifically, but not exclusively, to a centrifugal separator for the cleaning of a gaseous fluid.

BACKGROUND

It is well known that a mixture of fluids having different densities may be separated from one another through use of a centrifugal separator. One specific use of such a separator is in the separation of oil from gas vented from a crank case forming part of an internal combustion engine.

With regard to this specific use of separators, there can be a tendency for the high pressure gasses found in the combustion chambers of an internal combustion engine to leak past the associated piston rings and into the crank casing of the engine. This continuous leaking of gas into the crank case can lead to an undesirable increase of pressure within the crank case and, as a consequence, to a need to vent gas from said casing. In large commercial vehicles, vented gas is generally reintroduced into the inlet manifold of the engine. However, the gas vented from the crank casing typically carries a quantity of engine oil (as droplets or a fine mist), which is picked up from the reservoir of oil held in the crank casing. More specifically, gas flowing between an engine cylinder and the associated piston tends to pick up lubricating oil located on the cylinder wall. Also, condensing of oil vapour by an engine's cylinder block cooling system generates an oil mist in the crank case.

In order to allow vented gas to be introduced into the inlet system without also introducing unwanted oil (particularly into a turbocharging system wherein the efficiency of the compressor can be adversely affected by the presence of oil), it is necessary to clean the vented gas (i.e. to remove the oil carried by the gas) prior to the gas being introduced into the inlet system. This cleaning process may be undertaken by a centrifugal separator, which is mounted on or adjacent the crank case and which directs cleaned gas to the inlet system and directs separated oil back to the crank case.

There are a number of problems associated with some prior art ALFDEX™ separators. These problems can be considered in three broad categories.

First, the fluid pathways through the separator give rise to pressure losses which adversely affect the flow capacity of the separator and, consequently, the size of engine with which the separator can be used.

Second, the arrangement of some of these prior art separators is such that, under certain conditions, cleaned gas can become contaminated before leaving the separator.

Third, certain manufacturing techniques and construction features associated with these prior art separators can lead to assembly difficulties and/or reliability problems.

SUMMARY

The present invention resides in a first aspect in a gas cleaning separator for separating a flowable mixture of substances of different densities, such as a gas and liquid; the separator comprising:
 a housing defining an inner space, and
 at least one blade element located in said space and rotatable about an axis so as to impart motion on a mixture of substances to be separated;
 a leading edge portion of the at least one blade element comprising a guide surface such that, in use, a mixture of substances flowing towards said leading edge portion is guided by the guide surface towards alignment with the blade element.

The separator recited above with respect to the first aspect of the present invention may include one or more of the following features and/or limitations.

A separator as recited above in respect of the first aspect of the present invention, comprising a plurality of said blade elements substantially equi-spaced about the axis.

A separator as recited above in respect of the first aspect of the present invention, comprising twelve of said blade elements located about said axis.

A separator as recited above in respect of the first aspect of the present invention, wherein said guide surface comprises a curved portion.

A separator as recited above in respect of the first aspect of the present invention, wherein said guide surface can be provided by a guide vane extending from said leading edge portion.

A separator as recited above in respect of the first aspect of the present invention, wherein the guide vane of a blade element is arranged at an angle to said blade element such that, for a given rotary speed of said blade element about said axis and for a given flow velocity of said mixture, the guide vane is substantially aligned with the flow of mixture.

A separator as recited above in respect of the first aspect of the present invention, wherein the separator further comprises at least one separating disc rotatable about said axis and located in said space so as to receive said substances from a blade element.

A separator as recited above in respect of the first aspect of the present invention, wherein the separator comprises a plurality of separating discs arranged in a stack, rotatable about the same axis, and located in said space so as to receive said substances from the blade element.

A separator as recited above in respect of the first aspect of the present invention, wherein said axis of the at least one separating disc is coincident with said axis of the blade element.

A second aspect of the present invention provides a gas cleaning separator for separating a flowable mixture of substances of different densities, such as a gas and liquid; the separator comprising:
 a housing defining an inner space,
 a rotor assembly for imparting a rotary motion onto said mixture of substances, the rotor assembly being located in said inner space and rotatable about an axis relative to the housing, wherein the rotor assembly comprises an inlet for receiving said mixture of substances, an outlet from which said substances are ejected from the rotor assembly during use, and a flow path for providing fluid communication between the inlet and outlet, wherein the outlet is positioned more radially outward from said axis than the inlet; and a housing member defining a region for receiving fluid ejected from the rotor assembly and directing said fluid towards a first outlet aperture of the housing;

an inlet to said region comprises at least one lengthwise portion of greater depth than other lengthwise portions of said inlet.

Further features of the present invention recited in the second aspect are provided in a separator as recited below:

A separator as recited above in respect of the second aspect of the invention, wherein said housing member is located adjacent an end member of the rotor assembly, said region being defined between the end member and the housing member.

A separator as recited above in respect of the second aspect of the invention, wherein said inlet to said region is defined by the end member and a perimeter edge of the housing member.

A separator as recited above in respect of the second aspect of the invention, wherein said perimeter edge is circular such that the lengthwise portions of said region inlet extend circumferentially along said edge.

A separator as recited above in respect of the second aspect of the invention, wherein each lengthwise portion of greater depth is provided by a recess in said perimeter edge which provides greater distance between said edge and the end member along each lengthwise portion than between said edge and the end member along said other lengthwise portions.

A separator as recited above in respect of the second aspect of the invention, wherein the circular perimeter edge of the housing member is concentric with said axis.

A separator as recited above in respect of the second aspect of the invention, wherein each lengthwise portion of greater depth has a part-circular shape extending through an arc of between 45° and 110°, and preferably of 80°.

A separator as recited above in respect of the second aspect of the invention, wherein said other lengthwise portions have a depth between one tenth and one half that of said at least one lengthwise portion and preferably have a depth one third that of said at least one lengthwise portion.

A separator as recited above in respect of the second aspect of the invention, wherein said at least one lengthwise portion is located on an opposite side of the housing member to said first outlet aperture of the housing.

A separator as recited above in respect of the second aspect of the invention, wherein said at least one lengthwise portion opens into a channel defined by the housing member for directing fluid towards said first outlet aperture of the housing.

A separator as recited above in respect of the second aspect of the invention, wherein said at least one lengthwise portion is an inlet to said channel, said channel comprising elements at said channel inlet which, in use, are aligned with the direction of fluid flowing into said channel inlet.

A separator as recited above in respect of the second aspect of the invention, wherein said elements are curved at said channel inlet and straighten progressively in a downstream direction towards said first outlet aperture of the housing.

A separator as recited above in respect of the second aspect of the invention, wherein said elements comprise opposite side walls defining said channel.

A separator as recited above in respect of the second aspect of the invention, wherein the housing member is located adjacent an end member of the rotor assembly, said region and channel being defined between the end member and the housing member.

A separator as recited above in respect of the second aspect of the invention, wherein the distance between the housing member and said end member of the rotor assembly is greater in one portion of said region than in other portions thereof, said one portion thereby defining said channel in the housing member.

A separator as recited above in respect of the second aspect of the invention, wherein said channel comprises a tubular portion.

A third aspect of the present invention provides a gas cleaning separator for separating a flowable mixture of substances of different densities, such as a gas and liquid; the separator comprising:

a housing defining an inner space, a rotor assembly for imparting a rotary motion onto said mixture of substances, the rotor assembly being located in said inner space and rotatable about an axis relative to the housing, wherein the rotor assembly comprises an inlet for receiving said mixture of substances, an outlet from which said substances are ejected from the rotor assembly during use, and a flow path for providing fluid communication between the inlet and outlet, wherein the outlet is positioned more radially outward from said axis than the inlet; and a housing member defining a region for receiving fluid ejected from the rotor assembly and directing said fluid towards a first outlet aperture of the housing, said region comprises a channel extending from one portion of a perimeter edge of the housing member, said portion defining an inlet to said channel.

The separator recited above with respect to the second aspect of the present invention may include one or more of the following features and/or limitations.

A separator as recited above in respect of the third aspect of the invention, wherein said channel comprises elements at said channel inlet which, in use, are aligned with the direction of fluid flowing into said channel inlet.

A separator as recited above in respect of the third aspect of the invention, wherein said elements are curved at said channel inlet and straighten progressively in a downstream direction towards said first outlet aperture of the housing.

A separator as recited above in respect of the third aspect of the invention, wherein said elements comprise opposite side walls defining said channel.

A separator as recited above in respect of the third aspect of the invention, wherein said channel inlet is located on an opposite side of the housing member to said first outlet aperture of the housing.

A separator as recited above in respect of the third aspect of the invention, wherein said perimeter portion defining the channel inlet has a part-circular shape extending through an arc of between 45° and 110°, and preferably of 80°.

A separator as recited above in respect of the third aspect of the invention, wherein the housing member is located adjacent an end member of the rotor assembly, said region and channel being defined between the end member and the housing member.

A separator as recited above in respect of the third aspect of the invention, wherein the distance between the housing member and said end member of the rotor assembly is greater in one portion of said region than in other portions thereof, said one portion thereby defining said channel in the housing member.

A separator as recited above in respect of the third aspect of the invention, wherein said channel comprises a tubular portion.

A fourth aspect of the present invention provides a gas cleaning separator for separating a flowable mixture of substances of different densities, such as a gas and liquid; the separator comprising:

a housing defining an inner space, a rotor assembly for imparting a rotary motion onto said mixture of substances, the rotor assembly being located in said inner space and rotatable about an axis relative to the housing, wherein the rotor assembly comprises an inlet for receiving said mixture of substances, an outlet from which said substances are ejected from the rotor assembly during use, and a flow path for providing fluid communication between the inlet and outlet, wherein the outlet is positioned more radially outward from said axis than the inlet; and a housing member defining a region for receiving fluid ejected from the rotor assembly and directing said fluid towards a first outlet aperture of the housing, said region comprises a channel having elements at an inlet to said channel which, in use, are aligned with the direction of fluid flowing into said channel inlet.

The separator recited above with respect to the fourth aspect of the present invention may include one or more of the following features and/or limitations.

A separator as recited above in respect of the fourth aspect of the invention, wherein said channel extends from one portion of a perimeter edge of the housing member, said portion defining the inlet to said channel.

A separator as recited above in respect of the fourth aspect of the invention, wherein said elements are curved at said channel inlet and straighten progressively in a downstream direction towards said first outlet aperture of the housing.

A separator as recited above in respect of the fourth aspect of the invention, wherein said elements comprise opposite side walls defining said channel.

A separator as recited above in respect of the fourth aspect of the invention, wherein said channel inlet is located on an opposite side of the housing member to said first outlet aperture of the housing.

A separator as recited above in respect of the fourth aspect of the invention, wherein said perimeter portion defining the channel inlet has a part-circular shape extending through an arc of between 45° and 110°, and preferably of 80°.

A separator as recited above in respect of the fourth aspect of the invention, wherein the housing member is located adjacent an end member of the rotor assembly, said region and channel being defined between the end member and the housing member.

A separator as recited above in respect of the fourth aspect of the invention, wherein the distance between the housing member and said end member of the rotor assembly is greater in one portion of said region than in other portions thereof, said one portion thereby defining said channel in the housing member.

A separator as recited above in respect of the fourth aspect of the invention, wherein said channel comprises a tubular portion.

A fifth aspect of the present invention provides a gas cleaning separator for separating a flowable mixture of substances of difference densities, such as a gas and liquid; the separator comprising:

a housing defining an inner space, a rotor assembly for imparting a rotary motion onto said mixture of substances, the rotor assembly being located in said inner space and rotatable about an axis relative to the housing, wherein the rotor assembly comprises an inlet for receiving said mixture of substances, an outlet from which said substances are ejected from the rotor assembly during use, and a flow path for providing fluid communication between the inlet and outlet, wherein the outlet is positioned more radially outward from said axis than the inlet; and a housing member defining a region for receiving fluid ejected from the rotor assembly and directing said fluid to a first outlet aperture of the housing;

the housing member is provided with means for segregating an inlet to said region from fluid which, in use, re-circulates back towards said inlet after having flowed past said inlet.

The separator recited above with respect to the fifth aspect of the present invention may include one or more of the following features and/or limitations.

A separator as recited above in respect of the fifth aspect of the invention, wherein said segregating means comprises a wall.

A separator as recited above in respect of the fifth aspect of the invention, wherein said wall extends from a downstream side of said region inlet in a downstream direction with respect to said flow of fluid having, in use, past said region inlet.

A separator as recited above in respect of the fifth aspect of the invention, wherein said wall is spaced from said housing.

A separator as recited above in respect of the fifth aspect of the invention, wherein said wall comprises a free end.

A separator as recited above in respect of the fifth aspect of the invention, wherein said free end is spaced from said housing in an axial direction by an axial distance of between 2 mm and 200 mm, and preferably by a distance of 14 mm.

A separator as recited above in respect of the fifth aspect of the invention, wherein said free end is spaced from said housing in a direction perpendicular to said axial direction by a distance less than said axial distance.

A separator as recited above in respect of the fifth aspect of the invention, wherein said wall defines a closed loop.

A separator as recited above in respect of the fifth aspect of the invention, wherein said wall defines a frusto-conical shape.

A separator as recited above in respect of the fifth aspect of the invention, wherein said frusto-conical shape has a longitudinal axis coincident with said axis of rotation.

A separator as recited above in respect of the fifth aspect of the invention, wherein said frusto-conical shape diverges in a downstream direction with respect to said flow of fluid having, in use, past said region inlet.

A separator as recited above in respect of the fifth aspect of the invention, wherein the housing member comprises means for supporting the housing member relative to the housing, the supporting means being located downstream of the segregating means with respect to said flow of fluid having, in use, past said region inlet.

A separator as recited above in respect of the fifth aspect of the invention, wherein the supporting means is a wall defining a closed loop.

A separator as recited above in respect of the fifth aspect of the invention, wherein said wall has a cylindrical shape.

A separator as recited above in respect of the fifth aspect of the invention, wherein said wall has a longitudinal axis coincident with said axis of rotation.

A separator as recited above in respect of the fifth aspect of the invention, wherein at least one aperture is provided in said wall at a junction between said wall and the housing.

A separator as recited above in respect of the fifth aspect of the invention, further comprising a second outlet aperture of the housing, wherein said supporting means is located in a fluid flow path between the second outlet aperture and said segregating means.

A separator as recited above in respect of the fifth aspect of the invention, wherein the second outlet aperture is arranged concentrically with said axis of rotation.

A separator as recited above in respect of the fifth aspect of the invention, wherein said segregating means is positioned in the housing such that, in use, fluid flowing past said region inlet flows on one side of said segregating means and said fluid which re-circulates flows on another side of said segregating means.

A separator as recited above in respect of the fifth aspect of the invention, wherein an outlet passage extends between the housing member and the housing for conveying fluid from said region to the exterior of the housing through said outlet aperture, the exterior of said outlet passage being spaced from the housing such that fluid is free to flow about the entire external perimeter of said outlet passage.

A separator as recited above in respect of the fifth aspect of the invention, wherein said outlet passage is separate to the housing member and the housing.

A sixth aspect of the present invention provides a gas cleaning separator for separating a flowable mixture of substances of different densities, such as a gas and liquid; the separator comprising:

a housing defining an inner space, an aperture for permitting the flow of a fluid along a flow path between the exterior of said housing and said inner space, and a shoulder upstanding from the housing and surrounding said aperture;

the shoulder comprises a curved surface extending inwardly into the aperture.

The separator recited above with respect to the sixth aspect of the present invention may include one or more of the following features and/or limitations.

A separator as recited above in respect of the sixth aspect of the invention, wherein said curved surface forms a closed loop about the aperture and extends inwardly into the aperture so as to reduce the area of the aperture when moving through said aperture from the exterior of said housing towards said inner space.

A separator as recited above in respect of the sixth aspect of the invention, wherein said curved surface describes a part-circular line when viewed in a cross-section taken through a plane coincident with a longitudinal axis through said aperture.

A separator as recited above in respect of the sixth aspect of the invention, wherein the shoulder comprises a generally cylindrical wall, a free end of which is provided with a circumferential lip which forms the curved surface.

A separator as recited above in respect of the sixth aspect of the invention, further comprising a nipple connectable to the shoulder such that an internal surface of the nipple combines with the curved surface of the shoulder to provide a curved surface to the flow path.

A separator as recited above in respect of the sixth aspect of the invention, wherein the internal nipple surface meets with the curved surface at an edge of the shoulder and, at this meeting point, is oriented tangentially to the curved surface.

A separator as recited above in respect of the sixth aspect of the invention, wherein the nipple further comprises a curved wall configured to abut the curved surface of the shoulder.

A separator as recited above in respect of the sixth aspect of the invention, wherein the nipple is connectable to the shoulder in any rotational orientation.

A separator as recited above in respect of the sixth aspect of the invention, wherein the nipple is connectable to the shoulder by spin welding.

A seventh aspect of the present invention provides a method of assembling a gas cleaning separator, the method comprising the step of connecting a nipple to a shoulder by spin welding; the separator being as recited above in respect of the sixth aspect of the present invention.

An eighth aspect of the present invention provides a gas cleaning separator for separating a flowable mixture of substances of different densities, such as a gas and liquid; the separator comprising:

a housing defining an inner space, a rotor assembly for imparting a rotary motion onto said mixture of substances, the rotor assembly being located in said inner space and rotatable about an axis relative to the housing, wherein the rotor assembly comprises an inlet for receiving said mixture of substances, an outlet from which said substances are ejected from the rotor assembly during use, and a flow path for providing fluid communication between the inlet and outlet, wherein the outlet is positioned more radially outward from said axis than the inlet; a housing member defining a region for receiving fluid ejected from the rotor assembly and directing said fluid to a first outlet aperture of the housing;

an outlet passage extends between the housing member and the housing for conveying fluid from said region to the exterior of the housing through said outlet aperture, wherein the exterior of said outlet passage is spaced from the housing such that fluid is free to flow about the entire external perimeter of said outlet passage.

The separator recited above with respect to the eighth aspect of the present invention may include one or more of the following features and/or limitations.

A separator as recited above in respect of the eighth aspect of the invention, wherein the housing member is provided with means for segregating an inlet to said region from fluid which, in use, re-circulates back towards said inlet after having flowed past said inlet, wherein said outlet passage extends from said segregating means.

A separator as recited above in respect of the eighth aspect of the invention, wherein said segregating means comprises a wall, said wall preferably comprising a free end and being spaced from said housing.

A separator as recited above in respect of the eighth aspect of the invention, wherein said outlet passage is separate to the housing member and the housing.

A ninth aspect of the present invention provides a gas cleaning separator for separating a flowable mixture of substances of different densities, such as a gas and liquid; the separator comprising:

a housing defining an inner space, a rotor assembly for imparting a rotary motion onto said mixture of substances, the rotor assembly being located in said inner space and rotatable about an axis relative to the housing, wherein the rotor assembly comprises a first inlet for receiving said mixture of substances, a first outlet from which said substances are ejected from the rotor assembly during use, and a first flow path for providing fluid communication between the first inlet and first outlet, wherein the first outlet is positioned more radially outward from said axis than the first inlet; and a housing member located adjacent the rotor assembly, the housing member and the rotor assembly being spaced from one another so as to provide a first region therebetween on a first side of the housing member, said first region defining a first fluid flow route for fluid ejected from the rotor assembly; the housing member also being spaced from the housing so as to provide a second region therebetween on a second side of the housing member, said second region defining a second fluid flow route for fluid ejected from the rotor assembly;

the rotor assembly further comprises a second inlet which opens into said second region on said second side of the housing member, a second outlet positioned more radially outward from said axis than the second inlet, and a second flow path for providing fluid communication between the second inlet and the second outlet.

The separator recited above with respect to the eighth aspect of the present invention may include one or more of the following features and/or limitations.

A separator as recited above in respect of the ninth aspect of the invention, wherein said second outlet opens into a fluid passage providing fluid communication between said first outlet and said first and second regions.

A separator as recited above in respect of the ninth aspect of the invention, wherein said second outlet opens at location which, with respect to a flow of said substances ejected from said first outlet during use, is downstream of said first outlet and upstream of said first and second regions.

A separator as recited above in respect of the ninth aspect of the invention, wherein the second flow path comprises a space between first and second members of the rotor assembly which each comprise a disk shaped portion, the two members being centred on said axis.

A separator as recited above in respect of the ninth aspect of the invention, wherein the disk shaped portions of said members each have a radially outer edge of a substantially circular shape, the two members being positioned concentrically with one another.

A separator as recited above in respect of the ninth aspect of the invention, wherein at least one elongate element is located in said space between the first and second members so as to move fluid located in said space outwards relative to said axis when, in use, the rotor assembly is rotated about said axis.

A separator as recited above in respect of the ninth aspect of the invention, wherein each elongate element extends radially along the second flow path.

A separator as recited above in respect of the ninth aspect of the invention, wherein each elongate element is comprised of one of the first and second members and abuts the other of the first and second members.

A separator as recited above in respect of the ninth aspect of the invention, wherein said disk shaped portion of each member is frusto-conical.

A separator as recited above in respect of the ninth aspect of the invention, wherein said second flow path comprises a frusto-conical shape.

A separator as recited above in respect of the ninth aspect of the invention, wherein said first flow path comprises a frusto-conical shape.

A separator as recited above in respect of the ninth aspect of the invention, wherein the second inlet of said second flow path comprises an annular shape centred on said axis.

A separator as recited above in respect of the ninth aspect of the invention, wherein the second flow path extends through an aperture in the housing member between said first and second sides of the housing member.

A separator as recited above in respect of the ninth aspect of the invention, wherein the second inlet of said second flow path is defined by a generally cylindrical wall.

A separator as recited above in respect of the ninth aspect of the invention, wherein a space is provided between a part of the housing member defining said aperture therein and a first portion of the rotary assembly defining at least part of said second flow path, and wherein a further portion of the rotary assembly extends from said first portion so as to cover said space.

A separator as recited above in respect of the ninth aspect of the invention, wherein said further portion is located on said second side of the housing member.

A separator as recited above in respect of the ninth aspect of the invention, wherein said further portion extends from the second inlet.

A separator as recited above in respect of the ninth aspect of the invention, wherein said further portion has an annular shape.

A separator as recited above in respect of the ninth aspect of the invention, wherein said further portion has an outer circular perimeter edge of a diameter greater than the diameter of said aperture in the housing member.

A separator as recited above in respect of the ninth aspect of the invention, wherein said further portion is planar and oriented in a plane to which said axis is perpendicular.

A separator as recited above in respect of the ninth aspect of the invention, wherein a surface defining the second flow path and extending from the second inlet has a radially outermost part relative to said axis which converges with said axis when moving along said second flow path from the second inlet towards the second outlet.

A separator as recited above in respect of the ninth aspect of the invention, wherein said radially outermost part of said second flow path surface has a frusto-conical shape.

A separator as recited above in respect of the ninth aspect of the invention, wherein said frusto-conical shape of said radially outermost part has a central longitudinal axis coincident with said axis of rotation.

A tenth aspect of the present invention provides a gas cleaning separator for separating a flowable mixture of substances of different densities, such as a gas and liquid; the separator comprising:

a housing defining an inner space, a rotor assembly for imparting a rotary motion onto said mixture of substances, the rotor assembly being located in said inner space and rotatable about an axis relative to the housing, wherein the rotor assembly comprises an inlet for receiving said mixture of substances, an outlet from which said substances are ejected from the rotor assembly during use, and a flow path for providing fluid communication between the inlet and outlet, wherein the outlet is positioned more radially outward from said axis than the inlet; and the rotor assembly further comprising a rotary shaft coincident with said axis and mounted to said housing, wherein a first end portion of the rotary shaft extends through said housing to a position exteriorly of said housing and a fluid passageway extends axially through the rotary shaft and has an opening positioned exteriorly of said housing;

the rotor assembly further comprises flow control means for controlling fluid entry to said shaft fluid passageway from the exterior of said housing, wherein the flow control means comprises means for imparting, onto fluid entering said passageway, a rotary motion along a path radially outward from the shaft fluid passageway.

The separator recited above with respect to the tenth aspect of the present invention may include one or more of the following features and/or limitations.

A separator as recited above in respect of the tenth aspect of the invention, wherein said rotary motion is centred on said axis of rotation of the rotor assembly.

A separator as recited above in respect of the tenth aspect of the invention, wherein said passageway is coincident with said axis of rotation of the rotor assembly.

A separator as recited above in respect of the tenth aspect of the invention, wherein said means for imparting a rotary motion onto fluid comprises at least one fluid pathway positioned radially outward from said axis of rotation of the rotor assembly.

A separator as recited above in respect of the tenth aspect of the invention, wherein said means for imparting a rotary motion onto fluid comprises a member spaced from said opening of the shaft fluid passageway, wherein the at least one fluid pathway is an aperture extending through said member.

A separator as recited above in respect of the tenth aspect of the invention, wherein four of said fluid pathways are positioned equi-distant along the circumference of a circle centred on said axis.

A separator as recited above in respect of the tenth aspect of the invention, wherein said member is planar and oriented with said axis perpendicular thereto.

A separator as recited above in respect of the tenth aspect of the invention, wherein the flow control means further comprises at least one drain aperture positioned more radially outward from said axis than each fluid pathway.

A separator as recited above in respect of the tenth aspect of the invention, wherein the flow control means and at least part of a turbine for driving rotation of the rotor assembly is a unitary component.

A separator as recited above in respect of the tenth aspect of the invention, wherein a second end portion of the rotary shaft distal to the first end portion is mounted to the housing.

A separator as recited above in respect of the tenth aspect of the invention, wherein the fluid passageway extends between the first and second end portions of the rotary shaft so as to provide fluid communication therethrough between the exterior and interior of the housing.

A separator as recited above in respect of the tenth aspect of the invention, wherein the fluid passageway is in fluid communication with a bearing by which said second end portion of the rotary shaft is mounted to the housing.

A separator as recited above in respect of the tenth aspect of the invention, wherein the fluid passageway is in fluid communication with said inlet of the rotor assembly.

An eleventh aspect of the present invention provides a method of assembling a gas cleaning separator for separating a flowable mixture of substances of different densities, such as a gas and liquid; the separator comprising:

a housing defining an inner space and having an aperture therein for providing fluid communication between said inner space and the exterior of said housing, and a fluid flow passage sealed about said aperture and in fluid communication therewith for conveying fluid through said passage and aperture between said inner space and the exterior of said housing;

the method of assembling said separator comprises the step of:

bonding the material of the housing and fluid flow passage together along a closed loop formed by an intersection of abutting surfaces of the housing and fluid flow passage.

The separator recited above with respect to the eleventh aspect of the present invention may include one or more of the following features and/or limitations.

A method as recited above in respect of the eleventh aspect of the invention, wherein said closed loop is of a circular shape.

A method as recited above in respect of the eleventh aspect of the invention, wherein said bonding step comprises rotating the housing and fluid flow passage relative to one another whilst said surfaces thereof are in abutment with each other.

A method as recited above in respect of the eleventh aspect of the invention, wherein said relative rotation of the housing and fluid flow passage is stopped with the housing and flow passage arranged in a required position relative to one another so as to allow said abutting surfaces to bond to one another.

A method as recited above in respect of the eleventh aspect of the invention, wherein said bonding step comprises spin welding said abutting surfaces to one another.

A method as recited above in respect of the eleventh aspect of the invention, wherein said bonding step comprises applying adhesive to at least one of said abutting surfaces.

A method as recited above in respect of the eleventh aspect of the invention, wherein said bonding step comprises ultrasonic welding or vibration welding said abutting surfaces to one another.

A method as recited above in respect of the eleventh aspect of the invention, wherein the fluid flow passage is a nipple comprising an open end, distal to said abutting surface, for subsequent connection with a further fluid flow passage, such as a hose.

A twelfth aspect of the present invention provides a gas cleaning separator for separating a flowable mixture of substances of different densities, such as a gas and liquid; the separator comprising:

a housing defining an inner space and having an aperture therein for providing fluid communication between said inner space and the exterior of said housing, and a fluid flow passage sealed about said aperture and in fluid communication therewith for conveying fluid through said passage and aperture between said inner space and the exterior of said housing; and wherein the material of the housing and fluid flow passage are bonded together along a closed loop formed by an intersection of abutting surfaces of the housing and fluid flow passage.

The separator as recited with respect to the twelfth aspect of the present invention may include one or more of the following features.

A separator as recited above in respect of the twelfth aspect of the invention, wherein said closed loop is of a circular shape.

A separator as recited above in respect of the twelfth aspect of the invention, wherein said bond is made by rotating the housing and fluid flow passage relative to one another whilst said surfaces thereof are in abutment with each other.

A separator as recited above in respect of the twelfth aspect of the invention, wherein said relative rotation of the housing and fluid flow passage is stopped with the housing and flow passage arranged in a required position relative to one another so as to allow said abutting surfaces to bond to one another.

A separator as recited above in respect of the twelfth aspect of the invention, wherein said bond is made by spin welding said abutting surfaces to one another.

A separator as recited above in respect of the twelfth aspect of the invention, wherein said bond is made by applying adhesive to at least one of said abutting surfaces.

A separator as recited above in respect of the twelfth aspect of the invention, wherein said bond is made by ultrasonic welding or vibration welding said abutting surfaces to one another.

A separator as recited above in respect of the twelfth aspect of the invention, wherein the fluid flow passage is a nipple comprising an open end, distal to said abutting surface, for subsequent connection with a further fluid flow passage, such as a hose.

A thirteenth aspect of the present invention provides a method of assembling a gas cleaning separator for separating a flowable mixture of substances of different densities, such as a gas and liquid; wherein the separator comprises:

a housing comprising first and second separate parts, the first housing part having a registration surface against which a datum surface of the second housing part registers so as to define an inner space of the housing; and a rotor assembly located in said inner space and rotatable about an axis of the first housing part relative to the housing, the rotor assembly comprising a rotary shaft rotatably mounted to the first housing part by means of a bearing unit and rotatably mounted to the second housing part;

the method of assembling said separator comprises the steps of:

rotatably mounting the rotary shaft to the second housing part in a predetermined position relative to said datum surface wherein said predetermined position is coincident with said axis when the datum surface of the second housing part is in register with said registration surface of the first housing part;

locating the bearing unit on a jig wherein the jig comprises a datum surface for registering with the registration surface of the first housing part, and means for receiving said bearing unit in a position relative to the datum surface of the jig such that the bearing unit is received by the jig in a position relative to the datum surface of the jig which is coincident with said axis when the datum surface of the jig is in register with said registration surface of the first housing part;

locating the datum surface of the jig in register with said registration surface of the first housing part; and secure the bearing unit to the first housing part.

The separator recited above with respect to the thirteenth aspect of the present invention may include one or more of the following features and/or limitations.

A method as recited above in respect of the thirteenth aspect of the invention, wherein the step of securing the bearing unit comprises moving the receiving means of the jig in an axial direction along said axis relative to the first housing part whilst the datum surface of the jig is in register with said registration surface of the first housing part, the bearing unit being thereby brought into abutment with the first housing part.

A method as recited above in respect of the thirteenth aspect of the invention, wherein the receiving means is moved in said axial direction relative to the datum surface of the jig so as to press the bearing unit against the first housing part.

A method as recited above in respect of the thirteenth aspect of the invention, wherein the jig comprises means for permitting movement of the receiving means in an axial direction along said axis relative to the datum surface of the jig.

A method as recited above in respect of the thirteenth aspect of the invention, wherein the step of securing the bearing unit comprises rotating the receiving means of the jig about said axis relative to the first housing part whilst the datum surface of the jig is in register with said registration surface of the first housing part.

A method as recited above in respect of the thirteenth aspect of the invention, wherein the step of securing the bearing unit comprises spin welding the bearing unit to the first housing part.

A method as recited above in respect of the thirteenth aspect of the invention, wherein the jig comprises means for permitting rotation of the receiving means relative to the datum surface of the jig.

A fourteenth aspect of the present invention provides a gas cleaning separator for separating a flowable mixture of substances of different densities, such as a gas and liquid; wherein the separator has been assembled as recited above in respect of the thirteenth aspect of the present invention.

A fifteenth aspect of the present invention provides a method of assembling a system comprising a gas cleaning separator for separating a flowable mixture of substances of different densities, such as a gas and liquid; wherein the method comprises the steps of selecting a particular version of a first type of component from a plurality of different versions of said first type of component; and connecting said particular version of said first type of component with a second type of component; and wherein said plurality of different versions of said first type of component comprise common features for connecting with said second type of component.

The separator recited above with respect to the fifteenth aspect of the present invention may include one or more of the following features and/or limitations.

A method as recited above in respect of the fifteenth aspect of the invention, further comprising the step of selecting a particular version of said second type of component from a plurality of different versions of said second type of component.

A method as recited above in respect of the fifteenth aspect of the invention, further comprising the step of locating a third type of component between the first and second types of component.

A method as recited above in respect of the fifteenth aspect of the invention, further comprising the step of selecting said third type of component from a plurality of different versions of said third type of component, wherein said plurality of different versions of said third type of component comprise common features for connecting with said first and second types of component.

A method as recited above in respect of the fifteenth aspect of the invention, wherein said first type of component comprises a rotor housing; said second type of component comprise a valve unit housing; and said third type of component comprises a heat shield.

A method as recited above in respect of the fifteenth aspect of the invention, wherein said components are of said separator.

A method as recited above in respect of the fifteenth aspect of the invention, wherein said plurality of different versions of said first type of component comprises further common features for connecting with a fourth type of component.

A method as recited above in respect of the fifteenth aspect of the invention, wherein said fourth type of component is a nipple.

A sixteenth aspect of the present invention provides a kit of parts for assembling into a gas cleaning separator for separating a flowable mixture of substances of different densities, such as a gas and liquid; wherein said kit of parts comprises a plurality of different versions of a first type of component of said separator for connecting with a second type of component of said separator; and at least one version of said second type of component; said plurality of different versions of said first type of component comprising common features for connecting with said second type of component. Ideally, said plurality of different versions of said first type of component comprises further common features for connecting with a third type of component.

A seventeenth aspect of the present invention provides a gas cleaning separator for separating a flowable mixture of substances of different densities, such as a gas and liquid; wherein the separator comprises:

a housing defining an inner space;

a rotor assembly for imparting a rotary motion onto said mixture of substances, the rotor assembly being located in said inner space and rotatable about an axis relative to the housing; and a valve unit for controlling a flow, from an outlet of said housing, of a substance separated from said mixture of substances, wherein said valve unit comprises a valve arrangement located in an inner space defined by a valve unit housing; and wherein the valve unit housing is separate to the rotor assembly housing.

An eighteenth aspect of the present invention provides a gas cleaning separator for separating a flowable mixture of substances of different densities, such as a gas and liquid; the separator comprising:

a housing defining an inner space, a rotor assembly located in said inner space and rotatable about an axis relative to the housing, and a housing member mounted to said housing so as to allow a flow of fluid to either side of the housing member wherein fluid flowing on one side of said member is directed by said member towards the exterior of said housing through a first outlet aperture in said housing; and wherein said fluid is directed through an outlet passage connecting said housing member to the exterior of the housing, the outlet passage being sealed to at least one of the housing member and housing by means of a sealing element provided about the outlet passage.

The separator recited above with respect to the eighteenth aspect of the present invention may include one or more of the following features and/or limitations.

A separator as recited above in respect of the eighteenth aspect of the invention, wherein said outlet passage is spaced from said housing.

A separator as recited above in respect of the eighteenth aspect of the invention, wherein said outlet passage is separate to the housing member and sealed thereto by means of a sealing element.

A separator as recited above in respect of the eighteenth aspect of the invention, wherein said outlet passage is separate to the housing and sealed thereto by means of a sealing element.

A separator as recited above in respect of the eighteenth aspect of the invention, wherein each sealing element for sealing said outlet passage is provided on an exterior surface of said passage in abutment with a shoulder defined by said surface.

A separator as recited above in respect of the eighteenth aspect of the invention, wherein said outlet passage is integral with a valve unit located exteriorly of the housing for controlling a flow of fluid from the housing.

A separator as recited above in respect of the eighteenth aspect of the invention, wherein each sealing element is an O-ring seal.

A separator as recited above in respect of the eighteenth aspect of the invention, wherein said outlet passage is spaced from said housing so as to allow fluid, located between the housing member and said housing, to flow about the entire outer perimeter thereof.

A nineteenth aspect of the present invention provides a gas cleaning separator for separating a flowable mixture of substances of different densities, such as a gas and liquid; the separator comprising:

a housing defining an inner space, a rotor assembly for imparting a rotary motion onto said mixture of substances, the rotor assembly being located in said inner space and rotatable about an axis relative to the housing, wherein the rotor assembly comprises an inlet for receiving said mixture of substances, an outlet from which said substances are ejected from the rotor assembly during use, and a flow path for providing fluid communication between the inlet and outlet, wherein the outlet is positioned more radially outward from said axis than the inlet, and wherein the rotor assembly comprises a rotary shaft having a longitudinal axis coincident with said axis of rotation and a separator disc mounted to the rotary shaft by means of an aperture which is provided in the separator disc; and wherein the rotary shaft comprises at least one spline, and in that the aperture in the separator disc has a shape which corresponds to a cross-section taken perpendicular to the axis through the rotary shaft and the at least one spline.

The separator recited above with respect to the nineteenth aspect of the present invention may include one or more of the following features and/or limitations.

A separator as recited above in respect of the nineteenth aspect of the invention, wherein the at least one spline is provided on a central hub joined to the rotary shaft.

A separator as recited above in respect of the nineteenth aspect of the invention, wherein three splines are provided.

A separator as recited above in respect of the nineteenth aspect of the invention, wherein the at least one spline comprises a tip portion, providing a free end to the spline, and a root portion, radially inward of the tip portion, the root portion having a greater circumferential dimension than the tip portion.

A separator as recited above in respect of the nineteenth aspect of the invention, wherein the different circumferential dimensions of the root portion and the tip portion provide a step on either side of the at least one spline at the junction between the root portion and the tip portion.

A separator as recited above in respect of the nineteenth aspect of the invention, wherein the circumferential dimension of the root portion varies along an axial length of the at least one spline.

A separator as recited above in respect of the nineteenth aspect of the invention, wherein the separator disc has a frusto-conical shape.

A separator as recited above in respect of the nineteenth aspect of the invention, wherein the or each spline extends axially along a length of the rotary shaft.

A twentieth aspect of the present invention provides a gas cleaning separator for separating a flowable mixture of substances of different densities, such as a gas and liquid; the separator comprising:

a housing defining an inner space, a rotor assembly (for imparting a rotary motion onto said mixture of substances, the rotor assembly being located in said inner space and rotatable about an axis relative to the housing, wherein the rotor assembly comprises an inlet for receiving said mixture of substances, an outlet from which said substances are ejected from the rotor assembly during use, and a flow path for providing fluid communication between the inlet and outlet, the rotor assembly further comprising a rotary shaft; and wherein said rotary shaft is provided with a coating of a plastics material along a length of said rotary shaft slidably receiving at least one component of said separator.

A separator as recited above in respect of the twentieth aspect of the invention, wherein at least one of said components is of a metallic material.

A separator as recited above in respect of the twentieth aspect of the invention, wherein at least one of said components is a helical spring.

A separator as recited above in respect of the twentieth aspect of the invention, wherein at least one of said components is a bearing unit.

A separator as recited above in respect of the twentieth aspect of the invention, wherein said rotary shaft receives two of said components on opposite end portions of said rotary shaft, wherein each component is a helical spring.

A separator as recited above in respect of the twentieth aspect of the invention, wherein each helical spring is compressed between the rotor assembly and a different one of two bearing units connecting the rotary shaft to the housing.

A separator as recited above in respect of the twentieth aspect of the invention, wherein each helical spring is of a metallic material.

A separator as recited above in respect of the twentieth aspect of the invention, wherein said rotary shaft is of a non-hardened material.

A separator as recited above in respect of the twentieth aspect of the invention, wherein said material is non-hardened metal, and preferably non-hardened steel.

A separator as recited above in respect of the twentieth aspect of the invention, wherein the rotor assembly comprises at least one element extending from said rotary shaft, wherein said element is of the same material as said coating and formed integrally therewith.

A separator as recited above in respect of the twentieth aspect of the invention, wherein said coating and said at least one element are injection moulded onto said rotary shaft and thereby formed simultaneously with one another.

A twenty-first aspect of the present invention provides a gas cleaning separator for separating a flowable mixture of substances of different densities, such as a gas and liquid; the separator comprising:

a housing defining an inner space, and a rotor assembly for imparting a rotary motion onto said mixture of substances, the rotor assembly being located in said inner space and rotatable about an axis relative to the housing, wherein the rotor assembly comprises an inlet for receiving said mixture of substances, an outlet from which said substances are ejected from the rotor assembly during use, and a flow path for providing fluid communication between the inlet and outlet, and wherein the separator further comprises an electric motor for rotating said rotor assembly, and a fluid passageway through the electric motor for receiving, in use, a substance separated from said mixture of substances.

The separator recited above with respect to the twenty-first aspect of the present invention may include one or more of the following features and/or limitations.

A separator as recited above in respect of the twenty-first aspect of the invention, wherein said fluid passageway through the electric motor is defined, at least in part, by a rotor and a stator of the electric motor.

A separator as recited above in respect of the twenty-first aspect of the invention, wherein said fluid passageway comprises a space between the rotor and the stator of the electric motor.

A separator as recited above in respect of the twenty-first aspect of the invention, wherein said rotor is connected to the rotor assembly.

A separator as recited above in respect of the twenty-first aspect of the invention, wherein electrical leads located in said fluid passageway are sealed in an insulating material.

A separator as recited above in respect of the twenty-first aspect of the invention, wherein said insulating material is provided as a layer covering electrical leads of said stator.

A separator as recited above in respect of the twenty-first aspect of the invention, wherein said insulating material comprises an epoxy lacquer.

A separator as recited above in respect of the twenty-first aspect of the invention, wherein the electric motor comprises one or more electronic components sealed from said fluid passageway through the electric motor.

A separator as recited above in respect of the twenty-first aspect of the invention, wherein the separator comprises a housing in which the electric motor is located.

A separator as recited above in respect of the twenty-first aspect of the invention, wherein said electric motor housing is connected to and is separable from the housing in which the rotor assembly is located.

A separator as recited above in respect of the twenty-first aspect of the invention, wherein the electric motor housing comprises a compartment sealed from said fluid passageway and in which electronic components of the electric motor are located.

A separator as recited above in respect of the twenty-first aspect of the invention, wherein said compartment has a generally annular or part-annular shape which, in the assembled separator, is concentric with said rotor assembly.

A separator as recited above in respect of the twenty-first aspect of the invention, wherein said compartment is enclosed by said electric motor housing and by a member separate to the said housing and sealed thereto.

A separator as recited above in respect of the twenty-first aspect of the invention, wherein said member is of a generally annular or frusto-conical shape.

A separator as recited above in respect of the twenty-first aspect of the invention, wherein said member is arranged concentrically with said rotor assembly.

A separator as recited above in respect of the twenty-first aspect of the invention, wherein a radially inner portion of said member is sealed to said electric motor housing along a closed loop and a radially outer portion of said member is sealed to said electric motor housing along a further closed loop.

A separator as recited above in respect of the twenty-first aspect of the invention, wherein said radially inner portion of said member is sealed to a generally cylindrical portion of said electric motor housing into which, in the assembled separator, said rotor assembly extends.

A separator as recited above in respect of the twenty-first aspect of the invention, wherein said radially inner portion of said member defines an aperture having a diameter less than or substantially equal to the innermost diameter of the stator of the electric motor.

A separator as recited above in respect of the twenty-first aspect of the invention, wherein said member is provided with at least one aperture through which an electrical lead extends and to which said lead is sealed.

A separator as recited above in respect of the twenty-first aspect of the invention, wherein said one or more electronic components comprise one or more components for controlling the operation of the electric motor.

A separator as recited above in respect of the twenty-first aspect of the invention, wherein said fluid passageway is in fluid communication with an outlet port in the electric motor housing.

A separator as recited above in respect of the twenty-first aspect of the invention, further comprising an electrical connector for receiving an electrical lead providing electrical power and/or control signals to the electric motor.

A separator as recited above in respect of the twenty-first aspect of the invention, wherein the electrical connector is electrically connected to the electric motor by means of one or more electric components.

A separator as recited above in respect of the twenty-first aspect of the invention, wherein the electrical connector is located in an aperture extending through a portion of a housing of the separator.

DETAILED DESCRIPTION

The prior art ALFDEX™ separator will now be described with reference to FIGS. 1 to 12 of the accompanying drawings and with particular emphasis being placed on those aspects of this prior art separator that have been improved by the inventors.

A number of views of an assembled prior art ALFDEX™ separator 2 are shown in FIGS. 1, 2, 8, 9 and 10. It will be understood by those skilled in the art that the prior art separator 2 comprises a generally cylindrically shaped rotor housing 4 for receiving a number of internal components which function to separate oil from vented gas directed into said rotor housing 4.

One end of the cylindrical housing 4 is provided with an upstanding annular shoulder 6, which defines a fluid inlet 8 to the separator 2. It will be understood therefore that gas vented from a crank case, and requiring the removal of oil therefrom, enters the separator 2 via the fluid inlet 8.

Figure 1:
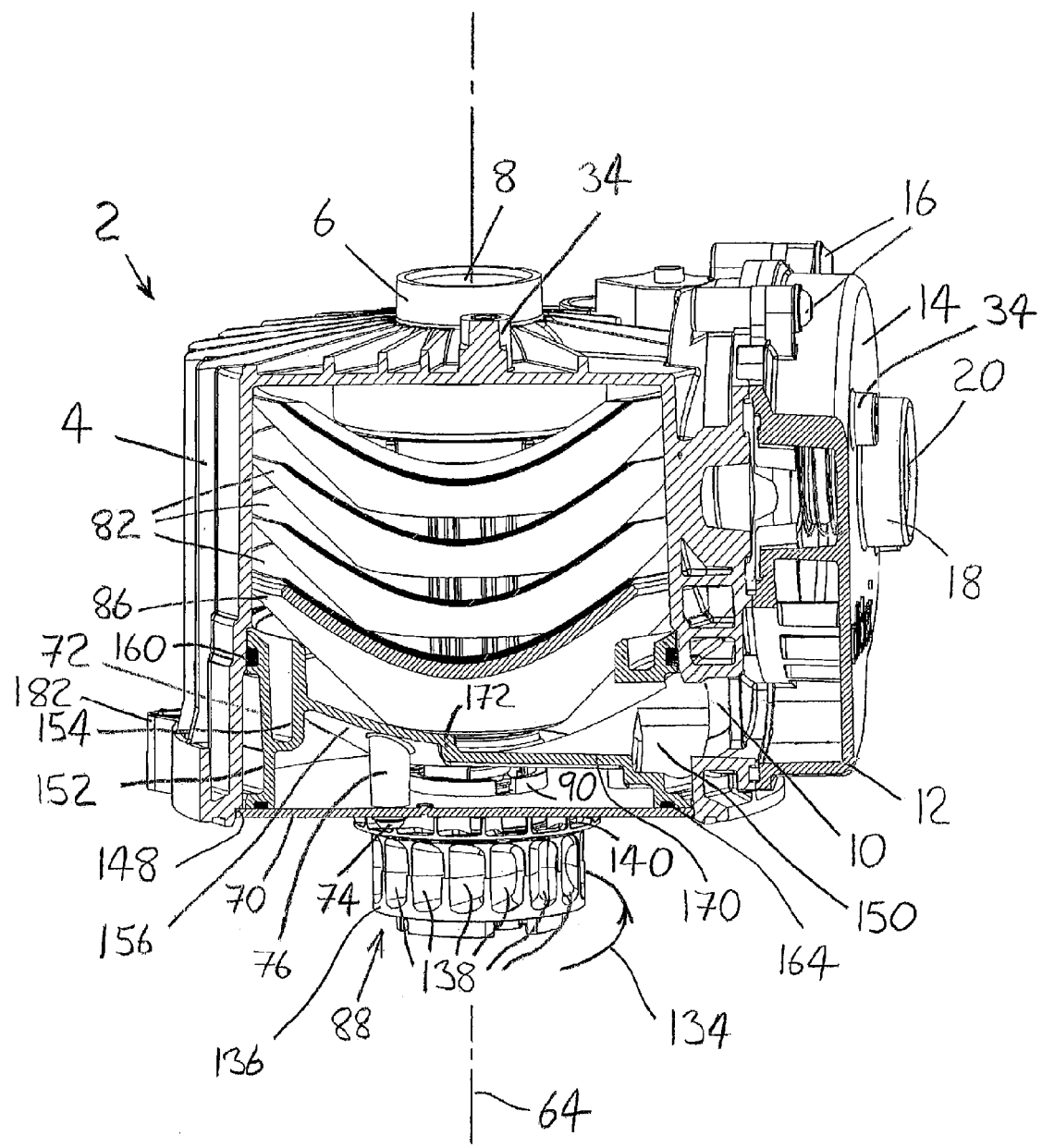
FIG. 1 is a cross-sectional perspective view of a prior art ALFDEX™ centrifugal separator.

An aperture 10 in a cylindrical wall of the rotor housing 4 provides an outlet for cleaned gas to pass from the interior of the rotor housing 4 into a further housing 12 associated with a valve unit 14 (see FIG. 1). The valve unit 14 comprises a valve arrangement for controlling the flow of cleaned gas from the separator 2. Details of the operation of the valve unit 14 will not be described herein. However, as will be evident from FIG. 1, the exterior of the rotor housing 4 is designed to mate with the housing 12 of the valve unit 14 so that the two housings 4,12 combine to define an internal space between said housings 4,12 suitable for receiving the internal components of the valve unit 14. The two housings 4,12 are secured to one another by conventional screw threaded fastenings 16. It will be appreciated therefore that a particular valve unit housing 12 can only be used with a specific rotor housing 4 having the necessary mating features.

With reference to FIG. 1, it will be seen that the housing 12 of the valve unit 14 is provided with an upstanding annular shoulder 18 that defines a fluid outlet through which cleaned gas passes from the separator 2. The annular shoulder 18 provided on the valve unit housing 12 is substantially similar to the annular shoulder 6 provided on the rotor housing 4. Due to their similarity, the inlet and outlet shoulders 6,18 may interchangeably receive inlet/outlet nipples having the same interface profile. One such nipple 22 having a 90° bend is shown, in cross-section, in FIG. 3. One end of the nipple 22 is provided with an annular collar 24 defining an annular recess 26. The annular recess 26 has a square-edge profile and a diameter allowing it to receive a housing annular shoulder 6,18 (which also has a square edge) in abutment therewith.

Figure 2:
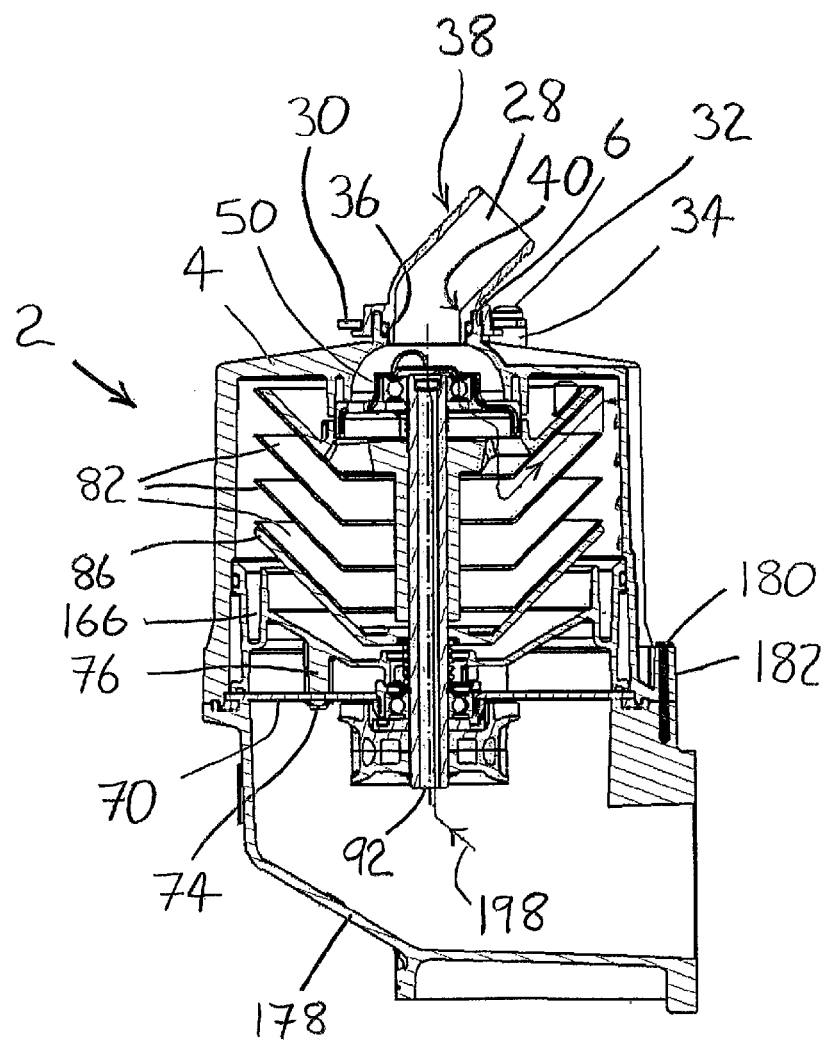
FIG. 2 is a cross-sectional side view of the separator shown in combination with a turbine casing.

The interface of the shoulder 6 of the rotor housing 4 with an inlet nipple 28 can be seen with reference to FIG. 2 of the accompanying drawings. It will be appreciated that the nipple 28 shown in FIG. 2 has a different bend angle than the nipple 22 shown in FIG. 3.

The inlet/outlet nipples are secured to their respective housings 4,12 by clamping them onto the housing shoulders 6,18 using an annular washer 30, which presses down on the shoulder 24 of a nipple 22,28 when screw threaded fasteners 32 are threadedly engaged with two threaded bosses 34. The two bosses 34 are upstanding from the relevant housing 4,12 and located on either side of the annular shoulder 6,18.

An O-ring seal 36 is located, trapped and compressed between the recess 26 and the housing shoulder 6,18 so as to prevent an undesirable leaking of fluid from the interface between the inlet/outlet nipple and respective housing (see FIG. 2 in respect of the inlet nipple).

Figure 3:
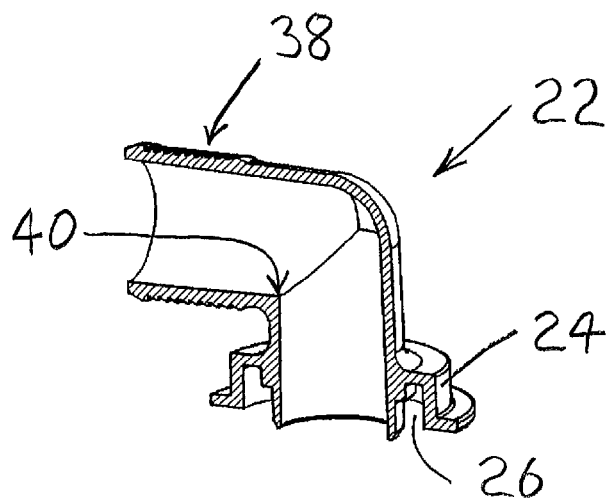
FIG. 3 is a cross-sectional perspective view of an inlet/outlet nipple for use with the separator shown in FIG. 1.
Figure 4:
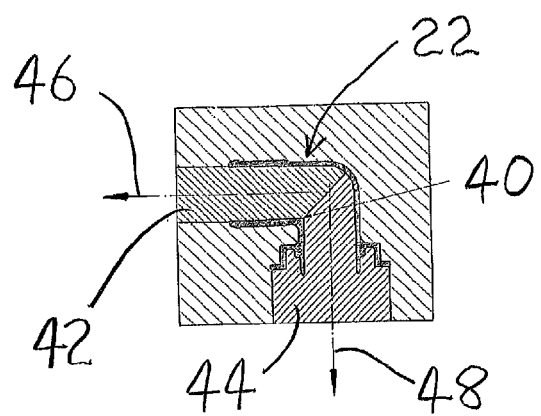
FIG. 4 is a cross-sectional side view of a mould for the inlet/outlet nipple shown in FIG. 3.

With further reference to the nipples 22,28 shown in FIGS. 3 and 2 respectively, a second end of the nipple (distal to the end provided with the interface profile) is provided with teeth or serrations 38 on an exterior surface thereof for gripping a hose which, in use, is located over the nipple second end.

The fluid flow paths provided by the two nipples 22,28 each comprise a bend having an inner corner 40 substantially lacking a radius. In the prior art separator 2, angled nipples are manufactured using injection moulding (for plastics nipples) and die casting (for aluminium nipples) techniques. As will be readily understood from FIG. 4 (which shows the moulding of a nipple 22), in order to allow removal of first and second internal moulding segments 42,44 in the directions indicated by first and second arrows 46,48 respectively, it is not possible for the mould segments 42,44 to provide a radius to the inner corner 40.

The aforementioned internal components housed by the rotor housing 4 will now be described in greater detail with particular reference to FIG. 8.

A top bearing unit 50 is secured to an inner surface of the rotor housing 4 immediately downstream of the fluid inlet 8. The top bearing unit 50 comprises caged bearings 52 trapped between an upper steel cap member 54 and a lower bearings seat member 56 of a plastics material. The bearing unit 50 is manufactured by moulding the lower bearings seat member 56 around the upper steel cap member 54 with the caged bearings 52 retained securely therebetween. The arrangement of the top bearing unit 50 is most clearly shown in FIG. 8, although it is also shown in FIGS. 2 and 9 in the context of the prior art separator 2.

The bearings seat member 56 has a circular shape and a downwardly projecting cylindrical wall 58 (encasing a lower part of the cap member 54) which, in the assembled separator 2, abuts laterally against a cylindrical wall 60 of the rotor housing 4. The abutment with the cylindrical wall 60 assists in ensuring a correct lateral positioning of the top bearing unit 50 relative to the rotor housing 4. A second cylindrical wall 62 of the rotor housing 4 is positioned radially inwardly of the first cylindrical wall 60 so as to ensure a correct axial positioning of the top bearing unit 50 relative to the rotor housing 4. The top bearing unit 50 is secured to the rotor housing 4 by means of three threaded fasteners (not shown). The arrangement of the separator 2 is such that the rotary axis of the top bearing unit 50 is coincident with a central axis 64 of the rotor housing 4.

Figure 8:
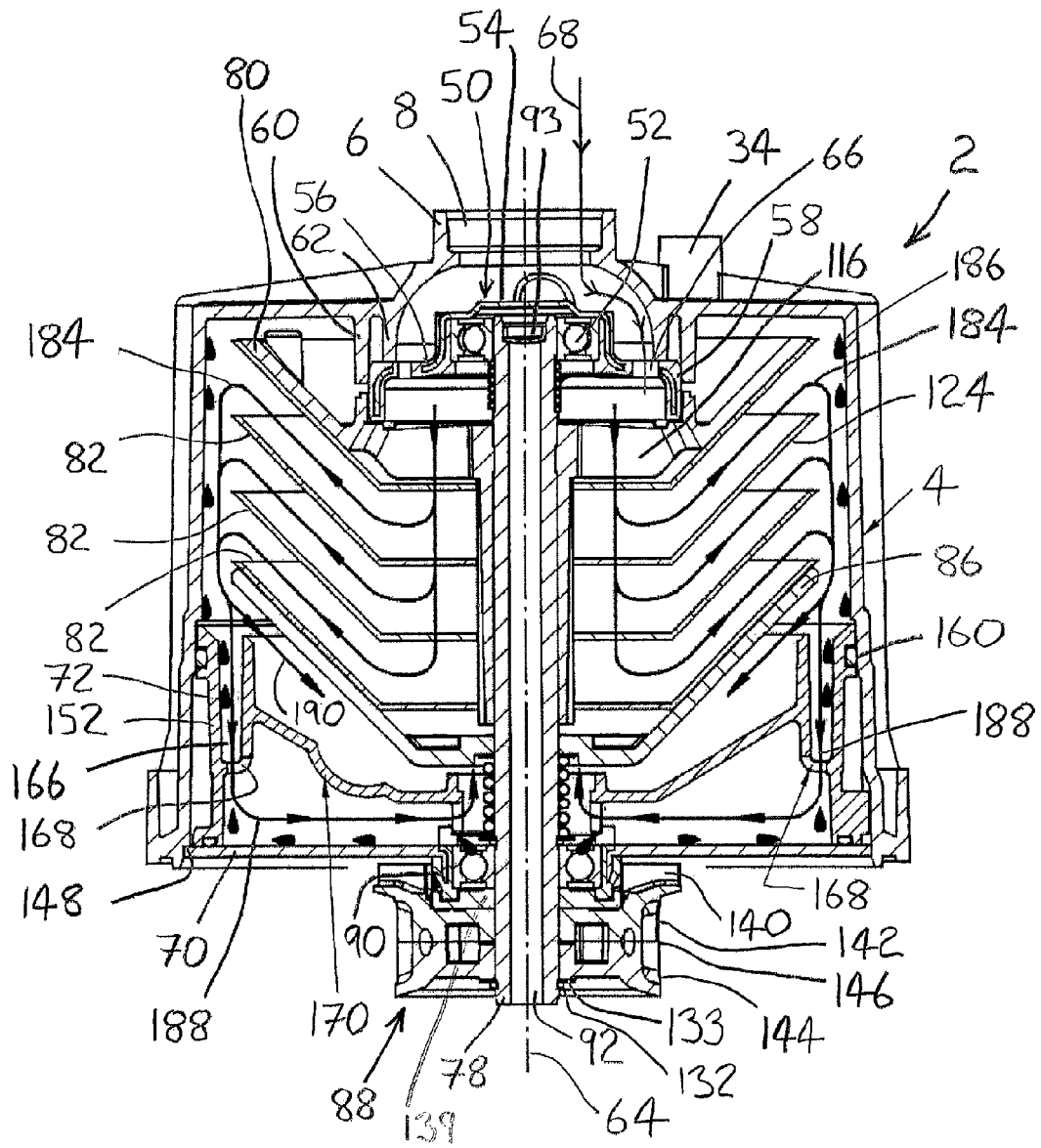
FIG. 8 is a cross-sectional side view of the separator shown in FIG. 1, wherein the flow paths of separated gas and oil are illustrated.
Figure 9:
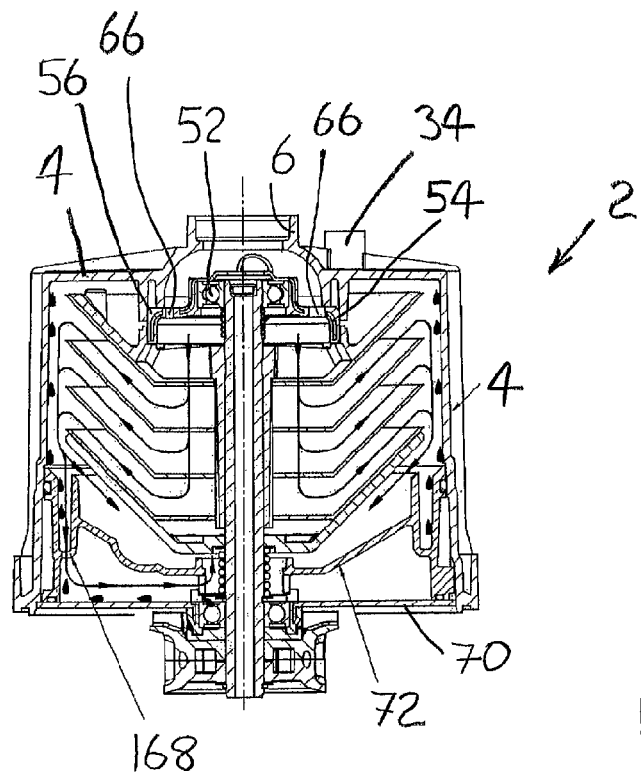
FIGS. 9 and 10 are cross-sectional side views of the separator shown in FIG. 1, wherein a desirable flow path of oil and an undesirable flow path of oil are respectively illustrated.
Figure 10:
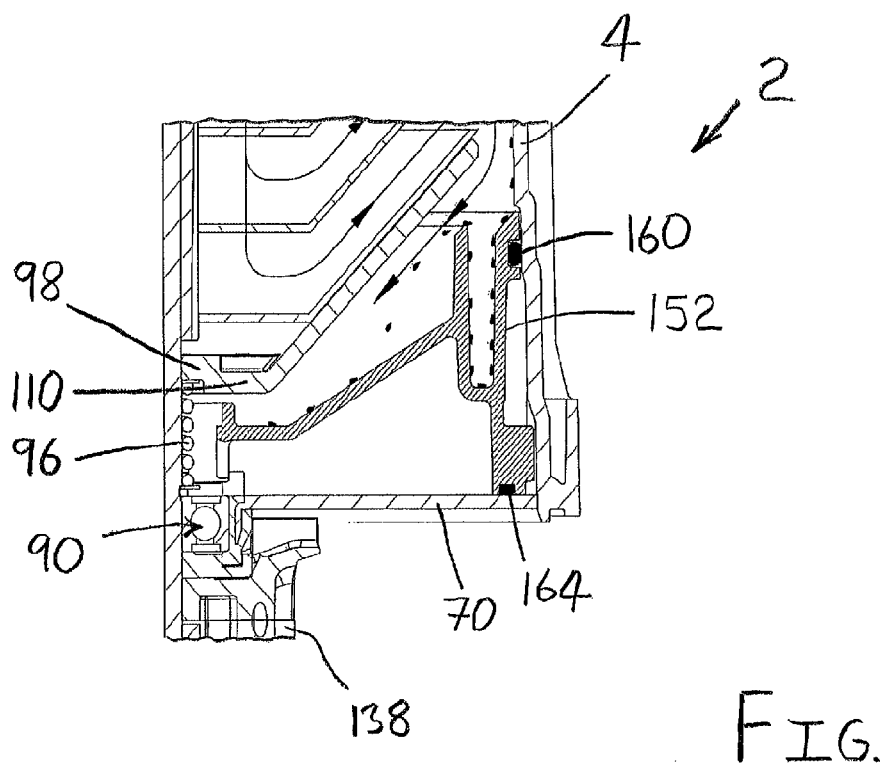
Figure 11:
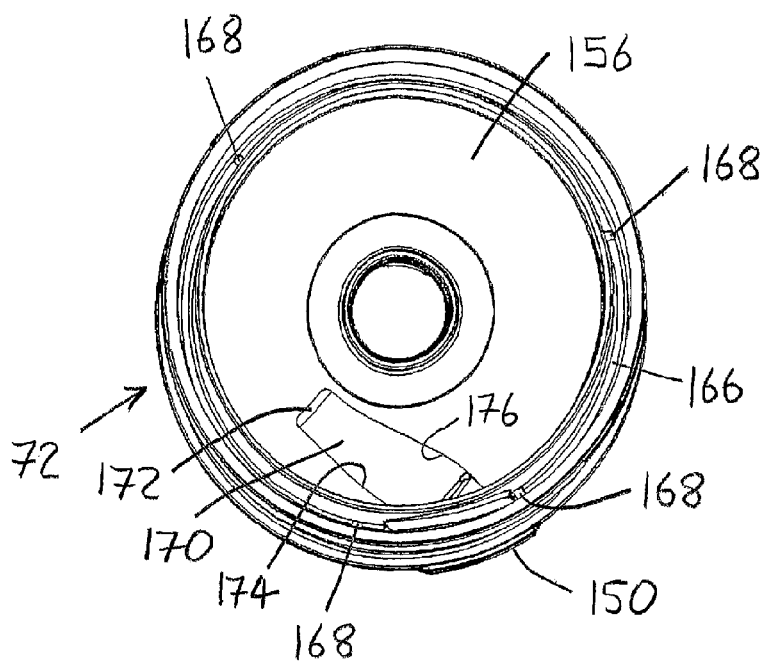
FIG. 11 is a perspective top view of a housing insert of the separator shown in FIG. 1.
Figure 12:
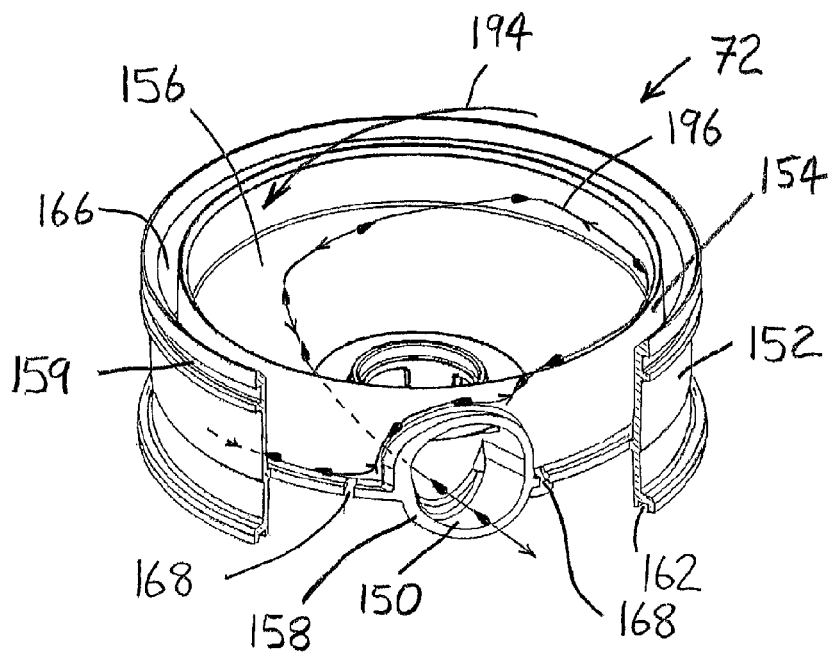
FIG. 12 is a perspective side view of the housing insert shown in FIG. 11, wherein a portion of an outer skirt of the housing insert has been removed so as to more clearly show an undesirable flow path of separated oil droplets.

Three part-circular slots 66 (only two of which are shown in FIG. 8) are provided in the top bearing unit 50 so as to allow a flow of inlet fluid therepast (as shown by arrow 68). The upper cap member 54 deflects inlet fluid from the caged bearings 52, however as will be understood by those skilled in the art, the underside of the uppermost part of the cap member 54 also deflects (into the caged bearings 52) a lubricating oil mist which travels upwardly through a rotor shaft and into the top bearing unit 50 during use.

The remaining internal components of the separator 2 are assembled separately to the rotor housing 4 and are then located within the housing 4 as a unitary assembly. The unitary assembly comprises a first group of components which, in use of the separator 2, remains stationary relative to the rotor housing 4, and a second group of components which, in use of the separator 2, rotates about the central axis 64 relative to both the rotor housing 4 (and the valve unit housing 12) and the first group of components.

The first group of components comprises an annular-shaped bearing plate 70 and a dish-shaped member 72, known as a housing insert. The housing insert 72, in combination with the bearing plate 70, function to segregate separated oil from cleaned gas prior to the separated oil and cleaned gas exiting the rotor housing 4. The bearing plate 70 is made of steel and the housing insert 72 is made of a plastics material. The bearing plate 70 and housing insert 72 are secured to one another by means of three screw threaded fasteners 74 (only one of which is shown in FIG. 1 of the accompanying drawings) which threadedly engage bosses 76 projecting downwardly from an underside of the housing insert 72. This first group of components will be discussed in greater detail later in this description.

The second group of components form a rotor assembly and comprises a rotary shaft 78, an upper rotor disc 80, a plurality of individual separator discs 82 which together form a stack 84 of separator discs 82, an end plate 86, and a combined fan and turbine unit 88. The components of this second group are secured to one another in such a way as to prevent their rotation relative to one another. The second group of components is, however, rotatably mounted to the first group of components by means of a bottom bearing unit 90 (see FIG. 10 in particular).

The rotor assembly formed by the second group of components will now be described in more detail.

The rotary shaft 78 is made of a metallic material and has an annular cross-section so as to provide a longitudinally extending fluid flow path 92 along its entire length. In use of the separator 2, this flow path 92 allows an oil mist to be transported from a turbine casing upwardly through the rotary shaft and into the top bearing unit 50 so as to lubricate the bearings of said unit 50. A restrictor element 93 in the form of an annular disc (with a cylindrical wall upstanding from a radially outer circumferential edge thereof) is located on an upwardly facing internal shoulder of said fluid flow path 92 at an upper end of the rotary shaft 78. The restrictor element 93 functions to reduce the flow path area through the rotary shaft 78 (thereby providing a nozzle) at an outlet from the rotary shaft 78 into the top bearing unit 50.

The exterior of the rotary shaft 78 is provided with a number of recesses and shoulders for receiving circlips which assist in retaining components in the correct axial position on the rotary shaft 78. One such circlip 94 is clearly shown in FIG. 6 as providing an upwardly facing shoulder against which a washer 95 abuts. A helical compression spring 96 abuts an upwardly facing shoulder of the washer 95. The circumferential recess in which the circlip 94 is located has sufficient width (i.e. the dimension of the recess in the axial direction) to allow the circlip 94 to move axial along the rotary shaft 78 (within the recess). This allows the spring 96 to apply an axial force to the bottom bearing unit 90.

Other recesses are provided on the exterior surfaces of the rotary shaft 78 for locating and retaining components on said shaft 78.

Each of the upper rotor disc 80, separator discs 82, and end plate 86 has a frustoconical part (defining an upper frusto-conical surface 102) with a plurality of spoke members extending radially inwardly therefrom to a hub element which, in use, is located about the rotary shaft 78.

Whilst the spoke members of the upper rotor disc 80 and separator discs 82 have open spaces between them to allow for a flow of fluid axially therethrough along the rotary shaft 78, the spoke members of the end plate 86 are joined to one another at their lower surfaces so as to prevent an axial flow of fluid along the rotary shaft 78 either upwardly past the end plate 86 or downwardly past the end plate 86.

The frusto-conical geometry of the upper rotor disc 80 and end plate 86 is substantially identical to that of the separator discs 82 so as to allow the upper rotor disc 80 and end plate 86 to be stacked with the separator discs 82, wherein the upper rotor disc 80 is located at the top of the separator disc stack 84 and the end plate 86 is located at the bottom of the separator disc stack 84. Furthermore, whilst the separator discs 82 will be understood by the skilled person to be comparatively thin so as to allow a large number of discs to be provided in a relatively short stack 84, the upper rotor disc 80 and end plate 86 are considerably thicker than the separator discs 82 so as to provide rigidity at either end of the disc stack 84 and thereby allow a compressive axial force to be uniformly applied to the frusto-conical parts of the separator discs by the upper disc 80 and end plate 86. The compressive force is, more specifically, generated by the helical compression spring 96 which presses upwardly on the underside of the hub 98 of the end plate 86.

Regarding the compression of the disc stack 84 between the upper disc 80 and the end plate 86, it will be understood by the skilled person that adjacent separator discs 82 within the stack 84 must remain spaced from one another in order to allow a flow of fluid through the separator 2. This spacing of the separator discs 82 is provided by means of a plurality of ribs 100 (known as caulks) provided on the upper surface of the frusto-conical part of each separator disc 82. Each caulk 100 extends from a radially inner edge 104 of said upper surface 102 to a radially outer edge 106 of said surface. The caulks 100 stand proud of said upper surface 102 and, in the assembled stack 84 of separator discs 82, abut the underside of the above adjacent disc. As understood by a person skilled in the art, each separator disc 82 is locatable on the rotary shaft 78 in one of only six possible angular positions relative to the rotary shaft 78, and the positioning of the caulks 100 on said upper surface 102 is such that the caulks of adjacent discs 82 must align with one another when the discs 82 are arranged in any of these six positions. As a result, the compression force applied to the disc stack 84 by the end plate 86 is transmitted through the stack 84 by means of the aligned caulks 100 without the spacing between adjacent separator discs 82 closing.

With further regard to the compression force applied to the separator disc stack 84, it will be understood by the skilled person that this force is generated by the helical compression spring 96 and applied to the end plate hub 98. Due to the rigidity of the end plate 86, the compression force is transmitted from the hub 98 to the frustoconical part 108 of the end plate 86 via a plurality of radially extending spokes 110 of the end plate 86. The compression force is then transmitted to the disc stack 84 via the frusto-conical part 108, and transmitted upwardly through the stack 84 (via the caulks 100) to the frusto-conical part 112 of the upper rotor disc 80. The compression force is transmitted from the frusto-conical part 112 to the hub 114 of the upper rotor disc 80 via six radially extending spokes 116. The compression force is transmittable from the frusto-conical part 112 to the hub 114 due to the rigidity of the upper rotor disc 80. An axial movement of the upper rotor disc 80 upwards along the rotary shaft 78 in reaction to the compression force is prevented by a locating of the upper rotor disc hub 114 in a circumferential recess 118 in the exterior surface of the rotary shaft 78 (see FIG. 6 in particular). Frictional forces between the hub 114 and the exterior surface of the rotary shaft 78 prevent relative rotation therebetween.

Figure 6:
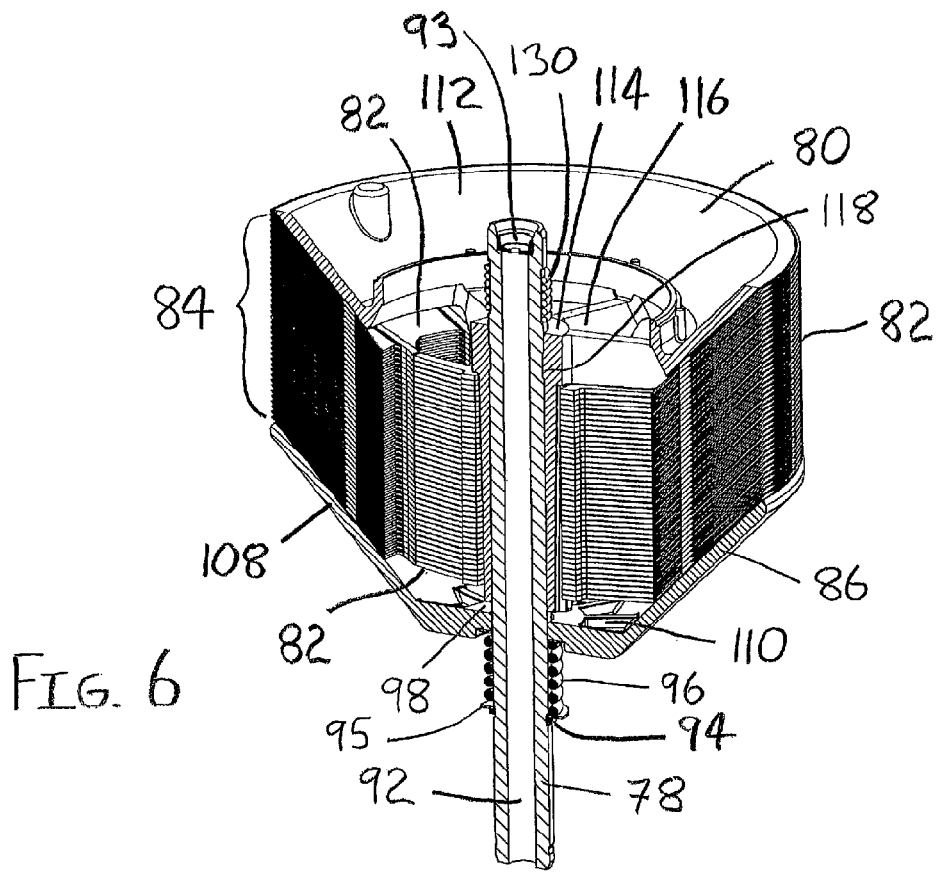
FIG. 6 is a cross-sectional perspective view of the rotor shown in FIG. 5.
Figure 7:
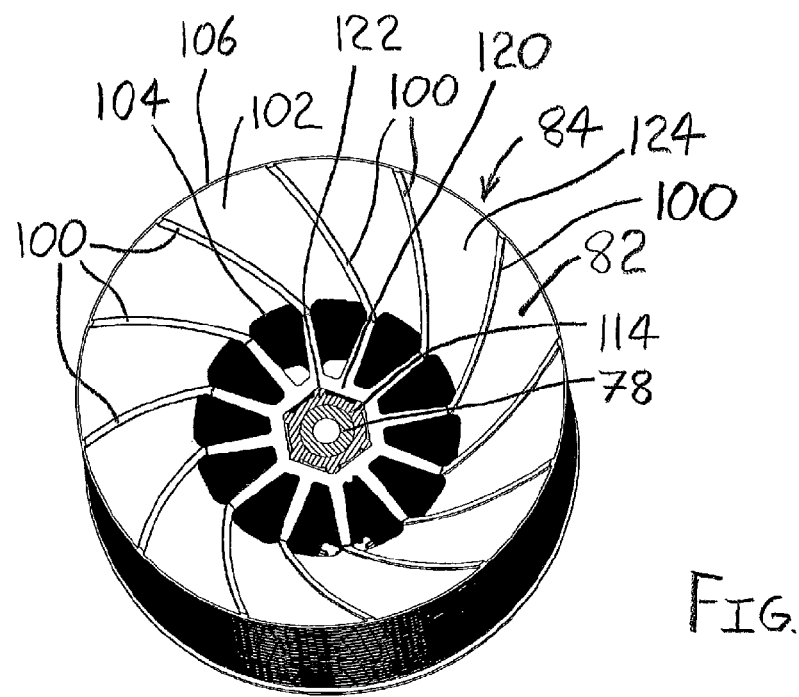
FIG. 7 is perspective end view of the rotor shown in FIG. 5, wherein an upper rotor disc is shown removed from a rotary shaft of said rotor such that the rotary shaft is shown in cross-section.

It will be seen from FIGS. 6 and 8 in particular that the hub 114 of the upper rotor disc 80 extends axially downwardly along the rotary shaft 78 to a point just above the end plate hub 98. More specifically, the hub 114 extends along the full depth of the separator disc stack 84 and thereby separates the hub 120 of each separator disc 82 from the rotary shaft 78 (see FIG. 7). The hub 120 of each separator disc 82 has a hexagonal shape defining a hexagonal aperture through which the rotary shaft 78 and upper rotor disc hub 114 extend. Rotational movement of the separator disc hub 120 relative to the upper rotor disc hub 114 (and, therefore, relative to the rotary shaft 78) is prevented by means of six splines 122 which are provided axially along the length of the upper rotor disc hub 114 and extend radially into six corners of the hexagonal aperture defined by the separator disc hub 120. This location of the splines 122 prevents lateral and rotational movement of a separator disc hub 120 relative to the rotary shaft 78.

The separator disc hub 120 of each separator disc 82 is connected to the frusto-conical part 124 of each separator disc 82 by means of twelve radially extending spokes 126. The spokes 126 (and indeed the remainder of the associated separator disc 82) are made of a relatively thin and resiliently flexible plastics material. However, the spokes 126 are nevertheless capable of resisting the lateral and rotational forces to which they are subjected without deforming. It will be understood by the skilled person that the compression force generated by the helical spring 96 is transmitted through the separator disc stack 84 via the caulks 100 rather than by the separator disc spokes 126.

It will also be understood by the skilled person that the relative geometry of the splines 122 and the hexagonal hub 120 of each separator disc 82 ensures that, as mentioned above, each separator disc 82 is locatable on the rotary shaft 78 in one of only six angular positions. However, the polar or angular positions of the caulks 100 of the separator discs 82 are the same regardless of which of the six angular positions is used and, accordingly, there is no possibility of the separator disc stack 84 being assembled on to the rotary shaft 78 with the caulks 100 of adjacent separator discs 82 being misaligned.

For the purposes of clarity, certain Figures of the accompanying drawings show a disc stack with a reduced number of separator discs present. With specific regard to the prior art separator 2, FIGS. 1, 2, 8, 9 and 10 have been simplified in this way.

Figure 5:
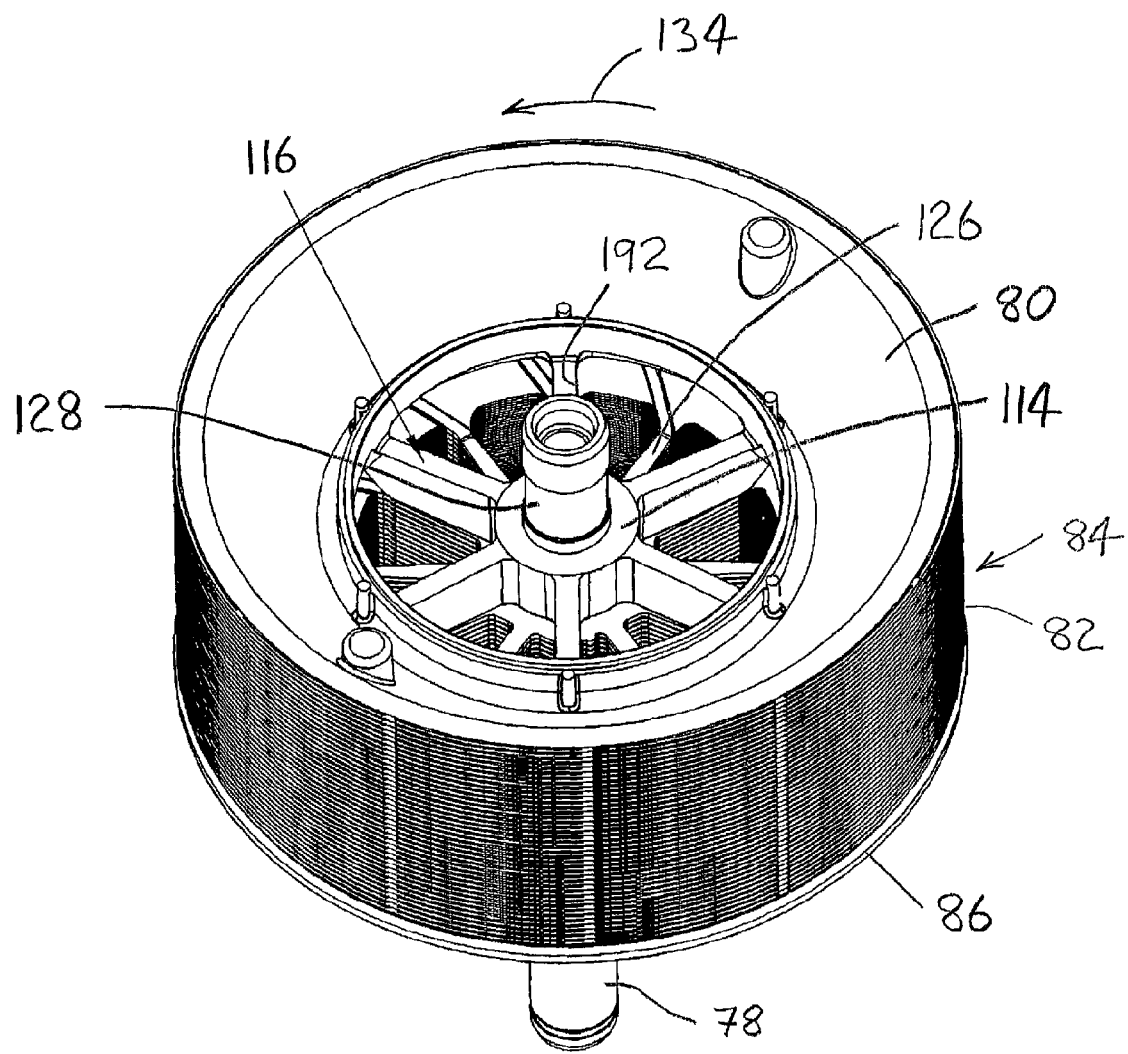
FIG. 5 is a perspective view of a rotor of the separator shown in FIG. 1.

As shown in FIG. 5, a second circumferential recess 128 is provided in an upper end of the rotary shaft 78 at a location above the first recess 118. The second recess 128 receives a second helical compression spring 130. The position of the second recess is such that, in the assembled prior art separator 2, the lower end of the second spring 130 is spaced from the hub 114 of the upper rotor disc 80 (see FIG. 6) and is prevented from downward axial movement along the rotary shaft 78 by an upward facing shoulder formed by the second recess 128. Furthermore, in the assembled separator 2, the cage of the caged bearings 52 abuts and downwardly compresses the second spring 130 (with the upper end of the rotary shaft 78 remaining spaced from the cap member 54 of the top bearing unit 50—see FIG. 8 in particular). The second spring 130 applies a load to the top bearing unit 50 and thereby reduces vibrations and associated wear at the top bearing unit 50.

All but the combined fan and turbine unit 88 of the second group of internal components are shown assembled in FIG. 6 of the accompanying drawings. Before the fan/turbine unit 88 is mounted to the lower end of the rotary shaft 78, the lower end of the shaft 78 is located through a central circular aperture provided in each of the bearing plate 70 and housing insert 72 of the first group of internal components. In so doing, the lower end of the rotary shaft 78 is also extended through the bottom bearing unit 90 which is secured to the central aperture of the bearing plate 70 (see FIGS. 8 and 10 in particular).

The combined fan and turbine unit 88 is secured to the lower end of the rotary shaft 78 which projects downwardly from the underside of the bearing plate 70. The fan/turbine unit 88 is retained in position on the lower end of the rotary shaft 78 by means of a second circlip 132 (retained in a third circumferential recess in the shaft 78) and a second washer 133 abutting an upwardly facing surface of the second circlip 132. The axial positioning of the fan/turbine unit 88 on the rotary shaft 88, as determined by the second circlip 132, results in an upper surface the unit 88 being pressed into abutment with a deflector washer 139 which, in turn, is pressed into abutment with the bottom bearing unit 90. In the assembled separator 2, the inner race of the bottom bearing unit 90 abuts the first circlip 94 and presses this circlip 94 upwardly against the bias of the first compression spring 96. The pressing of the inner race, deflector washer 139 and fan/turbine unit 88 against the second circlip 132 is such as to retain these elements in a fixed rotational position relative to the rotary shaft 78.

The rotor assembly of the separator 2 is rotated in a direction indicated by arrow 134 (see FIG. 1) by means of a hydraulic impulse turbine. The fan/turbine unit 88 comprises a Pelton wheel 136 having a plurality of buckets 138 evenly spaced along the circumference thereof. In use of the separator 2, a jet of oil is directed from a nozzle (not shown) within the turbine casing 178 towards the circumference of the Pelton wheel 136. More specifically, the jet is directed along a tangent to a circle passing through the plurality of buckets 138 so that the jet enters a bucket aligned with a surface thereof. The jet flows along said surface following the internal profile of the bucket and is thereafter turned by said profile to flow along a further surface and be thereafter ejected from the bucket. The result is that the jet rotates the wheel 136.

A fan having a plurality of blades 140 is also integrally formed with the wheel 136. The blades 140 are located on the wheel 136 in close proximity to the underside of the bearing plate 70. The plurality of fan blades 140 are also in approximately the same axial position along the rotary shaft 78 as the bottom bearing unit 90. The fan blades 140 extend radially outward from adjacent the bottom bearing unit 90. It will be understood by those skilled in the art that the fan blade 140 rotate about the central axis 64 as the turbine wheel 136 is rotated. In so doing, the fan blades 140 effectively throw fluid from the region between the wheel 136 and the underside of the bearing plate 70, thereby reducing the fluid pressure in the region of the bottom bearing 90 and drawing separated oil from a location above the bearing plate 70 downward through the bottom bearing unit and into the turbine casing 178 below the bearing plate 70.

For ease of manufacture, the wheel 136 is made in upper and lower parts 142, 144 and pressed into abutment with one another at line 146 as shown in FIG. 8 of the accompanying drawings.

With regard to the first group of internal components, the bearing plate 70 is made of steel and has a circular shape with a diameter substantially equal to the diameter of the rotor housing 4. The relative geometries are such as to allow the bearing plate 70 to locate on a downwardly facing shoulder 148 at a lower end of the rotor housing 4. In this way, the lower open end of the rotor housing 4 is closed by the bearing plate 70. The bearing plate 70 is also provided with a central circular aperture which, in the assembled separator 2, is concentric with the rotor housing 4. In other words, in the assembled separator 2, the circular central aperture of the bearing plate 70 is centered on the central axis 64 of the rotor housing 4. Furthermore, as will be particularly evident from FIG. 1 of the accompanying drawings, the bottom bearing unit 90 is received in the central aperture of the bearing plate 70. The radially outermost part of the bottom bearing unit 90 is fixed relative to the bearing plate 70. The radially innermost part of the bottom bearing unit 90 is located adjacent the rotary shaft 78, but is not fixed thereto.

As mentioned above the first group of internal components also comprises a housing insert 72 which is fixedly secured to the bearing plate 70. The housing insert 72 functions to segregate cleaned gas from oil which has been separated therefrom and to provide an outlet 150 for cleaned gas, which connects with the outlet aperture 10 of the rotor housing 4 (see FIG. 1 in particular). The housing insert 72 is provided as a unitary moulding of plastics material. However, in describing the housing insert 72 below, the insert will be considered as comprising four portions: an outer cylindrical wall/skirt portion 152; a ditch portion 154; a frusto-conical portion 156; and an outlet portion 158 defining said insert outlet 150.

The cylindrical skirt portion 152 of the housing insert 72 has an outermost external diameter which is substantially equal to the diameter of an interior wall portion of the rotor housing 4 with which the skirt portion 152 abuts. A circumferential recess 159 (see FIG. 12) is provided in the exterior surface of the skirt portion 152 for receiving an O-ring seal 160 which, in the assembled separator 2, ensures a fluid seal between the housing insert 72 and the rotary housing 4.

The lower end of the cylindrical skirt portion 152 abuts the upper side of the bearing plate 70 and is provided with a circumferential recess 162 (see FIG. 12) for receiving a second O-ring seal 164. It will be understood that the second O-ring seal 164 ensures a fluid seal between the housing insert 72 and the bearing plate 70.

A second cylindrical wall positioned radially inwardly of the outer skirt portion 152 and arranged concentrically therewith is connected at its lower end to the skirt portion 152 to form the ditch portion 154. The ditch portion 154, together with the outer skirt portion 152, forms an annular ditch (or gutter) 166 running along the internal cylindrical wall of the rotor housing 4. The ditch 166 has a U-shaped cross-section and, during use of the separator 2, collects separated oil droplets which are thrown from the separator discs 82 and run downwards on the interior of the rotor housing 4 under the action of gravity (and under the action of a downwards spiralling gas flow, as is mentioned in more detail herein). The ditch portion 154 is provided with four drain holes 168 (see FIG. 11 in particular) through which oil collected in the ditch 166 may flow so as to pass into a region enclosed by an underside of the housing insert 72 and an upperside of the bearing plate 70 during use of the separator 2.

The third portion 156 of the housing insert 72 has a frusto-conical shape and is suspended from the ditch portion 154. The frusto-conical portion 156 is provided with a central circular aperture which, in the assembled separator 2, has a central axis coincident with the central axis 64 of the rotor housing 4. An elongate recess 170 (see FIG. 11) is provided in the upper surface of the frusto-conical portion 156. This recess 170 defines a fluid pathway for cleaned gas which joins with the outlet portion 158 of the housing insert 72. The flow pathway provided by the recess 170 begins at an upstream end thereof with a downward step 172 from the upper surface of the frusto-conical portion 156. Side walls 174,176 of the recess 170 increase in height in the downstream direction as the fluid pathway progresses outward from the centre of the housing insert 72. As will be evident from the top view of the housing insert 72 provided by FIG. 11, the recess 170 provides a straight fluid pathway having a length approximately equal to half the diameter of the housing insert 72.

The outlet portion 158 of the housing insert 72 is provided in the form of a generally cylindrical tube which extends across the ditch 166 between apertures in the outer skirt portion 152 and the ditch portion 154.

A view of the separator 2 secured to a turbine casing 178 is shown in FIG. 2. The separator 2 is secured to the turbine casing 178 by means of three threaded fasteners 180, each of which passes through one of three bosses integral with the lower end of the rotor housing 4. Only one fastener 180 and boss 182 is shown in the cross-sectional side view of FIG. 2. It will be understood from FIG. 2 by those skilled in the art that the bearing plate 70 (and, therefore, all of the components of the first and second groups) is retained in the required position relative to the rotor housing 4 by virtue of the turbine casing 178 pressing the bearing plate 70 into abutment with the downwardly facing shoulder 148 when the rotor housing 4 and turbine casing 178 are fastened to one another. The bearing plate 70 is essentially clamped between the rotor housing 4 and the turbine casing 178 by means of the threaded fasteners 180. As the threaded fasteners 180 are tightened and the bearing plate 70 is brought into abutment with the shoulder 148 as a consequence, the second helical compression spring 130 is compressed by the top bearing unit 50.

In operation of the separator 2, a nozzle (not shown) in the turbine casing 178 directs a jet of oil onto the turbine wheel 136 so as to rotate the turbine wheel in the direction indicated by arrow 134, as previously described in relation to FIG. 1. This rotation of the turbine wheel drives a rotation of the rotor assembly as a whole in the direction of arrow 134 about the central axis 64 of the rotor housing 4. In other words, the rotary shaft 78; the upper rotor disc 80; the stack 84 of separator discs 82; the end plate 86; and the combined fan and turbine unit 88 (i.e. collectively referred to herein as the rotor assembly) rotate together as a unitary assembly within the rotary housing 4 and relative to said housing 4 and the bearing plate 70; the housing insert 72; and the turbine casing 178.

Gas vented from the engine crank casing, and requiring treatment by the separator 2, is introduced into the separator 2 via the fluid inlet 8 located at the top of the rotor housing 4. As indicated by arrow 68 in FIG. 8, the inlet gas enters the rotor housing 4 in a direction parallel with, and in line with, the central axis 64 and flows through three slots 66 in the top bearing unit 50 before flowing past the six spokes 116 of the upper rotor disc 80. The rotational movement of the six spokes also results in a lateral movement of the fluid located between said spokes in that said fluid moves tangentially from the circular path of the spokes 116 and is effectively thrown outwards towards the cylindrical wall of the rotor housing 4. In essence, the six spokes 116 impart a cylindrical motion onto the inlet gas.

As inlet gas flows downwardly through the spokes 116,126 of the upper rotor disc 80 and the separator discs 82, the gas is moved laterally towards the cylindrical wall of the rotor housing 4 via the spaces between adjacent separator discs 82, as shown by arrows 184 in FIG. 8. The caulks 100, together with frictional forces applied by the separator discs 82, impart a lateral movement on to the fluid located in the disc stack 84, which results in said fluid moving outwardly towards the cylindrical wall of the rotor housing 4. This movement of fluid, caused by the rotation of the disc stack 84, is a primary mechanism by which fluid is drawn into the separator 2.

It will be understood by those skilled in the art that oil droplets 186 tend to collect together and form larger droplets at the perimeter of the disk stack 84. In this regard, capillary forces acting on smaller oil droplets (due to the small spacing between adjacent separator discs 82) tend to prevent small droplets from being thrown from the disc stack 84. However, as more oil is moved across a separator disc, the smaller droplets collect together at the perimeter and form larger droplets having a sufficient mass (and associated "centrifugal" force) to overcome the capillary force. The oil is then thrown onto the cylindrical wall of the rotor housing 4. Once received by said cylindrical wall, the oil droplets 186 tend to run downwardly under the action of gravity, and the flow of gas through the separator 2, into the annular ditch 166. The outer most circumferential edge of the separator stack 84 is sufficiently inwardly spaced from the cylindrical wall of the rotor housing 4 so as to allow oil droplets to run unimpeded by the separator discs 82 downwardly into said ditch 166. The O-ring seal 160 ensures oil droplets flow into the ditch 166, rather than between the housing inserts 72 and the rotor housing 4 with the possible consequence of contaminating clean gas flowing through the outlet 150 of the housing insert 72 (as will be most readily understood with reference to FIG. 1).

Oil droplets 186 collecting in the ditch 166 are drained therefrom through the four drain holes 168. This draining action is assisted by the fluid pressure gradients within the rotor housing 4 and turbine casing 178. More specifically, it will be understood by those skilled in the art that, because of the rotary motion of the rotor assembly, the fluid pressure within the rotor housing 4 is greater at the peripheral edge of the separator disc stack 84 than in the region between the underside of the housing insert 72 and the upperside of the bearing plate 70. As a consequence, there tends to be a flow of cleaned gas downwards through the drain holes 168. This fluid flow tends to push separated oil droplets along the annular ditch 166 and downwards through the drain holes 168 onto the bearing plate 70 below. This gas fluid flow is indicated by arrow 188 (see FIG. 8 in particular). The gas fluid flow moves radially inwardly across the upper surface of the bearing plate 70 towards the central circular aperture in the housing insert 72. This flow across the bearing plate 70 tends to push separated oil droplets across the bearing plate 70 towards the bottom bearing unit 90, through which said oil droplets pass. The rotating fan blades 140 of the combined fan and turbine units 88 tend to lower the static pressure in the turbine casing 178 in the region of the bottom bearing unit 90. In turn, this assists in drawing oil droplets through the bottom bearing unit 90. However, the principal means by which oil droplets are drawn from through the bottom bearing unit 90 is provided by the deflector washer 139 which, in use, rotates with the turbine unit relative to the bearing plate 70 and pumps oil from the rotor housing 4, even if the pressure within the turbine housing is greater than that in the rotor housing. The fan blades 140 then throw said droplets outwardly into the turbine casing 178 from where they may be returned to the engine crank casing. Meanwhile, the gaseous fluid flowing across the bearing plate 70 is drawn upwardly through the central aperture of the insert housing 72 and exits the rotor housing 4 by means of the housing insert outlet 150 and the rotor housing outlet 10.

It will also be appreciated with reference to the accompanying drawings that, as well as flowing through the drain holes 168, some of the cleaned gas flows to the outlet 150,10 via an alternative route between the end plate 86 and the upper part of the ditch portion 154 (without flowing into the ditch 166). This alternative route is indicated by arrow 190.

It will be appreciated that the flow of oil through the bottom bearing unit 90 has a beneficial lubricating effect on the bearing unit. The top bearing unit 50 is similarly lubricated by an oil mist which naturally occurs in the turbine casing 178 and which is transported upwards to the top bearing unit 50 through the longitudinal flow path 92 extending through the rotary shaft 78.

Although the prior art separator 2 has proven to operate effectively, there are a number of problems associated with the separator which have been addressed with improvement found in the modified separators described hereinafter. These problems can be considered in three broad categories.

Firstly, the fluid pathways through the separator 2 give rise to pressure loses which adversely affect the flow capacity of the separator and, consequently, the size of engine with which the separator can be used. A first category of problem associated with the prior art ALFDEX™ separator may therefore be regarded as relating to pressure losses in the fluid flow pathways.

Secondly, the arrangement of the prior art separator is such that, under certain conditions, cleaned gas can become contaminated before leaving the separator. Accordingly, a second category of problem associated with the prior art separator may be regarded as relating to an undesirable oil contamination of cleaned gas.

Thirdly, certain manufacturing techniques and construction features associated with the prior art separator can lead to assembly difficulties and/or reliability problems. As such, a third category of problem associated with the prior art separator may be regarded as relating to the manufacture and reliability of the separator.

Each of these categories will now be discussed in greater detail.

Regarding the fluid flow pathways through the separator 2, there are a number of locations at which comparatively high pressure losses are experienced. Firstly, the inner corner 40 of the bend in the inlet/outlet nipples 22,28 is so sharp as to generate a separation of fluid from the interior surface of the nipple in the region immediately downstream of said inner corner 40. This separation manifests itself as re-circulating fluid flow (or eddies), which in turn results in energy/pressure losses. However, as described above in relation to FIG. 4 of the accompanying drawings, providing a large radius on the inner corner is problematic when manufacturing the inlet/outlet nipple with injection moulding or die casting techniques. As a result, the prior art separator 2 experiences pressure losses at the nipples both on fluid entry to the rotor housing 4, and on exit from the valve unit housing 12.

The inventors have also identified the six spokes 116 of the upper rotor disc 80 as a further cause of undesirable pressure losses. Specifically, it will be seen from FIGS. 5 and 6 in particular that the spokes 116 each have a rectangular cross-section which presents a sharp upper trailing edge to an incoming axial flow of vented gas when the upper rotor disc 80 is rotating in the direction of arrow 134 (see FIG. 5). The shape of the spokes 116, and in particular the sharp trailing edge 192 of each spoke, has been found to give rise to fluid separation and undesirable pressure losses. The inventors have also found that the particular configuration of the housing insert 72 gives rise to undesirable pressure losses. Specifically, during use of the separator 2, cleaned gas flows downwardly over the frusto-conical portion 156 of the housing insert 72 with a rotary motion about the central axis 64 as indicated by arrow 194 in FIG. 12. This flow of cleaned gas flows over the frusto-conical portion 156 after having flowed downwardly in a spiralling pattern along the inner surface of the cylindrical side wall of the rotor housing 4. It will be understood therefore that the cleaned gas enters the region between the frusto-conical portion 156 and the above end plate 86 from all points along the circumferential perimeter of the housing insert 72 (rather than from entering said region at one particular location). The flow path across the frusto-conical portion 156 therefore has a swirling pattern which can give rise to undesirable pressure/energy losses. Furthermore, the step 172 and walls 174,176 of the recess 170 provided in the frusto-conical portion 156 generates further areas of fluid separation and associated undesirable pressure losses.

With regard to the second category of problem relating to oil contamination, the inventors have identified a number of features of the prior art separator 2 which increase the likelihood of cleaned air becoming contaminated under certain conditions. Firstly, as previously mentioned, the flow of cleaned gas downwardly through the rotor housing 4 partly enters the ditch 166 and tends to draw separated oil droplets through the drain holes 168. If the flow rate of cleaned air is insufficiently high for the particular level of oil contamination being treated, then the oil droplets collecting in the ditch 166 can climb up the ditch portion 154 of the housing insert 72 and then flow onto the frusto-conical portion 156 of the housing insert 72 (see FIG. 10). Once oil droplets enter the region between the frusto-conical portion 156 and the end plate 86, the oil droplets inevitably exit the separator 2 contaminating the cleaned gas. The climbing of oil droplets from the ditch 166 can be a result of a low flow rate of cleaned gas which allows an undesirably high quantity of oil to collect in the ditch 166. The presence of upwardly circulating cleaned gas within the ditch 166 may also tend to draw oil droplets upwards and onto the frusto-conical portion 156 of the housing insert 72. However, a significant feature of the prior art separator 2 which allows oil droplets to climb upwardly out of the ditch 166 is the tubular outlet portion 158 (see FIG. 12). Although drain holes 168 are located either side of the outlet portion 158, it will be appreciated from FIG. 12 of the accompanying drawings that oil droplets within the ditch 166 follow a circular path along the bottom of the ditch 166 and if oil droplets do not flow through the drain hole 168 immediately upstream of the outlet portion 158, then the oil droplets will tend to follow the path indicated by arrow 196 (see FIG. 12) and flow upwardly over the outlet portion 158 and onto the frusto-conical portion 156 of the housing insert 72.

The inventors have also found that separated oil droplets may flow upwardly through the central aperture of the housing insert 72 and onto the frusto-conical portion 156 and thereby contaminate cleaned gas. This undesirable flow of separated oil tends to occur when the flow rate of cleaned gas through the drain holes 168 and upwardly through the central aperture of the housing insert 72 (as denoted by arrow 188 in FIG. 8) is relatively high. It will be understood by those skilled in the art that the high flow rate of cleaned gas results in separated oil droplets being carried upwards through the central aperture of the housing insert 72 rather than allowing the separated oil droplets to be drawn downwards through the bottom bearing unit 90 by the action of gravity and the deflecting washer 139.

The inventors have also found that excessive oil can be introduced into the separator disc stack 84 via the longitudinal flow path 92 through the rotary shaft 78, as denoted by the arrow 198 shown in FIG. 2. During ordinary operating conditions, the jet of oil driving the turbine wheel 136 impacts on said wheel and generates a mist of fine oil droplets. This mist of oil is transported upwards to the top bearing unit 50 and then downwardly through the stack of separator discs 82. Ordinarily, the quantity of oil transported in this way is sufficient to lubricate the top bearing unit 50 whilst being subsequently readily separated from the incoming flow of gas by the separator disc stack 84. However, in certain circumstances, the quantity of oil transported through the rotary shaft 78 can be so great as to result in oil overflowing the ditch 166 or otherwise flowing onto the frusto-conical portion 156 of the housing insert 72 and subsequently into the cleaned gas outlet 10. This can occur when, for example, the separator 2 is tilted and the lower end of the rotary shaft 78 is directly exposed to the surface of an oil reservoir held within the turbine casing 178.

Regarding the third category of problem relating to difficulties with manufacture and reliability, the inventors have identified the following issues with the prior art separator 2.

Firstly, with regard to manufacturing the separator 2, the inventors have found that the use of threaded fasteners 32 to secure an inlet/outlet nipple to the rotor housing 4 and valve unit housing 12 can be time consuming, and requires an O-ring seal 36.

The length of time taken to manufacture the prior art separator 2 is also affected by the need for the top bearing unit 50 to be axially aligned with the bottom bearing unit 90 in such a way that both bearing units 50,90 are rotatable about the same axis 64. Specifically, the rotor housing 4 is made from a plastics material by means of an injection moulding process and the inventors have found that there is a tendency for the rotor housing 4 to warp during cooling. As a consequence of this warping, the position of the first cylindrical wall 60 of the rotor housing 4 (which laterally locates the top bearing unit 50) tends to locate in a different lateral position relative to the lower end of the rotor housing 4 than was intended. As a result, the bearing plate 70 (and, accordingly, the bottom bearing unit 90) can become laterally offset from its intended position. This problem can be mitigated by allowing the rotor housing 4 to cool over a comparatively long period following the injection moulding process. This long cooling period reduces the warping of the rotor housing 4, but increases the manufacturing time.

A further problem associated with the assembly of the separator 2 relates to the interface between various components, such as that between the rotor housing 4 and the valve unit housing 12. More specifically, if the separator 2 is to be provided with a different valve unit 14 to that originally intended (or indeed without a valve unit), then a different rotor housing 4 must also be used in order to ensure the correct interface with the new valve unit (or other pipe system where no valve unit is to be used). This can unduly increase costs and assembly times. Furthermore, the asymmetry of the rotor housing 4 (caused by the moulding profile provided on said housing 4 for interfacing with the valve unit housing 12) tends to result in a warping of said housing 4 during manufacture and this in turn tends to result in problems during assembly (for example, problems relating to the misalignment of components).

It has also been identified by the inventors that the large O-ring seal 160 provided on the housing insert 72 can fail. More specifically, the O-ring seal is required to seal against two mating large diameter surfaces, one surface being provided on the housing insert 72 and one surface being provided on the cylindrical wall of the rotor housing 4. Both the rotor housing 4 and the housing insert 72 have relatively large manufacturing tolerances which can result in the O-ring seal 160 not correctly sealing the two components. Furthermore, since the two components are manufactured from a plastics material using injection moulding techniques, each moulding (and particularly the moulding of the rotor housing 4) are subject to warping following the injection moulding process. This can further result in the O-ring seal 160 failing to correctly seal the two components 4,72. It will be understood that, if the O-ring seal 160 fails, then separated oil will leak into the region 200 between the outer cylindrical skirt portion 152 of the housing insert 72 and the cylindrical wall of the rotor housing 4. Oil leaking into this region 200 will ultimately pass into the outlet 150 of the housing insert 72 and contaminate cleaned gas. If the O-ring seal 160 fails in the locality of the outlet 150, then separated oil will tend to leak past the O-ring seal 160 and directly enter the outlet 150. This sealing problem can increase the manufacturing time when: (i) action is taken to reduce the warping effect (by increasing the cooling time following the injection moulding process), or (ii) leaking components are replaced following product testing.

In addition, a moulding burr located in the recess 159 receiving the O-ring seal 160 can result in the O-ring seal failing.

The inventors have also identified a reliability issue associated with the arrangement for locating the separator discs 82 in a fixed angular orientation relative to the rotary shaft 78. As explained above in relation to FIG. 7 of the accompanying drawings, the separator discs 82 are prevented from rotating relative to the rotary shaft 78 by means of six splines (fixed to the rotary shaft 78) engaging with a hexagonal aperture in the hub 120 or each separator disc 82. However, vibrations to which a separator is typically exposed during use (such as engine vibrations) can cause a wearing of the interface between the splines 122 and the hexagonal aperture in the hub 120. This wear can result in significant relative rotary movement between the separator discs 82 and the rotary shafts 78. Indeed, the inventors have found that adjacent separator discs 82 can rotate relatively to one another to such an extent that the caulks 100 become misaligned allowing the space between adjacent separator discs 82 to close. If this occurs with a significant number of discs 82, then the depth of the separator disc stack 84 can reduce to such an extent that the hub 98 of the end plate 86 is pressed by the compression spring 96 against the upper rotor disc hub 114. It will be understood that the end plate 86 is then no longer capable of transmitting a compression force to the separator disc stack 84 and, as a consequence, individual separator discs 82 will be free to move axially up and down along the rotary shaft 78 (as well as rotate relative to the rotary shaft 78). This movement is highly undesirable and significantly reduces the separating performance of the separator disc stack 84.

A further reliability issue identified by the inventors relates to fretting corrosion at the interfaces between (i) the rotary shaft 78 and the top/bottom bearing units 50,90; and (ii) the rotary shaft 78 and the first compression spring 96. It will be understood by those skilled in the art that fretting corrosion occurs when relative movement between components is possible (for example, due to a relatively loose fit between said components). The rotary shaft 78 extends through the top and bottom bearing units 50,90 and the first compression spring 96 with a relatively loose fit. This allows an axial preload to be applied to the top and bottom bearing units 50,90 by the first and second compression springs 96,130. Specifically, it will be understood from the drawings that the first compression spring 96 applies an axial force to the bottom bearing unit 90, and the second compression spring 130 applies an axial force to the top bearing unit 130. The loose fit of the rotary shaft 78 with the top/bottom bearing units 50,90 and the first compression spring 96 allows vibratory movements between the components. This, in turn, gives rise to fretting corrosion on said components. The relative movements between the components can also allow an ingress of hard particles between said components which can further accelerate wear and lead to reliability problems.

Improved separators developed by the inventors to address the above problems will now be described with reference to FIGS. 13 to 41.

Those skilled in the art will immediately understand from the accompanying drawings that the improved separators developed by the inventors have many components that are similar or identical to the prior art separator 2 in terms of the function they perform and their general configuration. Such components will be described hereinafter in the context of the improved separators by using the same reference numerals as has been used above in relation to the prior art separator 2. For example, with reference to FIG. 13 of the accompanying drawings, a skilled person will understand that the improved separator 2' shown in this Figure comprises a generally cylindrical rotor housing 4' which corresponds to the rotor housing 4 of the prior art separator 2 and performs a similar function. Structural and functional differences between such corresponding components will be evident to the skilled person from the accompanying drawings, however these will, in general, be discussed in detail when the differences are of significance in addressing problems with, and providing improvements over, the prior art separator 2 or the process of manufacturing the prior art separator 2.

It will be understood by those skilled in the art that the improved separator 2' comprises a generally cylindrically shaped rotor housing 4' and a number of internal components which function to separate oil from vented gas directed into said rotor housing 4'. As described below, some of the internal components are located within the rotor housing 4', whilst other internal components (for example, a combined fan and turbine unit) are located exteriorly of the rotor housing 4' but are nevertheless located in another housing (for example, a turbine casing).

An upper end of the cylindrical housing 4' is provided with an upstanding annular shoulder 6', which defines a fluid inlet 8' to the improved separator 2'. Gas vented from a crank casing, and requiring the removal of oil therefrom, enters the separator 2' via the fluid inlet 8'.

Figure 13:
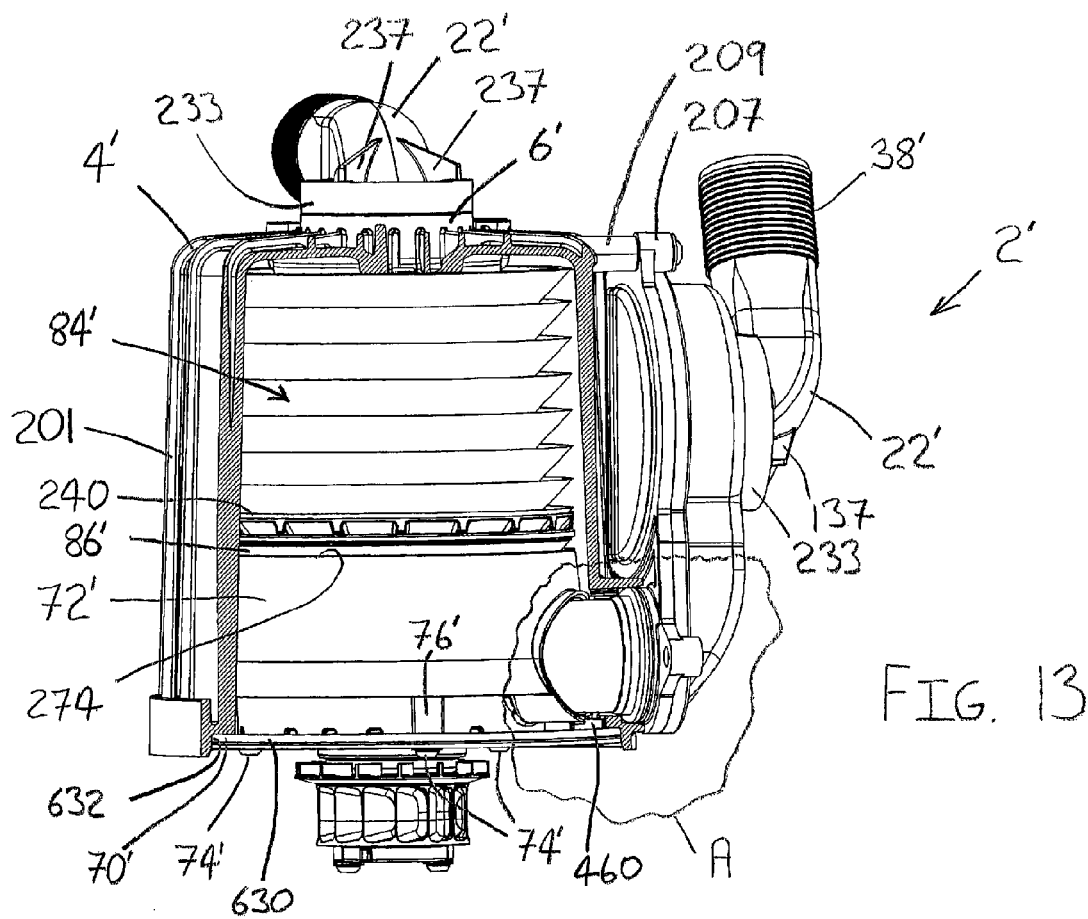
FIG. 13 is a perspective side view of a first separator according to the present invention, wherein a housing of the separator is shown in cross-section so as to illustrate a rotor assembly and housing insert located within said housing.
Figure 14:
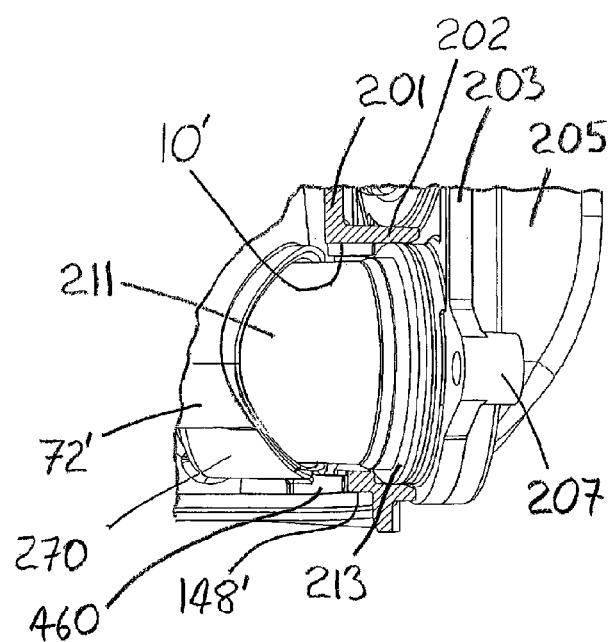
FIG. 14 is an enlarged view of the area encircled by line A shown in FIG. 13.
Figure 15:
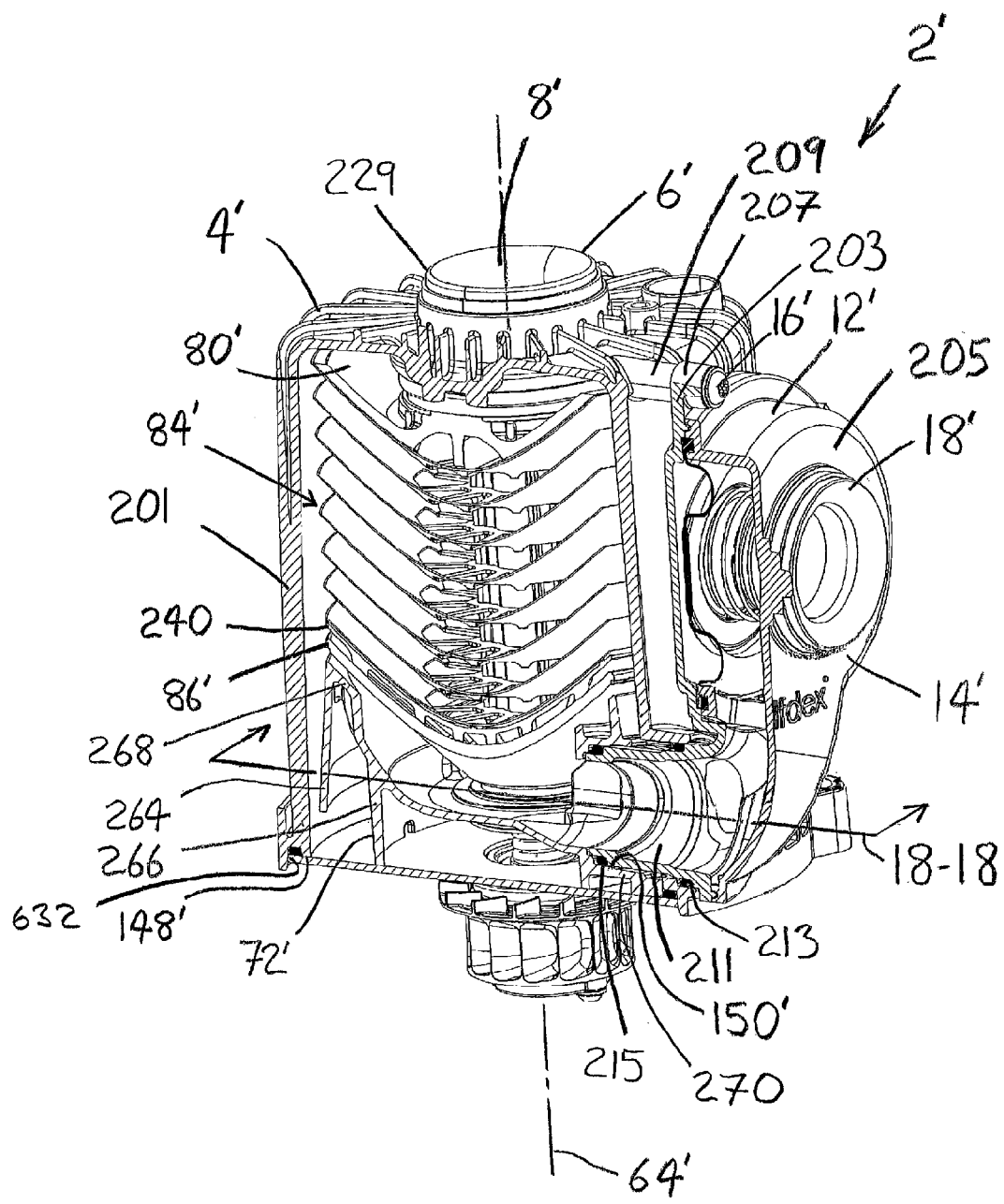
FIG. 15 is a cross-sectional perspective side view of the first embodiment of the present invention as shown in FIG. 13.

An aperture 10' in a cylindrical wall 201 of the rotor housing 4' provides an outlet through which cleaned gas passes from the interior of the rotor housing 4' into a separate housing 12' of a valve unit 14' (see FIGS. 13, 14 and 15 in particular). The outlet aperture 10' extends through, and is therefore surrounded by, a cylindrical boss 202 which itself extends from the outer surface of the rotor housing 4'.

The valve unit 14' comprises a valve arrangement for controlling the flow of cleaned gas from the separator 2'. As for the above description of the prior art separator 2, detail of the operation of the valve unit 14' will not be described herein. A skilled person will, however, be familiar with the functional operation of a valve unit for use with the improved separator.

As will be evident from FIGS. 13 and 14, and in particular from FIG. 15, the internal components of the valve unit 14' are entirely enclosed in a housing 12' that is discrete from the rotor housing 4'. More specifically, the valve unit housing 12' comprises first and second parts 203,205 which mate with one another to form a sealed enclosed space in which the internal components of the valve unit 14' are arranged. With reference to FIG. 15, it will be seen that an upper end of the first part 203 of the valve unit housing 12' is provided with a boss 207 through which a conventional screw threaded fastening 16' extends for screw threaded engagement with a further boss 209 on the rotor housing 4'.

It will also be seen from FIG. 15 that a lower end of the first part 203 of the valve unit housing 12' is provided with a generally cylindrical portion 211 which extends away from the valve unit housing 12' and into the interior of the rotor housing 4' via the outlet aperture 10' in the rotor housing 4'. An O-ring seal 213 is located on an exterior surface of the cylindrical portion 211 and abuts against a shoulder (defined on said surface) which faces the interior of the rotor housing 4' in the assembled separator 2'. The shoulder thereby prevents an undesirable movement of the O-ring seal 213 along the cylindrical portion 211 as said portion 211 is pushed through the outlet aperture 10' during assembly and the O-ring seal 213 engages with said aperture 10'. More specifically, the O-ring seal 213 sealingly engages with the interior cylindrical surface of the boss 202 surrounding the outlet aperture 10'.

Whilst the O-ring seal 213 is provided towards the root end of the cylindrical portion 211 (i.e. the end of the cylindrical portion adjacent the remainder of the valve unit housing), a second O-ring seal 215 is provided on the exterior surface of a free end of the cylindrical portion 211 (distal to the root end). As in the case of the first O-ring seal 213, the second O-ring seal 215 abuts against a shoulder facing the interior of the rotor housing 4' so as to prevent an undesirable movement of the second O-ring seal 215 as said seal is pressed into a final use position in the assembled separator 2'. More specifically, it will be understood from FIG. 15 that, in the assembled separator 2', the second O-ring seal 215 sealingly engages with the outlet 150' of a housing insert 72'.

It will also be understood by the skilled person that the first O-ring seal 213 prevents cleaned gas and/or oil droplets from leaking between the rotor housing 4' and the valve unit housing 12' and from thereby undesirably leaking from the separator 2' into the environment. It will be yet further understood by the skilled person that the second O-ring seal 215 prevents oil droplets from leaking into the outlet 150' of the housing insert 72' and thereby contaminating cleaned gas exiting the rotor housing 4' via the cylindrical portion 211. The small external diameter of the cylindrical portion 211 and of the first and second O-ring seals 213,215 (as compared with the large diameter O-ring seal 160 of the prior art separator 2) allows the use of comparatively small manufacturing tolerances which ensures a low failure rate in respect of the two O-ring seals 213,215. In this regard, it will be appreciated, for example, that the extent of warping in the relatively small diameter cylindrical portion 211 will be less than in the relatively large diameter rotor housing 4 of the prior art separator 2.

The lower end of the first part 203 of the valve unit housing 12' is provided with a second boss 207 located to one side of the cylindrical portion 211. As in the case of the first boss 207 provided on the upper end of the first part 203, the second boss 207 on the lower end of the first part 203 receives a conventional screw threaded fastening 16' for screw threaded engagement with a second boss 209 provided on a lower end of the rotor housing 4' (see FIG. 18 in respect of said second bosses 207,209).

As a consequence of the valve unit housing 12' being a discrete housing to the rotor housing 4' and being geometrically independent thereof (other than for the mating of the cylindrical portion 211 with the outlet aperture 10' and the interfacing of the upper and lower pairs of bosses 207,209), the rotor housing 4' of the improved separator 2' has an overall shape which approximates that of a cylinder more closely than the rotor housing 4 of the prior art separator 2. In this regard, it is noted that the prior art rotor housing 4 comprises a relatively complex and bulky moulding profile on one side which serves to form part of the prior art valve unit housing 12 (rather than merely a mating interface therewith). However, with reference to FIG. 15, it will be seen that the rotor housing 4' of the improved separator 2' does not comprise the aforementioned complex and bulky moulding profile.

As a consequence of the rotor housing 4' having a shape approximating that of the cylinder, the housing 4' may be manufactured using injection moulding techniques with a reduced amount of warping during the cooling process as compared with the housing 4 of the prior art separator 2. This allows for a more ready axial alignment of top and bottom bearing units 50',90'. Furthermore, it will be appreciated that the rotor housing 4' shown in the accompanying drawings may be coupled with alternative valve units to the valve unit 14' shown in the accompanying drawings provided the alternative valve units have a cylindrical portion 211 suitable for mating with the outlet aperture 10' of the rotor housing 4' and bosses 207 suitable for mating with the bosses 209 of the rotor housing 4' (as in the case of the valve unit housing 12' shown in FIG. 15). For example, if an alternative valve unit has a housing with a cylindrical portion and two bosses identical to the cylindrical portion 211 and bosses 207 shown in FIG. 15, and with the same relative positioning as shown in FIG. 15, then the alternative housing may be considerably larger than the valve unit housing 12' shown in FIG. 15 and house an entirely different internal valve arrangement to that of the valve unit 14' shown in the accompanying drawings. This allows for a modular construction of a separator 2' with an increased commonality of parts between different arrangements of separator.

With reference to FIG. 15, it will be seen that the housing 12' of the valve unit 14' is provided with an upstanding annular shoulder 18' that defines a fluid outlet through which cleaned gas passes from the separator 2'. The annular shoulder 18' provided on the valve unit housing 12' is substantially identical to the annular shoulder 6' provided on the rotor housing 4'. Due to their similarity, the inlet and outlet shoulders 6,18 may interchangeably receive inlet/outlet nipples having the same interface profile. Identical inlet/outlet nipples 22' having a 90° bend are shown in FIG. 13. The inlet nipple 22' is shown, in cross-section, mated with the shoulder 6' of the rotor housing 4', and is further shown separated from said shoulder 6' in FIG. 17.

Figure 16:
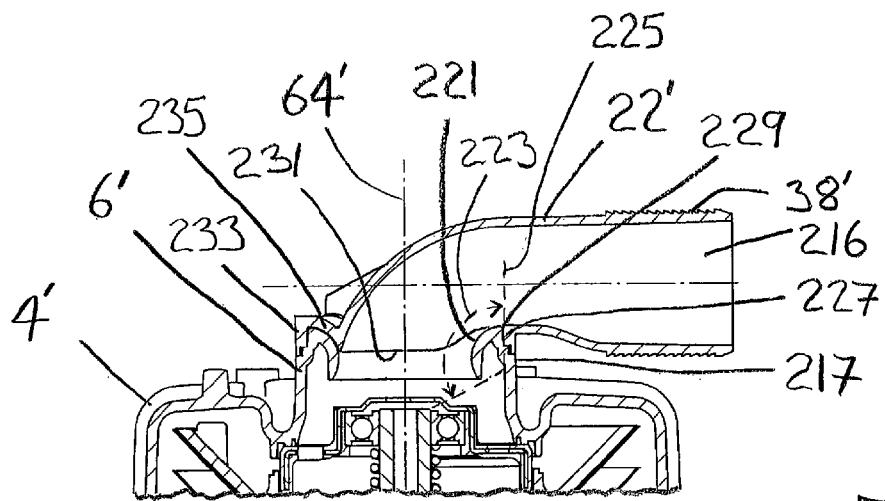
FIG. 16 is a cross-sectional side view of an inlet nipple connected to an inlet in the first embodiment.

As will be most clearly seen from the cross-sectional side view of FIG. 16, the internal surface 216 of the nipple 22' combines with a curved surface of the shoulder 6' to define a fluid flow path having a 90° bend and, significantly, with a radius both on the outer and inner corners. As a result, the tendency for fluid to separate from the inner corner of the bend is much reduced as compared with the fluid flow over the sharp corner 40 of the prior art arrangement. In turn, pressure losses are also reduced.

The interface between the inlet/outlet nipples 22' and the respective housing shoulders 6',18' will now be described in more detail with reference to the rotor housing shoulder 6' (which is identical to the shoulder 18' of the valve unit housing 12').

Figure 17:
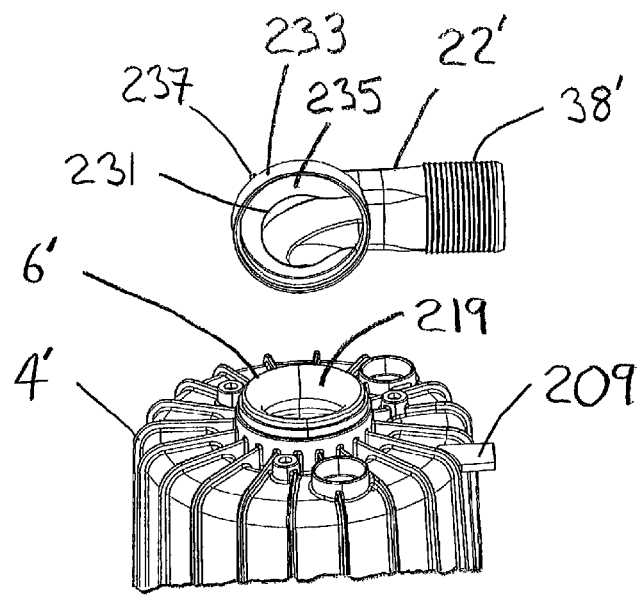
FIG. 17 is a perspective view of the inlet nipple and inlet of FIG. 16 separated from one another.

As shown in FIGS. 16 and 17, the upstanding shoulder 6' of the rotor housing 4' is provided as an annular boss having a generally cylindrical wall 217 centred on a longitudinal axis coincident with a central axis 64' of the rotor housing 4'. A free end of the cylindrical wall 217 (distal to the remainder of the rotor housing 4') is provided with a circumferential lip 219 forming a curved surface 221 extending inwardly into an aperture formed by the shoulder 6'. In cross-section (see FIG. 16), the curved surface 221 has a part-circular shape and extends through an arc 223 of approximately 110°. The part-circular surface 221 is oriented so that a radial 225 of said surface 221 extends parallel with the longitudinal axis of the cylindrical wall 217. In the particular arrangement shown in FIG. 16, the arc 223, through which the part-circular surface 221 sweeps, terminates at the aforementioned radial 225. It will also be understood from the cross-sectional side view of FIG. 16 that an exterior cylindrical surface 227 of the shoulder 6' is coincident with said radial 225 and intersects with the part-circular surface 221 to form an upper edge 229 of the shoulder 6'.

Again, with reference to FIG. 16 in particular, that the nipple 22' will be understood to be provided with a profile for mating with the shoulder 6' such that the internal surface 216 of the nipple 22' combines with the part-circular surface 221 of the shoulder 6' to provide a smooth surface absent of ridges, upstream/downstream facing shoulders, discontinuities, and/or any other features which generate pressure losses. More specifically, the geometry of the nipple 22' is such that the transition from the interior surface 216 of the nipple 22' to the part-circular surface 221 of the shoulder 6' does not present a flow of fluid over the combined surface (in either direction through the nipple 22') with an obstruction or other pressure loss generating feature. Given the symmetry of the shoulder 6', this remains the case regardless of the angular or polar positioning of the nipple 22' relative to the housing 4'.

The smooth transition between the interior surface of the nipple 22' and the part-circular surface 221 is achieved in the arrangement of the improved separator 2' by configuring the internal surface of the nipple 22' so that, at each point where the internal nipple surface 216 meets the part-circular surface 221, the internal nipple surface 216 is oriented at a tangent to the part-circular surface 221. Accordingly, with regard to the inner corner of the bend formed by the nipple/shoulder combination, the internal nipple surface 216 meets with the part-circular surface 221 at the aforementioned edge 229 of the shoulder 6' and, at this meeting point, is oriented perpendicularly to the aforementioned radial 225 (i.e. tangentially to the part-circular surface 221). The point at which the internal nipple surface 216 meets the part-circular surface 221 of the shoulder 6' moves progressively radially inwards over the part-circular surface 221 as one progresses circumferentially around the shoulder 6' to the outer corner of the bend formed by the nipple/shoulder combination. The internal nipple surface 216 can be seen in FIG. 16 meeting with the part-circular surface 221 at an edge 231 of the internal nipple surface 216.

In practice, due to the limitations of injection moulding techniques and the cost constraints associated with high tolerances, the transition between the part-circular surface 221 and the internal nipple surface 216 will not necessarily be entirely free of discontinuities or other pressure loss generating features. In particular, there can be a gap between the edge 231 of the nipple 22' and the part-circular surface 221 of the shoulder 6'. This gap can be reduced in practice by manufacturing one or both of the nipple 22' and part-circular surface 221 from steel (or other metallic material) with die casting techniques.

The nipple 22' is further provided with a generally cylindrical shoulder in the form of a cylindrical wall 233 which has internal and external diameters equal to that of the cylindrical wall 217 of the housing shoulder 6'. The cylindrical wall 233 of the nipple 22' mates concentrically with the cylindrical wall 217 of the housing shoulder 6' when the nipple 22' is located on said shoulder 6'. A curved wall 235 extends radially outwardly from the aforementioned internal nipple surface edge 231 to an upper edge of the nipple cylindrical wall 233. In cross-section, the curved wall 235 is part-circular in shape and configured to be concentric with, and to abut, the part-circular surface 221 of the housing shoulder 6'.

Two fins 237 are located on the exterior of the nipple 22' and extend from the curved wall 235 so as to provide said wall 235 with additional rigidity and to prevent or reduce a flexing of the nipple 22' between said wall 235 and the remainder of the nipple 22' (see FIG. 13).

Figure 34:
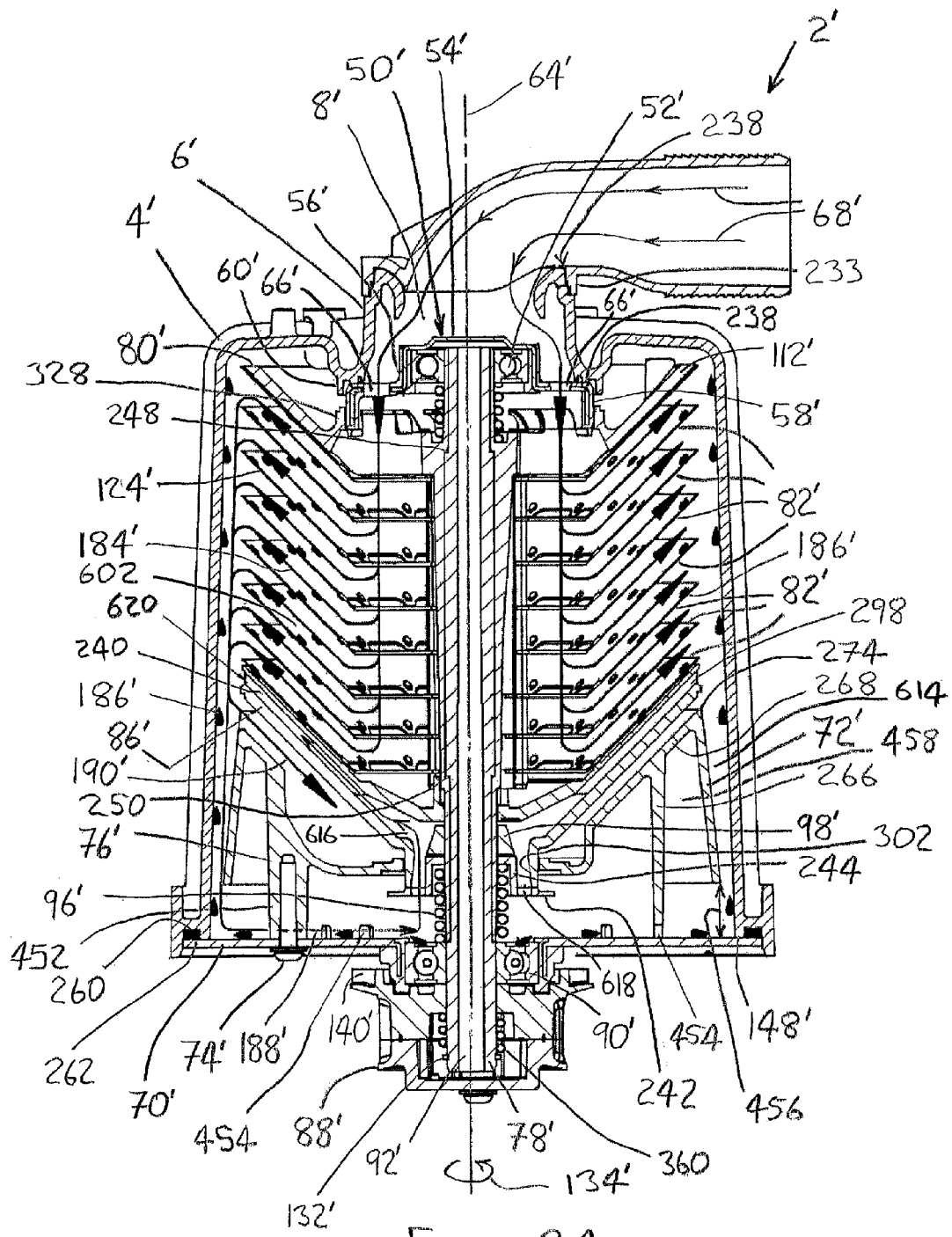
FIG. 34 is an enlarged cross-sectional side view of the first embodiment shown in FIG. 13, wherein the flow paths of gas and separated oil droplets through the separator are illustrated.

As in the prior art separator 2, the nipple 22' of the improved separator 2' is manufactured using conventional injection moulding or die-casting techniques with the consequence that a sharp inner corner 239 is formed (see FIG. 34). This corner 239 may be considered analogous to the inner corner 40 of the prior art nipple 22. However, it will be understood that the presence of the part-circular surface 221 of the housing shoulder 6' in combination with the improved nipple 22' ensures a radius is provided to the inner part of the flow path bend at the housing 4'. As alluded to above, this is irrespective of the angular orientation of the nipple 22' relative to the housing 4'. Fluid separation from the inner surface of the bend is thereby reduced or avoided, and pressure losses in this part of the flow path are similarly reduced or avoided.

Finally, with regard to the geometry of the nipple 22', a second end of said nipple (distal to the end provided with the housing interface profile) is provided with teeth or serrations 38' on an exterior surface thereof for gripping a hose which, in use, is located over the nipple second end.

It is again emphasised that the rotary housing shoulder 6' is identical to the shoulder 18' on the valve unit housing 12' and that an outlet nipple 22' is connected to this second housing shoulder 18' in the same way as described above in relation to the rotor housing shoulder 6'.

It will be understood from the above that the nipple 22' may be rotated unimpeded whilst positioned on and in abutment with the shoulder 6' as shown in FIG. 16. As such, the nipple 22' may be spun welded to the shoulder 6' so as to fixedly secure the nipple 22' to the housing in a required angular orientation. It will be appreciated by those skilled in the art that this method of securing the nipple 22' does not require the use of threaded fasteners as in the prior art separator 2. It will also be understood that this spin welding technique allows the nipple 22' to be secured in any angular orientation relative to the housing 4' and provides a full circumferential (or closed loop) seal without the need of an O-ring seal. Specifically, heat produced by friction forces acting between abutting surfaces of the housing 4' (i.e. the shoulder 6') and the nipple 22' during relative rotation of said surfaces results in said surfaces melting. Rotation is then stopped and said surfaces solidify, thereby bonding to one another.

Whilst the above spin welding is an effective method of bonding the material of the nipple 22' to that of the housing 4'; other methods of bonding said materials may be used (for example, adhesive bonding, ultrasonic welding or vibration welding).

The aforementioned internal components will now be described in greater detail with particular reference to FIG. 34.

Firstly, a top bearing unit 50' is secured to an inner surface of the rotor housing 4' immediately downstream of the fluid inlet 8'. The top bearing unit 50' is identical to the top bearing unit 50 of the prior art separator 2 and, as such, comprises caged bearings 52' trapped between an upper steel cap member 54' and a lower bearings seat member 56' of a plastics material. The top bearing unit 50' (and also a bottom bearing unit 90') comprise roller bearings (as in the prior art separator 2), but may alternatively comprise slide or friction bearings.

More specifically, the bearings seat member 56' has a circular shape and a downwardly projecting cylindrical wall 58' (encasing a lower part of the cap member 54') which, in the assembled separator 2', locates within (but without abutting laterally against) a cylindrical wall 60' of the rotor housing 4'. The cylindrical wall 60' extends downwardly from an upper internal surface of the rotor housing 4'. A circular ridge 238 also extends downwardly from an upper internal surface of the rotor housing 4' and is positioned radially inwardly of the first cylindrical wall 60'. The cylindrical wall 60', circular ridge 238 and aforementioned shoulder 6' of the rotor housing 4' are positioned concentrically with one another and are centred on the central axis 64' of the rotor housing 4'.

As will be described in greater detail below (with reference to FIGS. 37 to 41), the top bearing unit 50' is secured to the upper internal surface of the rotor housing 4' by means of a spin welding technique. Specifically, the lower bearings seat member 56' is welded to the ridge 238. Threaded fasteners are not used to secure the top bearing unit 50' to the roto housing 4', as in the prior art separator 2. The arrangement is such that the rotary axis of the top bearing unit 50' is coincident with the central axis 64' of the rotor housing 4'.

Three part-circular slots 66' (only two of which are shown in FIG. 34) are provided in the top bearing unit 50' so as to allow a flow of inlet fluid therepast (as shown by arrows 68'). The upper cap member 54' deflects inlet fluid from the caged bearings 52'. As in the prior art separator 2, the underside of the uppermost part of the cap member 54' also deflects (into the caged bearings 52') a lubricating oil mist which travels upwardly through a rotor shaft during use.

The remaining internal components of the separator 2' are assembled separately to the rotor housing 4' and are then removably located, in part, within the housing 4' as a unitary assembly. As for the prior art separator 2, this unitary assembly may be considered as comprising a first group of components which, in use, remains stationary relative to the rotor housing 4', and a second group of components which, in use, rotates about the central axis 64' relative to both the rotor housing 4' (and the valve unit housing 12') and the first group of components.

The first group of components comprises an annular-shaped bearing plate 70' and a dish-shaped housing member/insert 72'. As in the prior art separator 2, the housing insert 72' and the bearing plate 70' function in combination with one another to segregate separated oil from cleaned gas prior to the separated oil and cleaned gas exiting the rotor housing 4'. The bearing plate 70' is made of steel and the housing insert 72' is made of a plastics material. The bearing plate 70' and housing insert 72' are secured to one another by means of three screw threaded fasteners 74' (see FIG. 29) which threadedly engage bosses 76' projecting downwardly from an underside of the housing insert 72'. The bearing plate 70' closes the open end of the rotor housing 4' to provide an enclosed inner space of the housing 4' in which several of the second group of components are located. In this respect, the rotor housing 4' may be regarded as a first housing part defining an inner space for receiving components for separating substances (for example, oil and gas) and directing the separated substances to different outlets from said inner space. The bearing plate 70' may be considered as a second housing part defining said inner space with the first housing part.

The first group of components will be discussed in greater detail later in this description.

The second group of components form a rotor assembly and comprises a rotary shaft 78', an upper rotor disc 80', a plurality of individual separator discs 82' which together form a stack 84' of separator discs 82', a fan disc 240, an end member/plate 86', a splash guard disc 242, and a combined fan and turbine unit 88'. The rotary shaft 78' is made of a metallic material, whilst the remainder of the aforementioned components of the second group are of a plastics material and manufactured with injection moulding techniques. The aforementioned components of the second group are secured to one another in such a way as to prevent or at least limit their rotation relative to one another. Helical compression springs (of a metallic material) are also provided in the second group of components, as will be described in greater detail below. The second group of components is rotatably mounted to the first group of components by means of a bottom bearing unit 90' and, in the assembled separator 2', is rotatably mounted to the rotor housing 4' by means of the top bearing unit 50'.

The rotor assembly formed by the second group of components will now be described in more detail.

The rotary shaft 78' has an annular cross-section so as to provide a longitudinally extending fluid flow path 92' along its entire length. In use of the separator 2', this flow path 92' allows an oil mist to be transported from a turbine casing upwardly through the rotary shaft and into the top bearing unit 50' so as to lubricate the bearings of said unit 50'. The exterior of the rotary shaft 78' is provided with a number of recesses and shoulders which assist in retaining components in the correct axial position on the rotary shaft 78'.

Each of the upper rotor disc 80', separator discs 82', fan disc 240, and end plate 86' has a frusto-conical part (defining upper and lower frusto-conical surfaces) connected to a central hub element which, in use, is located about the rotary shaft 78'.

In the case of the upper rotor disc 80', separator discs 82' and end plate 86', the frusto-conical part is connected to the associated central hub element with a plurality of spoke members extending radially inwardly therefrom. These spoke members have open spaces between them to allow for a flow of fluid axially therethrough along the rotary shaft 78'.

In the case of the fan disc 240, the frusto-conical part 290 is connected to the associated central hub element 292 by means of a second frusto-conical part 294. This second frusto-conical part 294 is continuous so as to provide a barrier to fluid and thereby prevent an axial flow of fluid along the rotary shaft 78' either upwardly past the fan disc 240 or downwardly past the fan disc 240.

Figure 26:
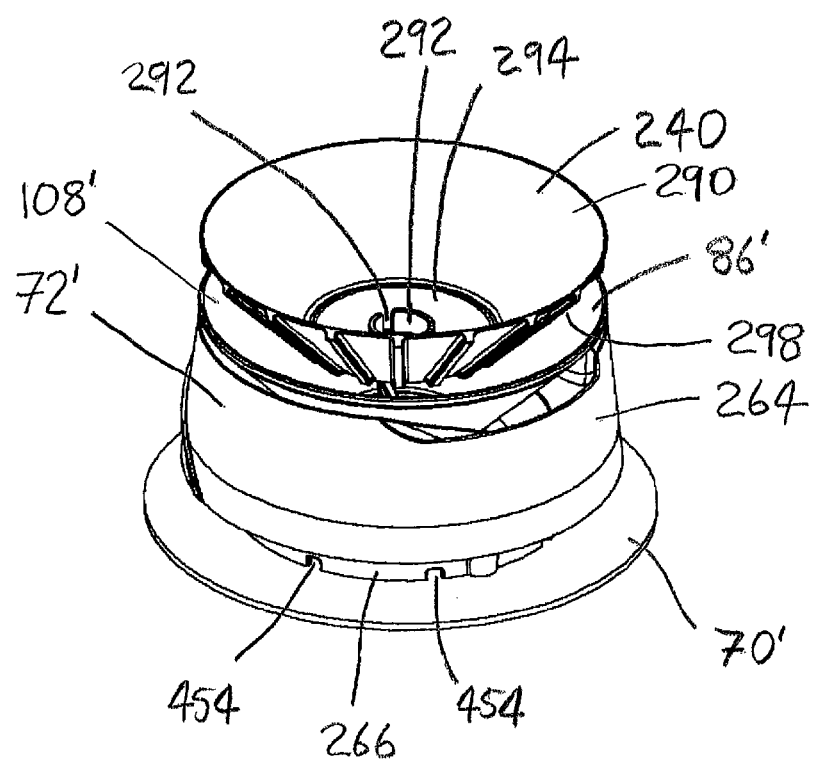
FIG. 26 is a perspective view of a fan disc and associated end plate located above a housing insert which, in turn, is located on a bearing plate of the first embodiment shown in FIG. 13.
Figure 27:
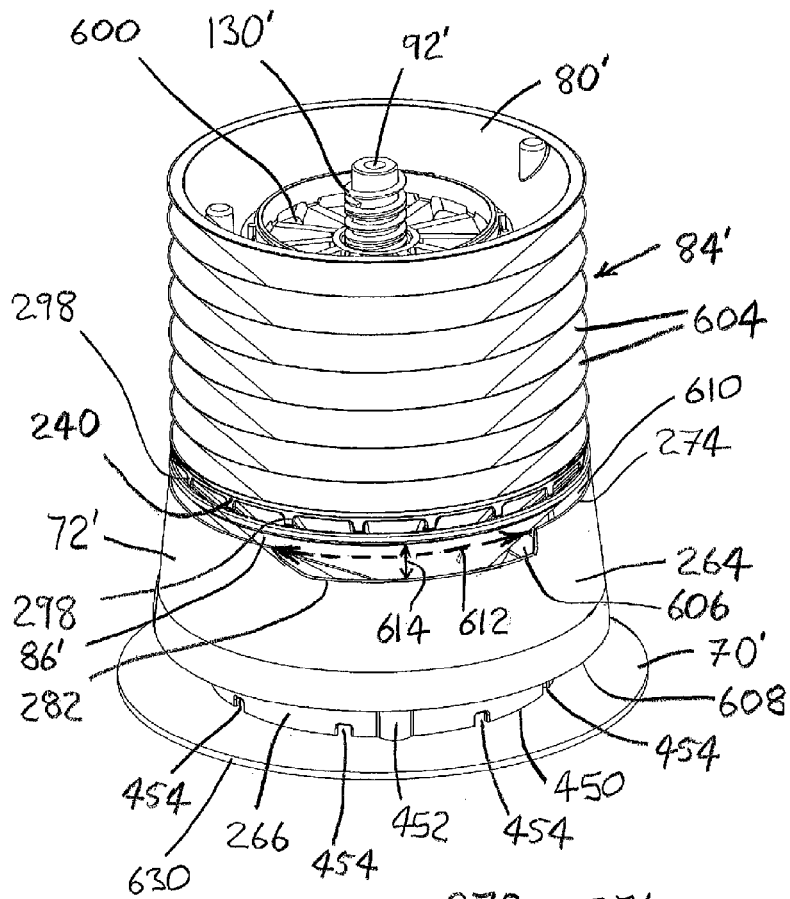
FIG. 27 is a perspective side view of a plurality of separator discs located on the rotary shaft of FIGS. 21 and 23, wherein said discs and shaft are assembled with the components shown in FIG. 26.

The frusto-conical shape of the second frusto-conical part 294 has a larger included angle than that of the other frusto-conical parts of the improved separator 2'. In other words, opposite sides of the second frusto-conical part 294 diverge/converge more rapidly than in the case of the first frusto-conical part 290 of the fan disc 240 or of the frusto-conical parts of the upper rotor disc 80', separator discs 82' and end plate 86' (and, indeed, the frusto-conical shaped segregating roof member 268 of the housing insert 72'), all of which have the same included angle. The central hub element 292 is a cylindrical wall upstanding from the second frusto-conical part 294 (see FIGS. 26 and 33 in particular). Longitudinally extending slots 296 (only one of which is shown in FIG. 26) are provided through the full thickness of the cylindrical wall of the fan hub element 292 for receiving a spline 254 extending radially from the rotary shaft 78'. In this way, rotation of the fan disc 240 relative to the rotary shaft 78' IS prevented.

The underside of the first frusto-conical part 290 of the fan disc 240 is provided with a plurality of caulk members 298 spaced equidistant about the central axis of the fan disc 240. Each caulk member 298 is provided as a straight ridge projecting downwardly from the underside of the first frusto-conical part 290 and extends in a radial direction from a radially innermost edge of the first frusto-conical part 290 to a radially outermost edge of the first frusto-conical part 290. In the assembled separator 2, the caulk members 298 abut the upper surface of the frusto-conical part of the end plate 86' and thereby ensure a spacing between the fan disc 240 and the end plate 86' through which fluid may pass (as indicated by arrow 188' in FIG. 34). During use of the separator 2', rotation of the caulk members 298 imparts a rotary motion onto fluid between the fan disc 240 and the end plate 86'. As a consequence, said fluid is moved outwards towards the cylindrical wall 201 of the rotor housing 4'. Oil droplets (and/or, indeed, other liquid or particulate contaminants carried by the gas flow) are effectively thrown against the cylindrical wall 201 of the rotary housing 4' and flow (or fall) downwardly onto the bearing plate 70'. The gaseous fluid ejected from the space between the fan disc 240 and end plate 86' either also flows downwardly onto the bearing plate 70' or directly exits the rotor housing 4' as will be explained in greater detail below.

Figure 18:
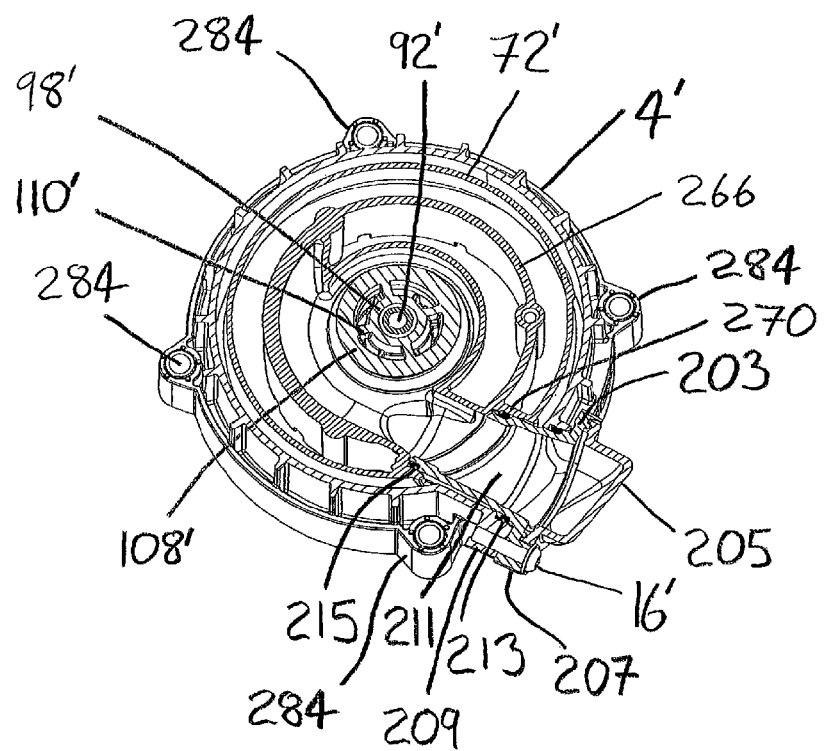
FIG. 18 is a cross-sectional perspective top view of the first embodiment of FIG. 13, wherein the cross-section is taken through a plane parallel with a bearing plate of the first embodiment and passing through the line 18-18 shown in FIG. 15.

With regard to the end plate 86', a radially innermost circular edge of the frustoconical part 108' is connected to a central hub element 98' by means of a plurality of spoke members 110' (see FIG. 18). However, a cylindrically shaped wall 300 also extends downwardly from said radially innermost edge of the frusto-conical part 108'. In the assembled separator 2', the cylindrical wall 300 is centred on the central axis 64' and extends sufficiently downwards along the rotary shaft 78' as to extend through the central aperture provided in the insert housing 72'. Although said wall 300 has a generally cylindrical shape, the inner surface 302 of said wall 300 defines a frusto-conical shape such that the internal diameter of the cylindrical wall 300 reduces in an upwards direction in the assembled separator 2'. The external cylindrical surface of the wall 300 has a diameter substantially the same as the central aperture of the housing insert 72' and, in the assembled separator 2', locates in said aperture with minimal spacing between the wall 300 and the insert housing 72'. This close fit, whilst allowing relative rotation between the end plate 86' and the insert housing 72', assists in reducing the quantity of separated oil which may flow between said wall 300 and the central aperture of the insert housing 72' so as to contaminate cleaned gas. Furthermore, the internal frusto-conical surface 302 of said wall 300 functions to resist a passage of oil droplets flowing upwards into the space between the fan disc 240 and the end plate 86'. It will be understood by those skilled in the art that oil droplets contacting the frusto-conical surface of the wall 300 will be subjected to a rotary motion and, due to the frusto-conical shape of said surface, a downwardly acting force.

Figure 28:
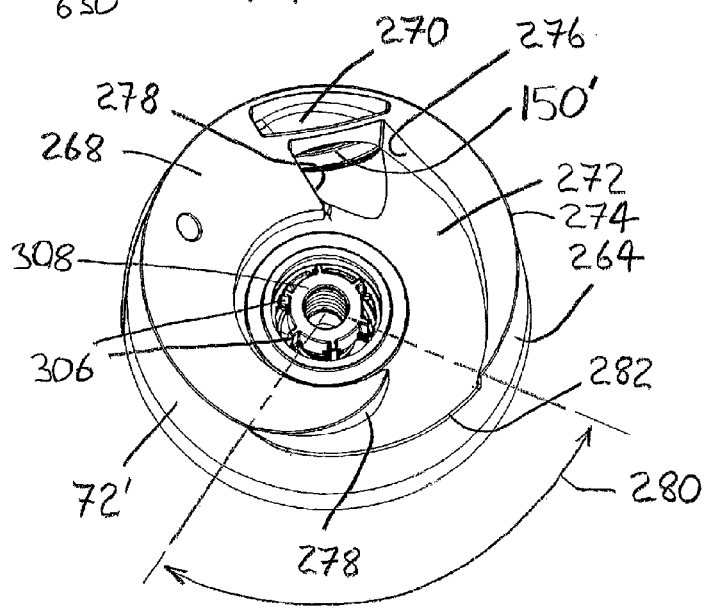
FIG. 28 is a perspective top view of a housing insert of the first embodiment shown in FIG. 13, wherein the housing insert is shown in isolation of other components except for an oil splash guard located below said insert.

The splash guard disc 242 includes a planar annular disc 304 which is connected, by means of six spoke members 306 extending radially inwardly therefrom, to a central hub element 308 which, in the assembled separator 2', is located about the rotary shaft 78' (see FIG. 28 in particular). The diameter of the central aperture defined by the planar annular disc 304 is substantially equal to the inner diameter of the lower end of the cylindrical wall 300 of the end plate 86'. A flow of fluid passing through the splash guard disc 242 into the region between the fan disc 240 and the end plate 86' is not therefore presented with a significant pressure loss generating feature at the junction between the splash guard disc 242 and the end plate 86'. It will be understood that the annular disc 304 provides a flange member extending radially from the lower end of said cylindrical wall 300 and, in use, functions to cover any spacing between the exterior surface of said cylindrical wall 300 and that part of the housing insert 72' defining the central aperture through which said wall 300 extends. In this way, the planar annular disc 304 reduces the likelihood of separated oil droplets splashing or otherwise moving upwardly from the bearing plate 70' and through the central aperture of the insert housing 72' so as contaminate cleaned gas.

It will further be appreciated that said region between the fan disc 240 and the end plate 86' defines a flow path 616 for fluid to pass through from an inlet 618 (defined by the splash guard disc 242) to an outlet 620 (defined by the radially outer perimeter edges of the fan disc 240 and the end plate 86'), as shown in FIG. 34.

The hub element 308 of the splash guard disc 242 is provided as a cylinder with an upper end thereof closed with a planar wall arranged perpendicular to the longitudinal axis of said cylinder (and, in the assembled separator 2', to the central axis 64'). The internal diameter of said cylinder is greater than the external diameter of the rotary shaft 78' and the planar wall is provided with a central aperture through which said shaft 78' passes in the assembled separator 2'. The arrangement is such that, in the assembled separator 2', the rotary shaft 78' and the cylinder of the hub element 308 define an annular space therebetween which receives a helical compression spring 96' for pressing the splash guard disc 242 into abutment with the end plate 86', which, in turn, compresses the fan disc 240 and disc stack 84' against the upper rotor disc 80'.

It will be understood by those skilled in the art that the splash guard disc 242 is manufactured separately from the end plate 86' so as to allow the cylindrical wall 300 of the end plate 86' to be located through the central aperture as the insert housing 72'. This would not be possible if the splash guard disc 242 was integral with the end plate 86' because the outer diameter of the annular disc 304 is greater than the diameter of the central aperture in the housing insert 72'.

As alluded to above, the frusto-conical geometry of the upper rotor disc 80', fan disc 240 (with respect to the first frusto-conical part thereof) and end plate 86' is substantially identical to that of the separator discs 82'. This allows the upper rotor disc 80', fan disc 240 and end plate 86' to be stacked with the separator discs 82', wherein the upper rotor disc 80' is located at the top of the separator disc stack 84' and the end plate 86' is located at the bottom of the separator disc stack 84'. The fan disc 240 is located between the end plate 86' and the separator disc 82' lowermost in (i.e. at the bottom of) the separator disc stack 84'.

Furthermore, whilst the separator discs 82' will be understood by the skilled person to be comparatively thin so as to allow a large number of discs to be provided in a relatively short stack 84', the upper rotor disc 80' and end plate 86' are considerably thicker than the separator discs 82' so as to provide rigidity at either end of the disc stack 84' and thereby allow a compressive axial force to be uniformly applied to the frusto-conical parts of the separator discs 82' by means of the upper disc 80' and end plate 86'. It will be understood that the compressive force is generated by said helical compression spring 96' which presses upwardly on the underside of a hub 308 of the splash guard disc 242. In turn, the hub 308 of the splash guide disc 242 presses upwardly on the underside of the abutting hub 98' of the end plate 86'.

Regarding the compression of the disc stack 84' between the upper disc 80' and the end plate 86', it will be understood by the skilled person that, as in the prior art separator 2, adjacent separator discs 82' within the stack 84' must remain spaced from one another in order to allow a flow of fluid through the improved separator 2'. This spacing of the separator discs 82' is provided in the improved separator 2' by means of a plurality of spacers 246. Each spacer 246 is a small dot located on, and standing proud of, the upper surface 102' of the frusto-conical part 124' of each separator disc 82' (see FIG. 20).

The separator disc 82' lowermost in the stack 84' may, optionally, also be spaced from the fan disc 240 so as to allow a flow of fluid therebetween. If such spacing is required, then suitable spacers are used. Ideally, the upper surface of the first frustoconical part of the fan disc 240 (which locates below the frusto-conical parts of the disc stack 84' and is connect to the fan disc hub by means of the second frusto-conical part of the fan disc 240) is provided with spacers 246 in the same way as the frustoconical part of each separator discs 82'.

Each of said spacers 246 has a circular shape, although other shapes may be used (for example, an oval shape may be used). Any alternative shapes for the spacers 246 preferably have curved edges so as to reduce fluid pressure losses in fluid flowing past the spacers.

A first group of spacers 246 are arranged in a circle concentric with and adjacent to an inner circular edge 104' of said upper surface 102'. Each spacer 246 in this first group is located adjacent to that part of the inner circular edge 104' where a spoke of the disc 82' joins the frusto-conical part of the disc 82'. A second group of spacers 246 are arranged in a circle concentric with and adjacent to an outer circular edge 106' of said upper surface 102'. A third group of spacers 246 are arranged in a circle concentric with and approximately midway between the inner and outer circular edges 104',106' of the frusto-conical part of the disc 82'.

As will be explained in greater detail below, each separator disc 82' (and, indeed, the fan disc 240) is locatable on the rotary shaft 78' in one of only three possible angular positions relative to the rotary shaft 78', and the positioning of the spacers 246 on said upper surface 102' is such that the spacers 246 of adjacent discs 82' must align with one another when the discs 82' are arranged in any of these three positions. In other words, when the separator discs 82' are pushed axially onto the rotary shaft 78' and into abutment with one another to form the aforementioned stack 84', it is inevitable that (i) each spacer 246 of a particular disc 82' locates directly above a spacer 246 of an adjacent disc 82' located below said particular disc 82' in the stack 84', and that (ii) each spacer 246 of a particular disc 82' locates directly below a spacer 246 of an adjacent disc 82' located above said particular disc 82' in the stack 84'. As a result, the compression force applied to the disc stack 84' by the end plate 86' is transmitted through the stack 84' by means of the aligned spacers 246 without the spacing between adjacent separator discs 82 closing. This ensures fluid remains able to flow between the separator discs 82'.

It will be appreciated from the drawings that the spacers 246 have a small radial dimension, as well as a small circumferential dimension, relative to the size (diameter) of the associated separator discs. This allows fluid to flow relatively unimpeded by the spacers in a circumferential direction across said disc upper surface 102', as well as in a radial direction across said surface 102'. This ensures pressure losses in fluid flow between adjacent discs 82' are minimised.

Figure 21:
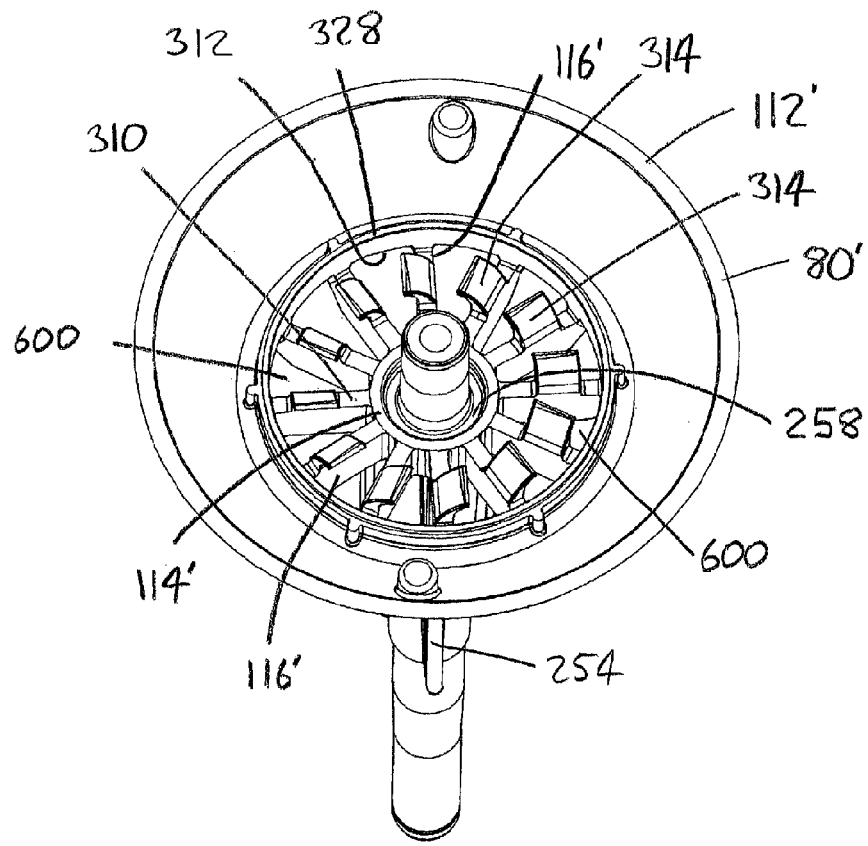
FIG. 21 is a perspective top view of an upper rotor disc and rotary shaft of the first embodiment shown in FIG. 13.
Figure 23:
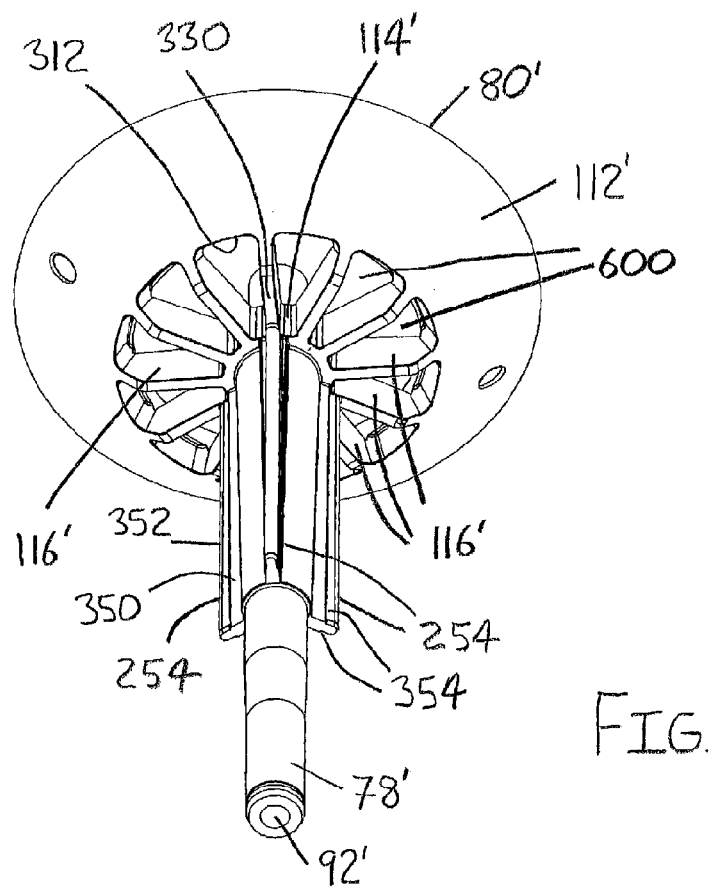
FIG. 23 is a perspective bottom view of the upper rotor disc and rotary shaft shown in FIG. 21.

The upper rotor disc 80' and rotary shaft 78' is shown in isolation from the other components of the separator 2' in FIGS. 21 and 23 of the accompanying drawings. A hub 114' of upper rotor disc 80' is moulded to the exterior surface of the rotary shaft 78' and is thereby bonded to said shaft 78'. This bonding prevents relative rotation between the hub 114' and the rotary shaft 78'.

Figure 19:
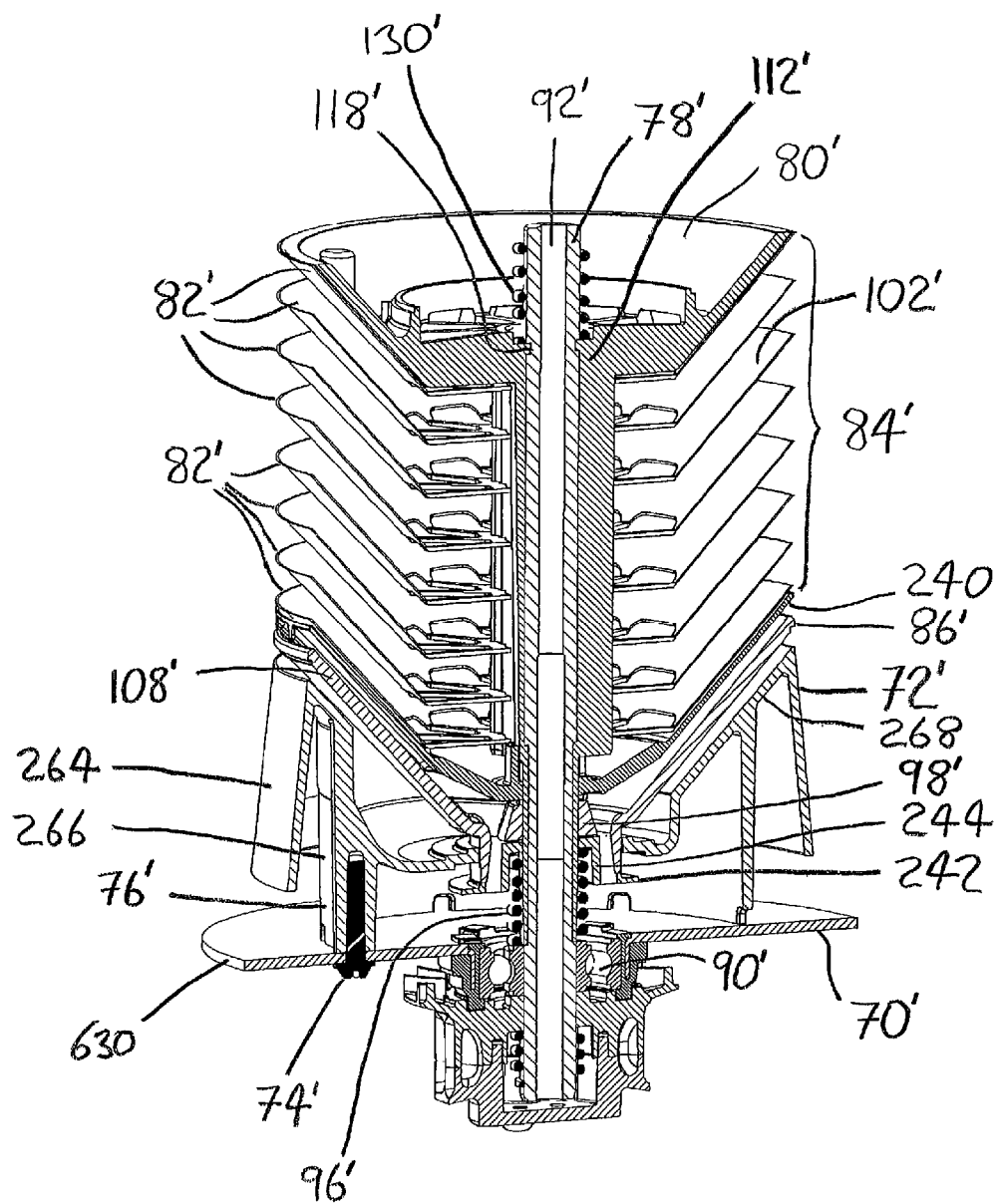
FIG. 19 is a cross-sectional perspective side view of a second embodiment, wherein the second embodiment differs from the first embodiment in that a covering of plastics material is provided on the upper end of the rotor assembly.
Figure 20:
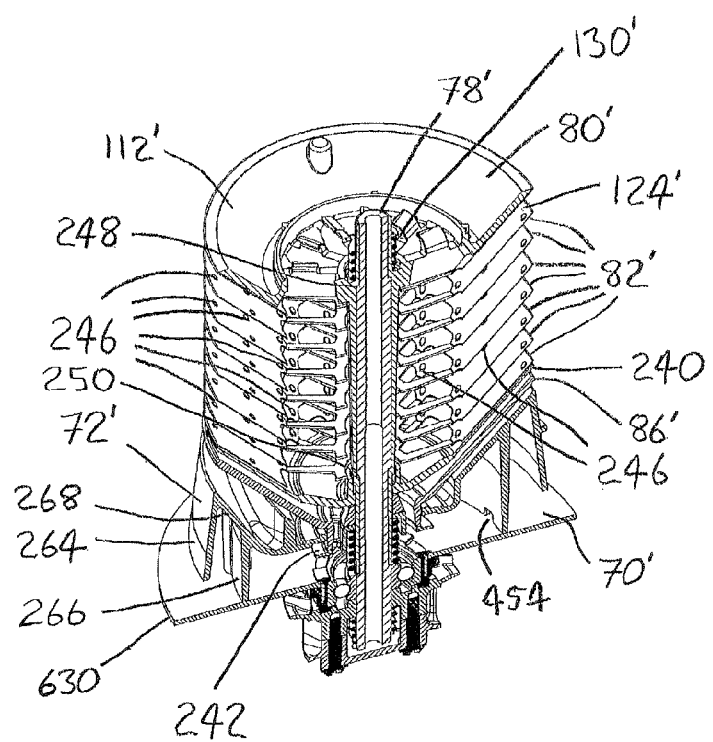
FIG. 20 is a cross-sectional perspective side view of the first embodiment shown in FIG. 13.

The hub 114' of the upper rotor disc 80' extends axially upwardly along the rotary shaft 78' and terminates at the upper end of said shaft 78'. The upper portion of the rotary shaft 78', about which a second helical compression spring 130' locates, is thereby provided with a coating (a sleeve) of a plastics material (preferably, a thermoplastics material). This coating protects the spring 130' and, in particular, the shaft 78', from fretting corrosion. The first and second groups of internal components of an alternative embodiment to the first embodiment 2' is shown in FIG. 19. The alternative separator is the same as the first embodiment other than in that the upper end portion of the rotary shaft 78' is absent of the plastics coating adjacent the second helical spring 130'.

The hub 114' of the upper rotor disc 80' also extends axially downwardly along the rotary shaft 78' and terminates at a point just above the bottom bearing unit 90'. The bottom bearing unit 90' thereby contacts a metallic end of the rotary shaft 78' in the assembled separator 2'. More specifically, the hub 114' extends along the full depth of the separator disc stack 84' and thereby separates the hub 120' of each separator disc 82' from the rotary shaft 78'. It will also be understood that the hub 114' also provides the rotary shaft 78' with a coating (a sleeve) of a plastics material (preferably, a thermoplastics material) in the region of the first helical compression spring 96'. Again, this coating protects the spring 96' and, in particular, the shaft 78', from fretting corrosion.

The frusto-conical part 112' of the upper rotor disc 80' is connected to the hub 114' by twelve radially extending spoke members 116'. Each spoke member 116' has a rectangular-shaped cross-section, an upper (minor) side 310 of which adjoins the radially innermost circular edge 312 of said frusto-conical part 112'. Each spoke member 116' extends axially downwards from said edge 312. This arrangement is such that, when the upper rotor discs 80' rotates during use of the separator 2', each spoke member 116' functions as a fan blade and imparts a motion on adjacent fluid. As will be understood by those skilled in the art, the motion imparted onto the fluid by each spoke member 116' results in the fluid flowing tangentially from the circular path of the spoke members 116' and being effectively thrown outwards beneath the frusto-conical part 112' and through the disc stack 84' towards the cylindrical wall of the rotor housing 4'. The functioning of the spoke members 116' as fan blades results in the rotation of the upper rotary disc 80' drawing gas into the rotor housing 4' through the fluid inlet 8' (as denoted by arrow 68' in FIG. 34) and through the spaces 600 between the spoke members 116', whereby said spaces 600 represent an inlet to the rotor assembly.

The fluid entering the rotor housing 4' passes through three part-circular slots 66' in the top bearing unit 50'. The spoke members 116' of the upper rotor disc 80' are located immediately below the three part-circular slots 66' in the assembled separator 2'. With particular reference to FIG. 34 of the accompanying drawings, it will be seen that the radial dimension of the part-circular slots 66' is less than the radial dimension (i.e. length) of the spoke members 116' with the result that a large proportion of the incoming fluid initially impacts only that length of spoke member 116' located directly beneath the part-circular slots 66'. This length of each spoke element 116' is provided with a curved fluid guide vane 314 extending upwardly from the upper side (or leading edge) 310 thereof. The purpose of each guide vane 314 is to reduce or eliminate pressure losses associated with a separation of inlet fluid from the spoke members 116'. This is achieved by presenting the substantially axial flow of inlet fluid into the rotor housing 4' with a guide vane having an aerodynamically shaped cross-section and a chord oriented to have a substantially zero angle of attack with the incoming flow of fluid (or another angle of attack which does not result in a separation of fluid from the guide vane 314).

Figure 22:
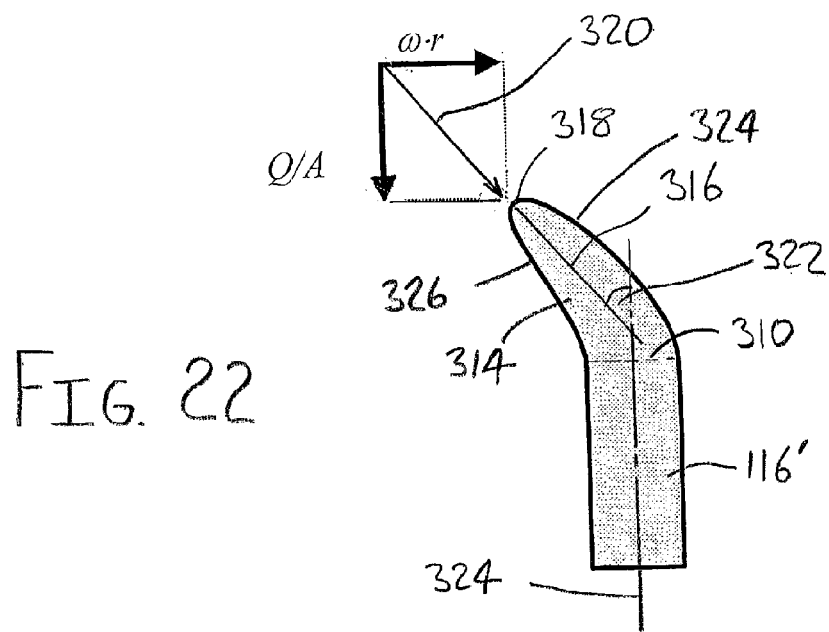
FIG. 22 is a velocity flow diagram showing the velocity of inlet fluid relative to a guide surface provided on the upper rotor disc shown in FIG. 21.

A view of a cross-section through a length of a spoke member 116' provided with a guide vane 314 is shown in FIG. 22. The surface of the guide vane 314 functions to guide fluid, which is approaching the leading edge 310 of a spoke element 116', into alignment with the spoke element 116'. A chord 316 associated with the leading edge 318 of the guide vane 314 is oriented to have a substantially zero angle of attack with the fluid flowing over said guide vane 314. The direction of this fluid relative to the guide vane 314 is denoted by arrow 320 and, as indicated in FIG. 22, will be understood to be a function of the axial velocity of (i) inlet fluid flow ($Q/A$, wherein Q is volumetric fluid flow rate through the inlet; and A is the cross-sectional area of the inlet flow path), and (ii) the tangential velocity of the guide vane 314 ($\omega \cdot r$ wherein the $\omega$ is angular velocity of the upper rotor disc; and r is the radial distance of the guide vane from the centre of rotation). Since the direction 320 of the fluid flow relative to the guide vane 314 depends on the radial position r along a guide vane 314, the chord 316 may be oriented at an angle which varies with radial position. In other words, the fluid guide vane 314 may be provided with a twist so as to ensure a correct alignment of the guide vane 314 with the incoming fluid flow at all radial positions along the guide vane 314. More specifically, the acute angle 322 between the chord 316 and a vertical datum line 324 (parallel with the central axis 64' in the assembled separator 2') may progressively increase from an inner most radial position towards an outer most radial position along a spoke member 116'.

It will be understood by the skilled person that, during use of the improved separator 2', incoming air flows axially downwardly through the three part-circular slots 66' and impacts on the guide vanes 314 which are located a short distance below said slots 66' and which rotate in a circular path about the central axis 64'. Since the chord 316 of the leading edge 318 of each guide vane 314 is oriented to have a substantially zero angle of attack to the incoming flow of fluid, said fluid flows over both the low pressure side 324 and high pressure side 326 of the guide vane 314 and is guided to flow in an axial direction relative to the spoke members 116' without separating from the guide vane 314 or associated spoke member 116'. Pressure losses incurred by fluid flowing through the upper rotor disc 80' are thereby avoided or minimised.

A further consequence of the reduction in pressure losses provided by the guide vanes 314 is that the number of spoke members 116' may be increased (as compared with the prior art separator 2) without undesirably affecting the rate of fluid flow through the separator 2' as a whole. The increased number of spoke members 116' allows for greater compression forces to be transmitted between the frusto-conical part 112' and the hub 114' of the upper rotor disc 80'. The increased number of spoke members 116' can also improve the balance of the upper rotor disc 80'.

It is to be noted that FIG. 22 represents a schematic view of the cross-section of a guide vane 314 and associated spoke member 116', and is not necessarily representative of a particularly preferred geometry or indeed of particularly preferred rotary speeds and fluid flow rates.

With reference to FIG. 21, a cylindrical rim 328 will be seen provided concentrically with, and upstanding from, the radially inner most edge 312 of the frusto-conical part 112'. In the assembled separator 2', the rim 328 locates radially outward from the downwardly projecting cylindrical wall 58' of the top bearing unit 50'. The rim 328 nevertheless locates in close proximity with said cylindrical wall 58' so as to prevent (or significantly restrict) a leakage of fluid therebetween (see FIG. 34 in particular).

Three splines 254 extend radially from the hub 114' of the upper rotor disc 80' as will be most readily seen from FIG. 23 of the accompanying drawings. The three splines 254 are spaced equi-distant about the central longitudinal axis of the upper rotor disc 80' and extend axially along the hub 114 '(and, consequently, along the rotary shaft 78') from a lower side 330 of the spoke members 116' to a point along the hub 114' which, in the assembled separator 2', locates approximately mid-way along the central hub element 292 of the fan disc 240.

Each spline 254 has a root portion 350 and a tip portion 352. The root portion 350 joins with the remainder of the hub 114'. The tip portion 352 adjoins with the root portion 350 and provides a free end to the spline 254. The root portion 350 of each spline 254 is wider (i.e. has a greater circumferential dimension) than the tip portion 352. As a consequence of the different widths of the root and tip portions 350,352, a step 354 is provided on either side of each spline 254 at the junction between the root and tip portions 350,352. With reference to FIG. 23 in particular, it will be seen that the width of the root portion 350 of each spline 254 increases from a lower end of each spline 254 to an upper end of each spline 254. Furthermore, the width of each root portion 350 is approximately equal to the width (i.e. the circumferential dimension) of one of the twelve spokes 116' of the upper rotor disc 80'. The tip portion 352 of each spline 254 is also circumferentially aligned with a spoke member 116' and adjoined therewith.

Figure 24:
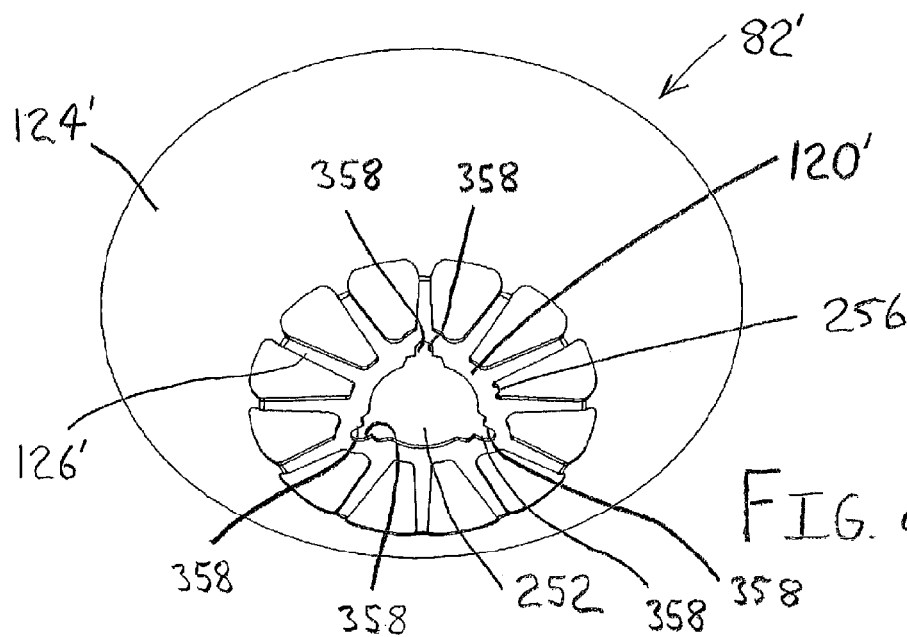
FIG. 24 is a perspective bottom view of one of a plurality of separator discs for slidably locating on the rotary shaft shown in FIGS. 21 and 23.
Figure 25:
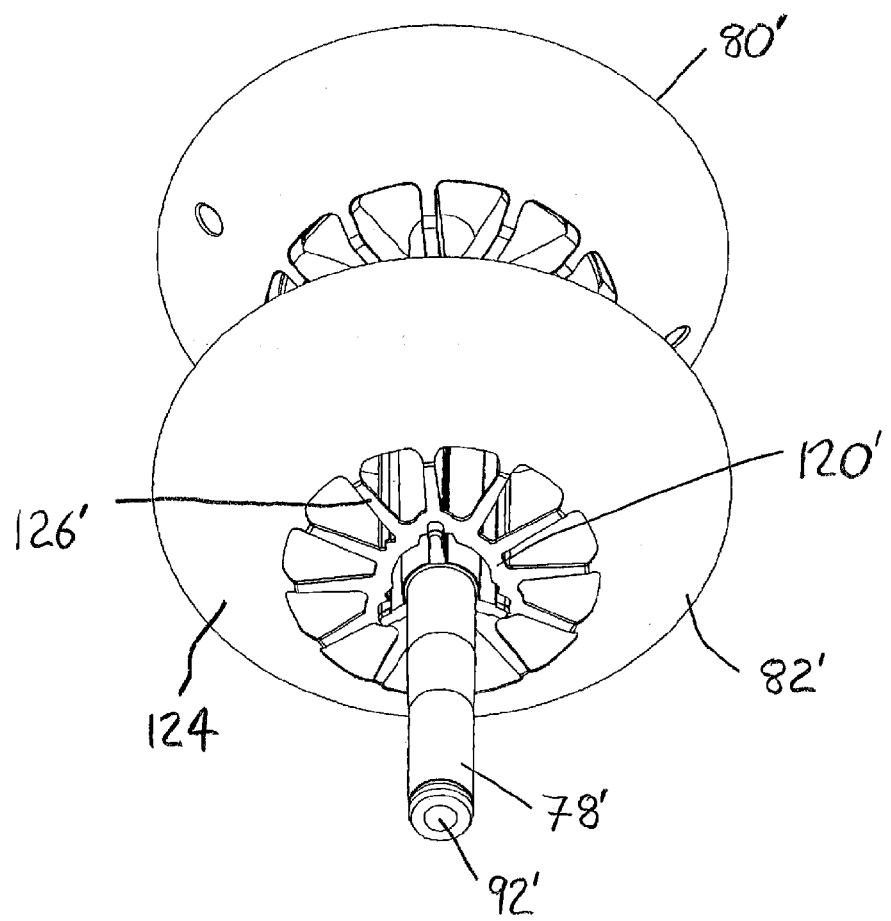
FIG. 25 is a perspective bottom view of the separator disc shown in FIG. 24 being slidably located on the rotary shaft shown in FIGS. 21 and 23.

The hub 120' of each separator disc 82' has an aperture 252 through which the rotary shaft 78' and upper rotor disc hub 114' extend (see FIGS. 23, 24 and 25 in particular). Rotational movement of the separator disc hub 120' relative to the upper rotor disc hub 114' (and, therefore, relative to the rotary shaft 78') is prevented by means of three splines 254 which are provided axially along the length of the upper rotor disc hub 114' and extend radially into a corresponding female mating profile defined by the aperture 252 of the separator disc hub 120'. This location of the splines 254 prevents lateral and rotational movement of a separator disc hub 120' relative to the rotary shaft 78'. More specifically, surfaces 356 of the tip portion 352 of each spline 254 (which surfaces 356 extend generally radially) abut with corresponding surfaces 358 (which surfaces 358 also extend generally radially) of said mating profile to prevent relative rotation of a separator disc 82' and the upper rotor disc hub 114' (and rotary shaft 78'). It will be appreciated that the abutting surfaces 356,358 press against one another, in use, in a direction generally perpendicular to each of said surfaces 356,358 and, for this reason, there is little or no relative sliding movement of said surfaces 356,358 and little or no associated frictional wear of said surfaces 356,358 which can lead to an increased or undesirable relative rotation between a separator disc 82' and the upper rotor disc hub 114'.

The separator disc hub 120' of each separator disc 82' is connected to the frustoconical part 124' of each separator disc 82' by means of twelve radially extending spoke members 126'. As in the prior art separator 2', the spokes 126' (and the remainder of the associated separator disc 82 ') are made of a relatively thin and resiliently flexible plastics material. Again, as in the prior art separator 2', the spokes 126' are capable of resisting the lateral and rotational forces to which they are subjected without deforming, and the compression force generated by the helical spring 96' is transmitted through the separator disc stack 84' via the spacers 246 rather than by the separator disc spokes 126.

It will also be understood by the skilled person that the relative geometry of the splines 252 and the aperture 252 of each separator disc 82' ensures that, as mentioned above, each separator disc 82' is locatable on the rotary shaft 78' in one of only three angular positions. By virtue of the positioning of the spacers 246 relative to the aperture 252, the polar or angular positioning of spacers 246 of the separator discs 82' remain the same, relative to the rotary shaft 78', regardless of which of the three angular positions is used and, accordingly, there is no possibility of the separator disc stack 84' being assembled on the rotary shaft 78' with the spacers 246 of adjacent separator discs 82' being misaligned. Nevertheless, each separator disc 82' is provided with a marker which may be aligned with the markers of other discs 82' in the disc stack 84'. In this way, all the discs 82' within the stack 84' will have the same angular position relative to the rotary shaft 78'. The marker is provided as a rib 256 located on the hub between two spokes 126' and extending a short distance radially outward.

For the purposes of clarity, FIGS. 13, 15, 19, 20, 27, 33, 34 of the accompanying drawings show a disc stack 84' with a reduced number of separator discs present.

An annular recess 258 (see FIG. 21) concentric with the rotary shaft 78' is provided in an upper surface of the upper rotor disc hub 211'. The annular recess 258 receives a second helical compression spring 130' and prevents downward axial movement of this spring 130' along the rotary shaft 78'. Furthermore, in the assembled separator 2', the cage of the caged bearings 52' abuts and downwardly compresses the second spring 130' (with the upper end of the rotary shaft 78' remaining spaced from the cap member 54' of the top bearing unit 50'—see FIG. 34 in particular).

During assembly of the improved separator 2', all but the combined fan and turbine unit 88' of the second group of internal components are interconnected with one another. The upper rotor hub 114' (and the remainder of the upper rotor disc 80') is injection moulded with the rotary shaft 78' in-situ. The stack 84' of separator discs 82' is then slid axial along the rotary shaft 78' from a lower end thereof so as to locate in abutment with the underside of the frusto-conical part 112' of the upper rotor disc 80'.

Before the fan/turbine unit 88 is mounted to the lower end of the rotary shaft 78, the lower end of the shaft 78 is located through a central circular aperture provided in each of the bearing plate 70 and housing insert 72 of the first group of internal components. In so doing, the lower end of the rotary shaft 78 is also extended through the bottom bearing unit 90 which is secured to the central aperture of the bearing plate 70 (see FIGS. 8 and 10 in particular).

With further regard to the compression force applied to the separator disc stack 84', it will be understood by the skilled person that this force is generated by the helical compression spring 96'. During use of the separator 2', the compression spring 96' rotates with the rotary shaft 78' and a lower end of the compression spring 96' abuts with a radially inner race of the bottom bearing unit 90' so as to press thereagainst and transfer said force upwardly to the splash guard hub 308. The compression force is then transmitted from the splash guard hub 308 to the end plate hub 98'. A rotation of the splash guard 242 relative to the end plate 86' is resisted due to frictional forces between the splash guard hub 308 and the end plate hub 98' (which will be understood to be a function of the compression force).

Due to the rigidity of the end plate 86', the compression force is transmitted from the hub 98' to the frusto-conical part 108' of the end plate 86' via said plurality of radially extending spoke members 110'. The compression force is then transmitted to the caulk members 298 of the fan disc 240 via the frusto-conical part 108', and then transmitted from the frusto-conical part 290 of the fan disc 240 upwardly through the stack 84' (via the spacers 246) to the frusto-conical part 112' of the upper rotor disc 80'. The compression force is transmitted from the frusto-conical part 112' to the hub 114' of the upper rotor disc 80' via twelve radially extending spokes 116'. The compression force is transmittable from the frusto-conical part 112' to the hub 114' due to the rigidity of the upper rotor disc 80'. An axial movement of the upper rotor disc 80' upwards along the rotary shaft 78' in reaction to the compression force is prevented by a location of the upper rotor disc hub 114' in abutment with a downward facing shoulder 250 on the rotary shaft 78'. An axial movement of the upper rotor disc 80' downwards along the rotary shaft 78' is prevented by a location of the upper rotor disc hub 114' in abutment with an upward facing annular shoulder 248 on the rotary shaft 78'.

Adjacent discs 82' of the disc stack 84' may be, optionally, fixedly secured to one another. This will tend to increase the rigidity of the disc stack 84' and ensure the relative rotational positions of adjacent discs 84' does not change (i.e. ensure that the disc spacers 246 remain aligned so as to transmit compression force without the space between adjacent discs 82' closing). Discs 82' may be secured to one another by welding (for example, ultrasonic welding).

As in the prior art separator 2', before the fan/turbine unit 88' is mounted to the lower end of the rotary shaft 78', the lower end of the shaft 78' is located through a central circular aperture provided in each of the bearing plate 70' and housing insert 72' of the first group of internal components. The lower end of the rotary shaft 78' is also extended through the bottom bearing unit 90' which is secured to the central aperture of the bearing plate 70' (see FIGS. 29 and 30 in particular).

The combined fan and turbine unit 88' is secured to the lower end of the rotary shaft 78' which projects downwardly from the underside of the bearing plate 70'. The fan/turbine unit 88' is retained in position on the lower end of the rotary shaft 78' by means of a circlip 132' (retained in a circumferential recess in the lower end of the rotary shaft 78') and a helical compression spring 360 located about the lower end of the rotary shaft 78' and abutting an upwardly facing surface of the circlip 132'.

The circlip 132' and compression spring 360 locate within a cavity of the combined fan and turbine unit 88'. The compression spring 360 presses upwardly within said cavity so as to bias the fan/turbine unit 88 upwardly into contact with a radially inner race of the bottom bearing unit 90'. This arrangement is most clearly evident from FIG. 30 of the accompanying drawings. With reference to this Figure, it will be understood that an upwardly facing deflector surface 139' is provided on said unit 88' and is located radially inwardly of fan blades 140' of said unit 88'. The deflector surface 139' performs the same function as the deflector washer 139 in the prior art separator 2, but is provided integrally with the fan/turbine unit 88' rather than as a separate abutting component. A radially inner part of the deflector surface 139' is pressed upwardly into abutment with an inner bearing race of the bottom bearing unit 90' which, in turn, is pressed upwardly against the bearing plate 70'. The deflector surface 139' and the radially outer bearing race of the bottom bearing unit 90' are axially spaced from one another so as to allow for a flow of separated oil downwardly through the bottom bearing unit 90' and radially outwardly through said axial spacing into the turbine casing.

The rotor assembly of the separator 2 is rotated in a direction indicated by arrow 134' (see FIGS. 29 and 30) by means of a hydraulic impulse turbine. As in the prior art separator 2', the fan/turbine unit 88' comprises a Pelton wheel 136' having a plurality of buckets 138' evenly spaced along the circumference thereof. In use of the separator 2', a jet of oil is directed from a nozzle (not shown) within the turbine casing towards the circumference of the Pelton wheel 136'. More specifically, the jet is directed along a tangent to a circle passing through the plurality of buckets 138' so that the jet enters a bucket aligned with a surface thereof. The jet flows along said surface following the internal profile of the bucket and is thereafter turned by said profile to flow along a further surface and be thereafter ejected from the bucket. The result is that the jet rotates the wheel 136'.

A fan having a plurality of blades 140' is also integrally formed with the wheel 136'. The blades 140' are located on the wheel 136' in close proximity to the underside of the bearing plate 70'. The plurality of fan blades 140' are also in approximately the same axial position along the rotary shaft 78' as the deflector surface 139' and the bottom bearing unit 90'. The fan blades 140' extend radially outward from adjacent the bottom bearing unit 90'. It will be understood by those skilled in the art that the fan blades 140' rotate about the central axis 64' as the turbine wheel 136' is rotated. In so doing, the fan blades 140' effectively throw fluid from the region between the wheel 136' and the underside of the bearing plate 70', thereby reducing the fluid pressure in the region of the bottom bearing unit 90' and assisting in drawing separated oil from a location above the bearing plate 70' downward through the bottom bearing unit and into the turbine casing below the bearing plate 70'.

Figure 30:
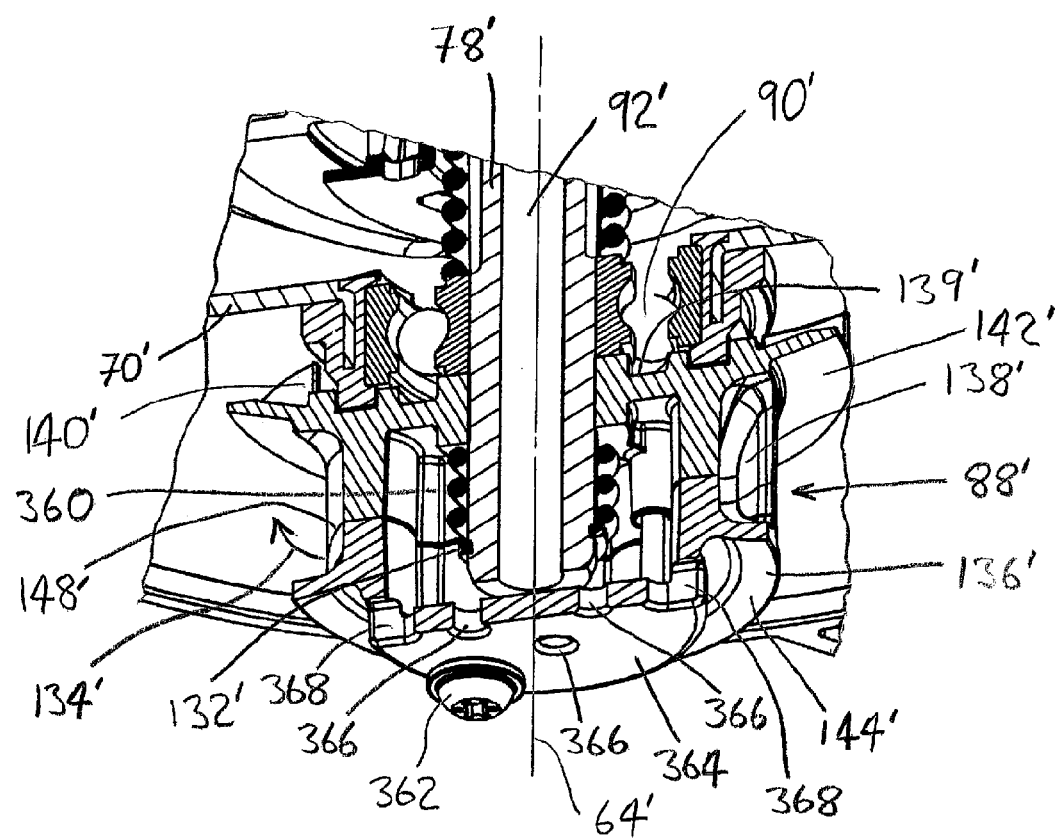
FIG. 30 is a partial cross-sectional perspective side view of the turbine wheel assembly shown in FIG. 29.

For ease of manufacture, the wheel 136' is made in upper and lower parts 142',144' and pressed into abutment with one another at line 146' by two screw threaded fasteners (only one of which is shown in FIG. 30 of the accompanying drawings).

The plurality of fan blades 140' and the deflector surface 139' are formed integrally with the upper part 142' of the fan/turbine unit 88'. The lower part 144' of the fan/turbine unit 88' is provided with a lower plate member 364 which, in the assembled separator 2', lies in a plane perpendicular to the central axis 64' and across the downhole opening to the flow path 92' of the rotary shaft 78'. The plate member 364 is nevertheless spaced from said opening to the flow path 92' so as to allow a flow of fluid into said opening.

The plate member 364 is provided with four apertures 366 which, in the assembled separator 2', are located equi-distant along an imaginary circle centred on the central axis 64'. It will be understood by a skilled person that an alternative number of apertures 366 may be used, although the apertures should be arranged so as to ensure a rotary balancing of the fan/turbine unit 88'.

Significantly, the apertures 366 are located radially outwardly from the opening to the flow path 92'. It will be understood therefore that the arrangement is such that a mist of oil droplets may flow upwardly through the apertures 366 from the turbine casing and thereby enter the cavity within the fan/turbine unit 88' and flow upwardly through the flow path 92' of the rotary shaft 78'. It will, however, also be appreciated that the flow from the apertures 366 to said opening of the flow path 92 is in a radially inward direction. During use of the separator 2', the fan/turbine unit 88' is of course rotating in the direction indicated by arrow 134' and, whilst a mist of oil droplets may flow radially inward from the apertures 366 to the flow path 92', comparatively larger bodies of oil flowing through the apertures 366 will be moved in a lateral direction by the spinning plate member 364 and tend to be thrown outwards away from the opening to the flow path 92'. For example, in the event of a vehicle leaning or otherwise moving in such a way as to splash oil upwardly from the turbine casing through the apertures 366 so as to flood the cavity of the fan/turbine 88', the lateral motion imparted on the oil within said cavity tends to prevent said oil from flowing inwardly towards the rotary shaft 78'. An undesirable flow of large quantities of oil upwardly through the rotary shaft 78' and into the disc stack 84' is therefore avoided.

Two drain apertures 368 are provided in the plate member 364 so as to allow oil to drain from the cavity within the fan/turbine unit 88' back into the turbine casing. The drain apertures 368 are located diametrically opposite one another and form a slot in the plate member 364 and in a generally cylindrical wall upstanding from the circular perimeter of said plate member 364. The location of the drain apertures 368 in a radially outer most part of the turbine cavity ensures that oil thrown to the outer perimeter of said cavity away from the rotary shaft 78' does drain effectively from the fan/turbine unit 88'.

Figure 29:
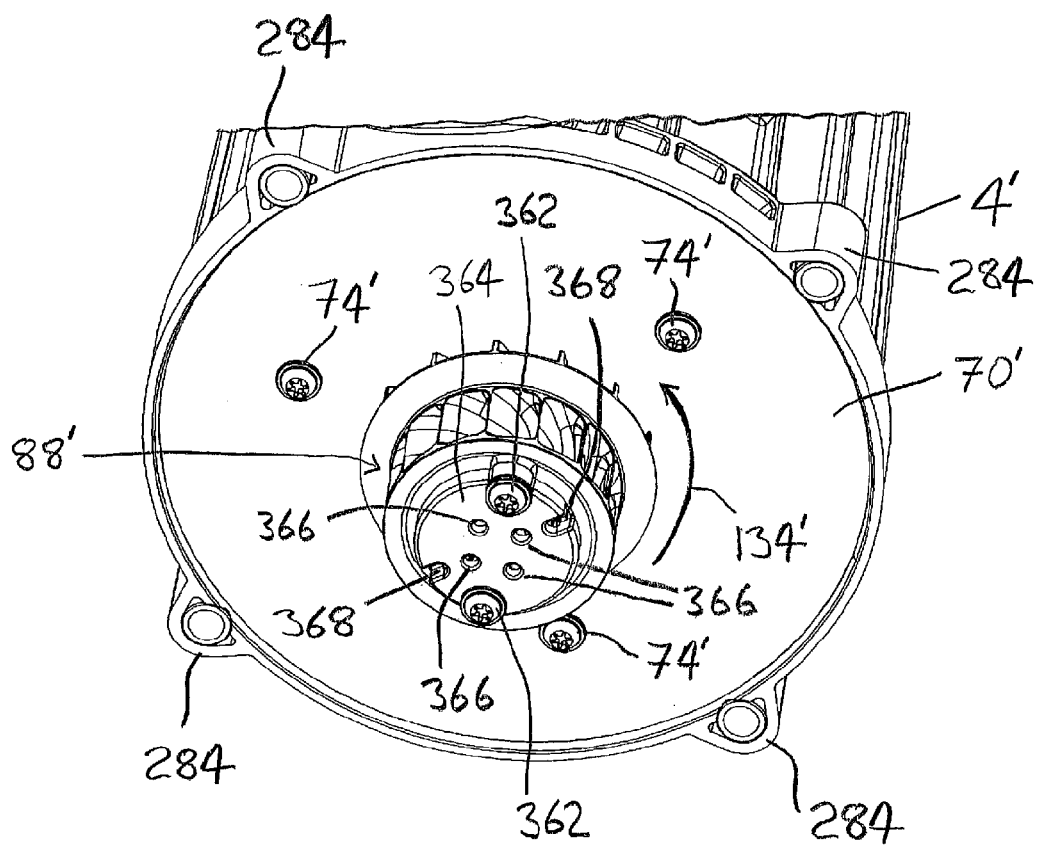
FIG. 29 is a partial perspective bottom view of the first embodiment shown in FIG. 13, specifically showing a turbine wheel assembly of said embodiment.
Figure 31:
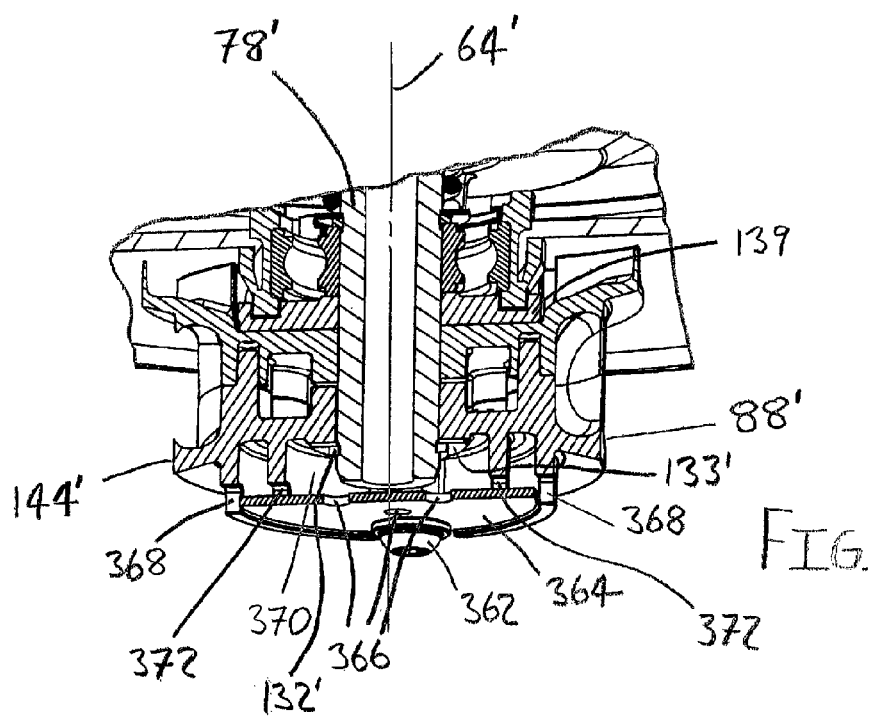
FIG. 31 is a partial cross-sectional perspective side view of an alternative turbine wheel assembly to that shown in FIGS. 29 and 30.
Figure 32:
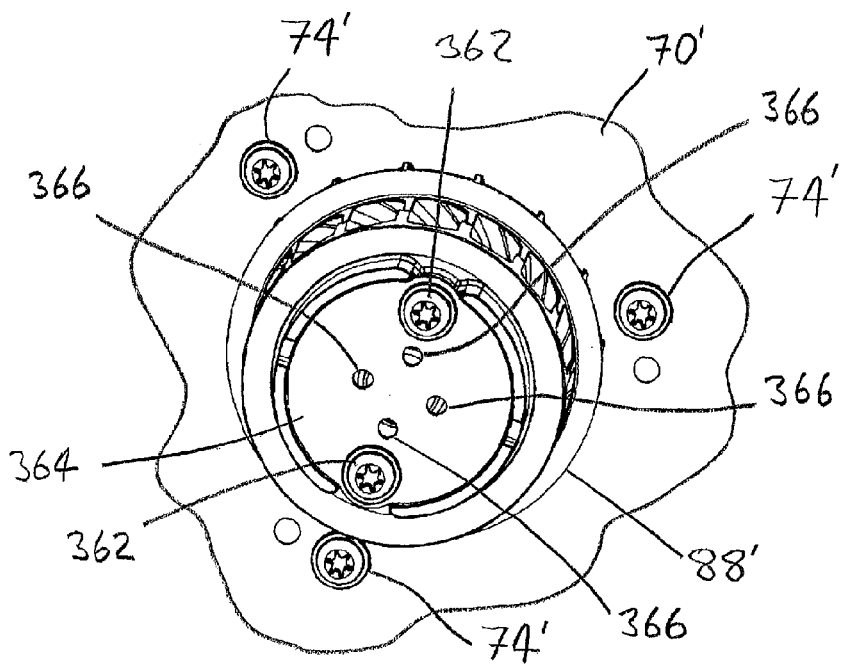
FIG. 32 is a perspective bottom view of the turbine wheel assembly shown in FIG. 31.
Figure 33:
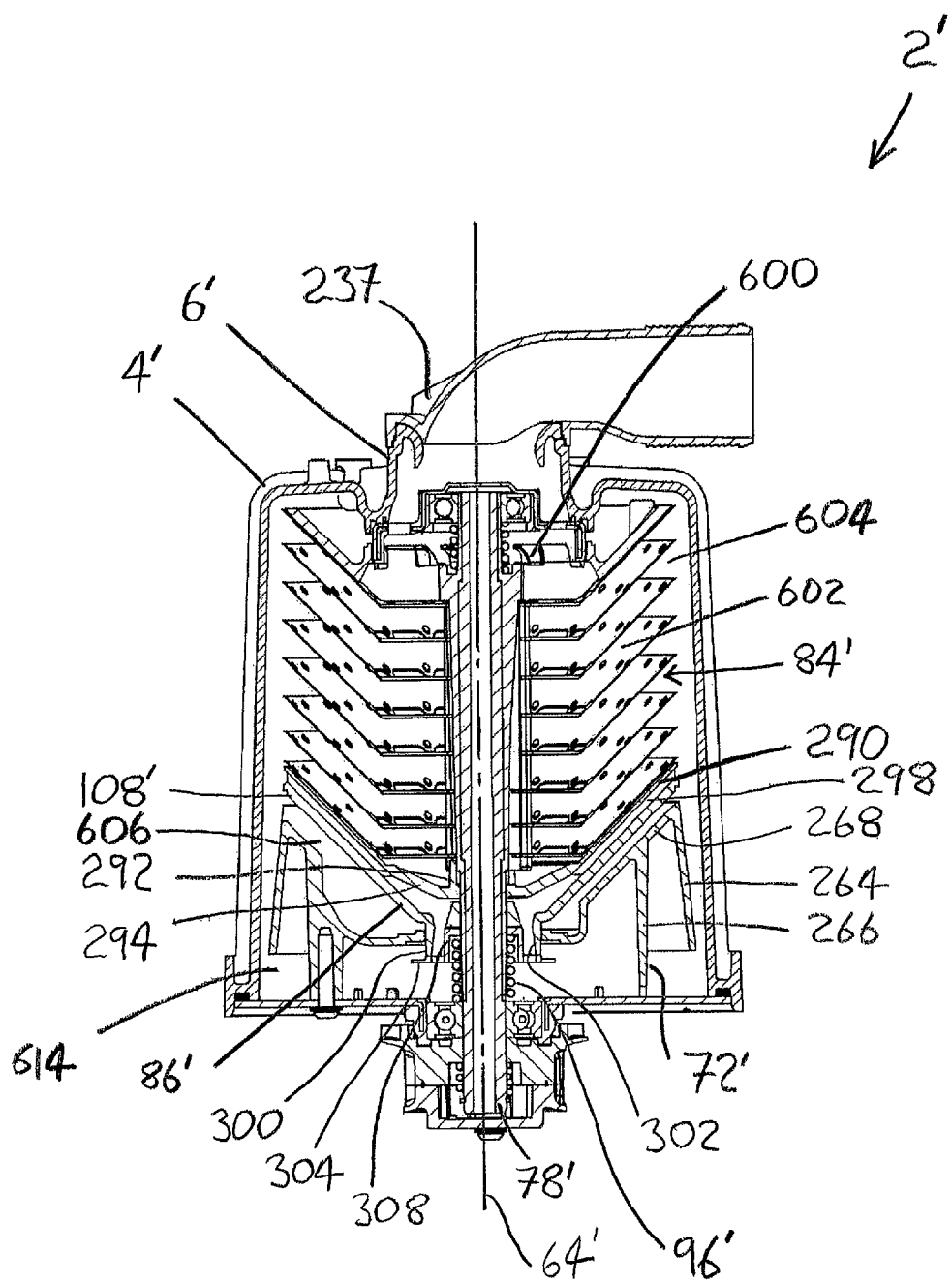
FIG. 33 is a cross-sectional side view of the first embodiment shown in FIG. 13.

Whilst the plate member 364 is shown in the embodiment of FIGS. 29 and 30 as being integral with the lower part 144' of the fan/turbine unit 88', in an alternative embodiment shown in FIGS. 31 and 32 of the accompanying drawings, the end plate 364 is provided as a circular disc separate to the lower part 144 of the fan/turbine unit 88'. With reference to FIGS. 31 and 32, it will be seen that the separate plate member 364 of the alternative embodiment is a circular disc provided with apertures 366 in the same way as in FIGS. 29 and 30. However, the alternative plate member 364 is secured in position relative to the remainder of the fan/turbine unit 88' by the screw threaded fasteners 362 (which extend therethrough) and is absent of the drain apertures 368. In this alternative arrangement, the drain apertures 368 are provided solely in the cylindrical wall of the lower part 144' which is arranged concentrically with the circular perimeter edge of the plate member 364 and extends upwardly therefrom. The lower part 144' of the fan/turbine unit 88' is further provided with a second cylindrical wall 370 which is located within the cavity of the fan/turbine unit 88' and extends downwardly to provide a downwardly facing annular surface against which the plate member 364 may be pressed by the two screw threaded fasteners 362. Recesses are provided in the downwardly facing annular surface so as to provide a fluid pathway 372 between said cylindrical wall 370 and the plate member 364. In use, oil flowing outwardly across the upper surface of the plate member 364 passes to the drain apertures 368 via the flow path 372.

Whilst the fan/turbine unit 88' of FIGS. 31 and 32 is provided with an outer cylindrical wall and a plate member 364 which together define a cavity and is additionally also provided with a further cylindrical wall 370 against which the plate member 364 is located, the fan/turbine unit 88 is in other respects similar to that of the prior art separator 2 and is secured to the rotary shaft 78' in the same way as in the prior art separator 2. Specifically, the fan/turbine unit 88' is secured to the rotary shaft 78' by means of a washer 133' which presses upwardly on the lower part 144' of said unit 88' and is retained in position by means of a circlip 132 located in a circumferential recess on the exterior surface of the rotary shaft 78'. It will be understood that the washer 133' and circlip 132 provide an alternative securing means to the compression spring 360 and circlip 132 shown in FIGS. 29 and 30.

With regard to the first group of internal components, the bearing plate 70' has a circular shape with a diameter substantially equal to the diameter of the rotor housing 4'. As in the prior art separator 2', the relative geometries are such as to allow the bearing plate 70' to locate on a downwardly facing shoulder 148' at a lower end of the rotor housing 4'. In this way, the lower open end of the rotor housing 4' is closed by the bearing plate 70'. However, in the improved separator 2', the lower open end of the rotor housing 4' abuts the upper side of the bearing plate 70' and is provided with a circumferential recess 260 for receiving an O-ring seal 262 (see FIG. 34). It will be understood that the second O-ring seal 262 ensures a fluid seal between the rotor housing 4' and the bearing plate 70'.

Furthermore, in the assembled separator 2', the radially outermost circumferential edge surface 630 (forming a datum surface) of the bearing plate 70' registers in abutment with a cylindrical inner surface 632 encircling the lower open end of the rotor housing 4'. In this way, the bearing plate 70' is laterally aligned in a desired final position relative to the rotor housing 4' (see FIG. 13).

The bearing plate 70' is also provided with a central circular aperture which, in the assembled separator 2', is concentric with the rotor housing 4'. In other words, in the assembled separator 2', the circular central aperture of the bearing plate 70' is centered on the central axis 64' of the rotor housing 4'. Furthermore, as will be particularly evident from FIG. 34 of the accompanying drawings, the bottom bearing unit 90' is received in the central aperture of the bearing plate 70'. The radially outermost part of the bottom bearing unit 90' is fixed relative to the bearing plate 70'. The radially innermost part of the bottom bearing unit 90 is located adjacent the rotary shaft 78', but is not fixed thereto.

As mentioned above, the first group of internal components also comprises a housing insert 72' which is fixedly secured to the bearing plate 70'. As in the prior art separator 2', the housing insert 72' functions to segregate cleaned gas from oil which has been separated therefrom. The housing insert 72' of the improved separator 2' also provides an outlet 150' for cleaned gas, which sealingly connects directly with the cylindrical inlet portion 211 of the valve unit housing 12' (see FIG. 15).

The housing insert 72' is provided as a unitary moulding of plastics material. However, in describing the housing insert 72' below, the insert will be considered as comprising four portions: an outer deflector wall 264 having a frusto-conical shape; a support wall 266 having a cylindrical shape; a segregating roof member 268 having a frusto-conical shape; and an outlet portion 270 defining said insert outlet 150' (see FIGS. 27 and 28 in particular).

The segregating roof member 268 of the housing insert 72' has a frusto-conical shape and is supported on the support wall 266. The segregating roof member 268 is provided with a central circular aperture which, in the assembled separator 2', has a central axis coincident with the central axis 64' of the rotor housing 4'. An elongate channel/recess 272 (see FIG. 28) is provided in the upper surface of the segregating roof member 268. This channel/recess 272 defines a fluid pathway for cleaned gas which extends from an inlet 282 of the recess 272 to the outlet portion 270 (having a tubular shape) of the housing insert 72'. The inlet 282 is defined by a recessed circumferential portion of an upper circular perimeter edge 274 of the segregating roof member 268. The inlet 282 is located generally diametrically opposite the outlet portion 270 of the housing insert 72'. The aforementioned recessed portion of said perimeter edge 274 extends through an arc 280 of approximately 80°, which arc is centred on said central axis of the housing insert aperture. In alternative embodiments, an inlet to the fluid pathway may be define by a recessed portion in said perimeter edge 274 which extends through a different arc, for example between 45° and 110°. In the assembled separator 2', only a small distance spaces the segregating roof member 268 from the end plate 86'. As a consequence, it is believed that the majority of cleaned gas entering the region 606 between the segregating roof member 268 and the end plate 86' does so through the space between the aforementioned recessed portion of said perimeter edge 274 and the end plate 86', with only a relatively small proportion of cleaned gas flowing into said region past the remainder of said perimeter edge 274.

It will be understood therefore that the space between the entire circumferential perimeter edge 274 and the end plate 86' provides an inlet 610 to said region 606 between the segregating roof member 268 and the end plate 86', but that because one lengthwise portion 612 (i.e. the inlet 282 to the channel/recess 272) of this inlet 610 has a greater depth 613 (i.e. a greater axial spacing between the perimeter edge 274 and the end plate 86') than other lengthwise portions of the inlet 610, a large proportion of cleaned gas flowing into said region 606 does so through said lengthwise portion 612 having the greater depth 613. The depth of the remaining lengthwise portions of said region inlet (610) is minimal so as to minimise the flow of fluid therethrough and thereby also minimise the passage of oil droplets therethrough. The depth of the remaining lengthwise portions may be between a tenth and a half of the greater depth 613, and is preferably one third of said greater depth 613.

During use of the separator 2', cleaned gas exiting the separator disc stack 84' flows downwardly in a spiralling rotary motion along the interior surface of the cylindrical wall of the rotor housing 4'. It will be understood therefore that cleaned gas entering the aforementioned region 606 between the segregating roof member 268 and the end plate 86' tends to do so with a rotary swirl motion centred on the central axis 64' of the rotor housing 4'. However, the gas flow entering said region 606 via the inlet 282 is immediately guided towards the insert outlet 150' by means of the side walls 276, 278 of the elongate recess 272. This guidance of the cleaned gas flow is also believed to reduce the rotary swirl motion of cleaned gas immediately upon entry of said gas into said elongate recess 272 via the recess inlet 282. In this regard, it will be seen from FIG. 28 of the accompanying drawings that the upstream portion of the elongate recess 272 is curved (the side walls 276,278 of the recess 272 thereby aligning with the swirling inlet fluid so as to substantially minimise desirable unpressure losses as fluid initially impacts the sidewalls 276,278) and progressively straightens as fluid moves downstream along the recess 272 towards the insert outlet 150'. It is believed that the immediate reduction of swirl motion in the majority of clean gas entering the region between the segregating roof member 268 and the end plate 86' significantly reduces pressure losses in fluid flowing through this part of the separator 2' as compared with the prior art separator 2 described above.

It will be appreciated that cleaned gas which does not flow through the inlet 282 but which enters the region between the segregating roof member 268 and the end plate 86' at other locations along the perimeter of the segregating roof member 268 will tend to flow through said region with a swirling motion until received by the elongate recess 272 whereupon the radially outer sidewall 276 in particular will, it is believed, guide the fluid towards the insert outlet 150' and also reduce the swirling motion of said fluid.

The cylindrical support wall 266 is concentrically arranged with the central circular aperture in the segregating roof member 268 and projects downwardly from the underside of the segregating roof member 268. The diameter of the support wall 266 is less than that of the perimeter edge 274 of the segregating roof member 268. In the assembled separator 2', a lower downwardly facing circular edge 450 (see FIG. 27) of the support wall 266 abuts with the bearing plate 70' at a junction therebetween. The support wall 266 thereby supports the segregating roof member 268 on the bearing plate 70' and ensures a correct axial location of the segregating roof member 268 relative to the bearing plate 70'. The support wall 266 is also provided with a plurality of cylindrical bosses 452 which each have a recess for threadedly receiving a fastener 74'. In the assembled separator 2', each fastener 74' extends into one of said bosses 452 from below the bearing plate 70' through an aperture in the bearing plate 70'. In this way, the insert housing 72' is fixedly secured to the bearing plate 70'.

The lower downwardly facing circular edge 450 of the support wall 266 is provided with a plurality of apertures/recesses 454 positioned at various locations along said edge 450. As will be seen from FIGS. 27 and 34 in particular, the recesses 454 provide a space between the support wall 266 and the bearing plate 70' through which, during use of the assembled separator 2', fluid may flow. Specifically, during use of the separator 2', separated oil flowing radially inwardly from the cylindrical wall of the rotor housing 4' along the bearing plate 70' passes through the plurality of recesses 454. A proportion of cleaned gas also flows radially inwardly across the upper surface of the bearing plate 70' (as will be understood by a skilled reader) and this fluid also flows through the plurality of recesses 454. This flow of fluid is denoted by arrow 188' in FIG. 34.

The outer deflector wall 264 extends downwardly from the perimeter edge 274 of the segregating roof member 268. The deflector wall 264 has a frusto-conical shape diverging in a downward direction from the segregating roof member 268 towards the bearing plate 70' in the assembled separator 2'. The diameter of the deflector wall 264 at an upper end thereof (and, therefore, the diameter of the perimeter edge 274 of the segregating roof member 268) is substantially equal to the outer diameter of the separator disc stack 84'. Due to the frusto-conical shape of the deflector wall 264, the deflector wall 264 converges with the generally cylindrical wall of the rotor housing 4' when moving in a downward direction. The cross-sectional area of the flow path between the deflector wall 264 and the rotor housing 4' therefore reduces in the direction of flow (i.e. in a downward direction). The lower free end 608 of the deflector wall 264 is located spaced from the cylindrical wall of the rotor housing 4' and a distance 456 of between 2 millimeters and 200 millimeters, and of preferably 14 millimeters, above the bearing plate 70'. This spacing of the outer deflector wall 264 from the rotor housing 4' and the bearing plate 70' allows for separated oil (or other separated material) and cleaned gas (which has not entered the first region inlet 610) to flow downwardly along the cylindrical wall of the rotor housing 4' and radially inwardly along the bearing plate 70' past the deflector wall 264 (including its free end). In so doing, the separated oil and cleaned gas flows through a second region 614 on an opposite side of the housing insert 72' to the first flow region 606.

Also, due to its frusto-conical shape, the outer deflector wall 264 diverges from the cylindrical support wall 266 when moving in a downward direction. The outer deflector wall, segregating roof member 268 and cylindrical support wall 266 define a generally annular shaped cavity 458 (see FIG. 34) with an open lower end. The arrangement is such as to reduce the likelihood of separated oil flowing downwardly along the rotor housing 4' past the inlet 282 of the recess 272, only to subsequently flow upwardly due to a recirculation of fluid and thereby flow into said inlet 282 contaminating cleaned gas.

More specifically, whilst the relatively large spacing between the rotor housing 4' and the upper end of the deflector wall 264 allows for a ready entry of separated oil between these features, the comparatively small spacing between these features at the lower free end of the deflector wall 264 reduces the ease with which separated oil may be splashed or re-circulated upwardly between said free end and the rotor housing 4'. Furthermore, any recirculation of fluid adjacent the radially outer perimeter of the bearing plate 70' will tend to result in separated oil flowing into the aforementioned cavity 458. For example, separated oil may flow upwardly along the radially outer surface of the cylindrical support wall 266, outwardly along the underside of the segregating roof member 268, and then downwardly along the radially inner surface of the deflector wall 264. In due course, the oil will likely fall from the cavity 458 onto the bearing plate 70' under the action of gravity. It will be appreciated that this re-circulating flow path does not result in separated oil flowing upwardly in such a way as to risk the contamination of the cleaned gas flowing into the region between the segregating roof member 268 and the end plate 86'. Thus, once cleaned gas has flowed past the region 606 inlet (i.e. the inlet to between the segregating roof member 268 and the end plate 86') towards the bearing plate 70', any subsequent re-circulation of said gas back upstream towards said inlet is prevented from resulting in re-circulated gas (and oil droplets carried thereby) entering said region 606 by the deflector wall 264, which effectively segregates (i.e. maintains separation of) said re-circulated gas from said inlet.

The outlet portion 270 of the housing insert 72' is provided as a cylindrical tubular element opening onto the upper surface of the segregating roof member 268 (and, more specifically, opening into the recess 272 for receiving cleaned gas) and extending in a generally radially outwards direction through the support wall 266 and the outer deflector wall 264. As will be particularly evident from FIGS. 13 and 14 of the accompanying drawings, the outlet portion 270 is positioned above the downwardly facing edge of the support wall 266. Accordingly, in the assembled separator 2', the outlet portion 270 is located above the bearing plate 70' so that fluid may flow beneath the outlet portion 270. Advantageously, separated oil may flow beneath the outlet portion 270 and does not, therefore, tend to climb up the outer surface of the outlet portion 270 towards the perimeter edge 274 of the segregating roof member 268 where separated oil may readily contaminate clean gas flowing into the recess 272 of the housing insert 72'. A free end of the outlet portion 270 distal to the end thereof opening into the recess 272 is provided with a support element 460 which projects downwardly from the lowermost part of said free end so as to abut the bearing plate 70'. In this way, the support element 460 assists in maintaining a minimum spacing between the bearing plate 70' and the outlet portion 270, and also allows the bearing plate 70' to provide support to the free end of the outlet portion 270.

During assembly, the separator 2' is secured to a turbine casing (not shown) in a similar way as described above in relation to the prior art separator 2'. Specifically, the improved separator 2' is secured to a turbine casing by means of four threaded fasteners (not shown), each of which passes through a different one of four bosses 284 integral with the lower end of the rotor housing 4 (see FIGS. 18 and 29 in particular).

It will be understood by those skilled in the art that, as in the case of the prior art separator 2, the bearing plate 70' (and, therefore, all of the components of the first and second groups) is retained in the required position relative to the rotor housing 4' by virtue of the turbine casing pressing the bearing plate 70' into abutment with the downwardly facing shoulder 148' when the rotor housing 4' and turbine casing are fastened to one another. The bearing plate 70' is essentially clamped between the rotor housing 4' and the turbine casing 178' by means of the threaded fasteners extending through the four bosses 284. As the threaded fasteners are tightened and the bearing plate 70' is brought into abutment with the shoulder 148' as a consequence, the O-ring seal 262 at said shoulder 148' is pressed in the associated recess 260 and the second helical compression spring 130' is compressed by the top bearing unit 50'.

In operation of the improved separator 2', a nozzle (not shown) in the turbine casing directs a jet of oil onto the turbine wheel 136' so as to rotate the turbine wheel in the direction indicated by arrow 134' (see FIGS. 29 and 34). This rotation of the turbine wheel drives a rotation of the rotor assembly as a whole in the direction of arrow 134' about the central axis 64' of the rotor housing 4'. In other words, the rotary shaft 78'; the upper rotor disc 80'; the stack 84' of separator discs 82'; the fan disc 240; the end plate 86'; the splash guard disc 242; and the combined fan and turbine unit 88' (i.e. collectively referred to herein as the rotor assembly) rotate together as a unitary assembly within the rotary housing 4' and relative to said housing 4' and the bearing plate 70'; the housing insert 72'; and the turbine casing.

Gas vented from the engine casing, and requiring treatment by the separator 2', is introduced into the separator 2' via the fluid inlet 8' located at the top of the rotor housing 4'. As indicated by arrow 68' in FIG. 34, the inlet gas enters the rotor housing 4' in a direction parallel with, and in line with, the central axis 64' and flows through three slots 66' in the top bearing unit 50' before flowing into the inlet 600 of the rotor assembly past the twelve spokes 116' of the upper rotor disc 80'. The rotational movement of the twelve spokes 116' also results in a lateral movement of the fluid located between said spokes in that said fluid moves tangentially from the circular path of the spokes 116' and is effectively thrown outwards towards the cylindrical wall of the rotor housing 4. In essence, the twelve spokes 116' impart a cylindrical motion onto the inlet gas.

As inlet gas flows downwardly through the spokes 116', 126' of the upper rotor disc 80' and the separator discs 82', the gas is moved laterally towards the cylindrical wall of the rotor housing 4' via the spaces 602 between adjacent separator discs 82', as shown by arrows 184' in FIG. 34. By following this path, the direction of fluid flow is changed by more than 90°.

It will be understood that the spaces 604 between the radially outer most circumferential edges of adjacent separator discs 82' collectively represent an outlet from the rotor assembly.

It will also be understood by those skilled in the art that oil droplets 186' tend to collect together and form larger droplets as they move across the separator discs and are thrown onto the cylindrical wall of the rotor housing 4'. Once received by said cylindrical wall, the oil droplets 186' tend to run downwardly under the action of gravity onto the bearing plate 70'. The outer most circumferential edge of the separator stack 84' is sufficiently inwardly spaced from the cylindrical wall of the rotor housing 4' so as to allow oil droplets to run unimpeded downwardly onto said bearing plate 70'. The O-ring seal 262 ensures oil droplets cannot flow between the bearing plate 70' and the rotor housing 4'.

It will be understood by those skilled in the art that, because of the rotary motion of the rotor assembly, the fluid pressure within the rotor housing 4' is greater at the peripheral edge of the separator disc stack 84' and bearing plate 70' than in the region enclosed by the support wall 266 and roof member 268 of housing insert 72' and the bearing plate 70'. As a consequence, there tends to be a flow of cleaned gas downwardly along the cylindrical wall of the rotor housing 4' and radially inwardly along the bearing plate 70'. This fluid flow tends to push separated oil droplets downwardly along the cylindrical wall onto the bearing plate 70 below and then radially inwardly along the bearing plate 70' through the apertures in the support wall 266 of the housing insert 72'. This gas fluid flow is indicated by arrow 188' (see FIG. 34). The gas fluid flow moves radially inwardly across the upper surface of the bearing plate 70' towards the central circular aperture in the housing insert 72'. This flow across the bearing plate 70' tends to push separated oil droplets across the bearing plate 70 towards the bottom bearing unit 90', through which said oil droplets pass. The rotating fan blades 140' of the combined fan and turbine units 88' tend to lower the static pressure in the turbine casing (to which the rotor housing 4' is attached during use) in the region of the bottom bearing unit 90' so as to draw oil droplets through the bottom bearing unit 90'. The fan blades 140' then throw said droplets radially outwardly into the turbine casing, from where they may be returned to the engine crank casing. Meanwhile, the gaseous fluid flowing across the bearing plate 70' is drawn upwardly through the central aperture of the insert housing 72' to pass radially outwardly between the end plate 86' and the fan disc 240. The gaseous fluid may then exit the rotor housing 4' by flowing through said cylindrical portion 211 of the valve unit housing 12', which is sealingly connected to the housing insert 72' and passes through the housing insert outlet 150' and the rotor housing outlet 10'.

It will also be appreciated with reference to the accompanying drawings that, as well as flowing over the upper surface of the bearing plate 70' and through the apertures in the support wall 266 of the housing insert 72', some of the cleaned gas flows to said cylindrical portion 211 via an alternative route between the underside of the end plate 86' and the upperside of the segregating roof member 268 of the housing insert 72'. This alternative route is indicated by arrow 190'.

It will be appreciated that, as in the prior art separator 2, the flow of oil through the bottom bearing unit 90' of the improved separator 2' has a beneficial lubricating effect on the bearing unit. The top bearing unit 50' is similarly lubricated by an oil mist which naturally occurs in the turbine casing and which is transported upwards to the top bearing unit 50' through the longitudinal flow path 92' extending through the rotary shaft 78'.

Figure 35:
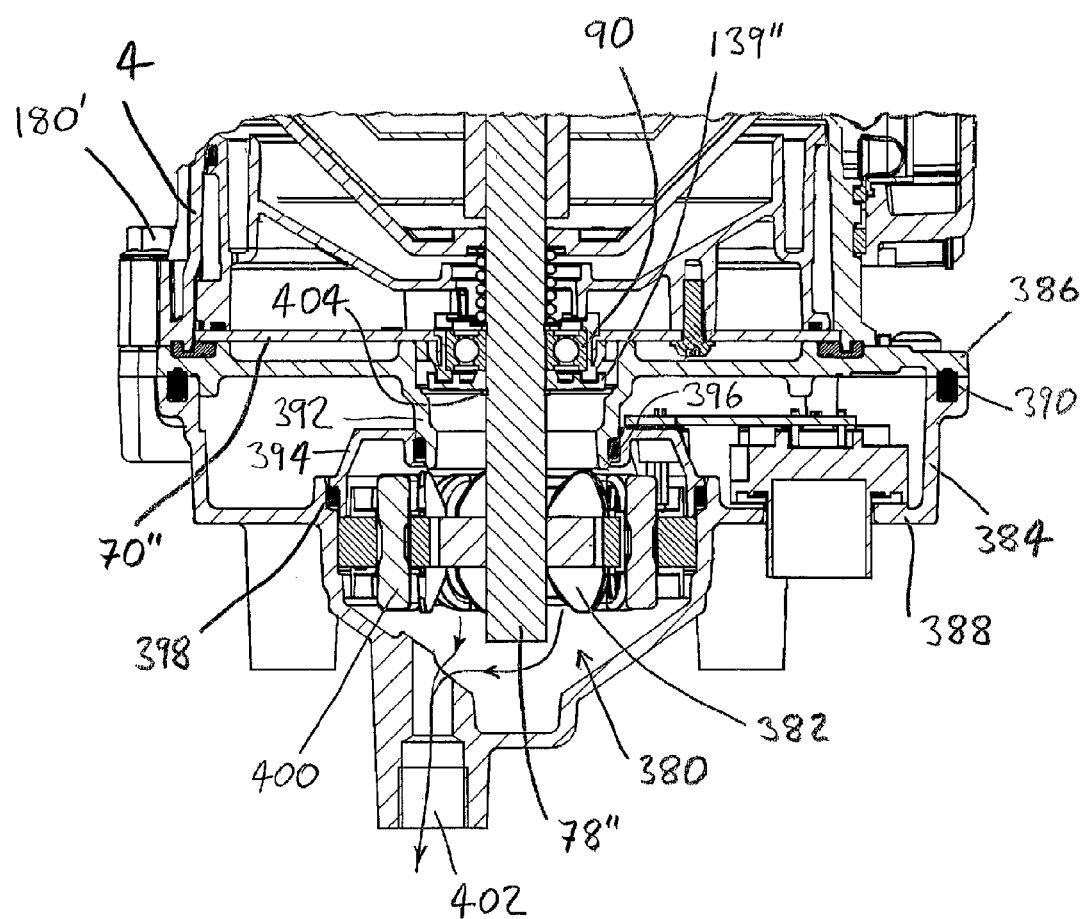
FIG. 35 is a cross-sectional side view of an electric motor drive arrangement to that shown in the above Figures, wherein the electric motor drive arrangement is shown in use with the prior art separator of FIG. 1.

Either the prior art ALFDEX™ separator 2 or the improved separator 2' described above may incorporate an alternative means for rotating the rotary shaft 78' as shown in FIG. 35 of the accompanying drawings. With reference to FIG. 35, it will be seen that Pelton wheel turbine previously described has been replaced by a brushless electric motor 380, the rotor 382 of which is secured to a lower end of the rotary shaft 78" below the bearing plate 70". The electric motor 380 is shown in FIG. 35 driving a prior art ALFDEX™ separator 2. However, as will be understood by a person skilled in the art, the electric motor drive arrangement shown in FIG. 35 may also be used in connection with the improved separator 2' described above.

With reference to FIG. 35, it will be seen that the electric motor 380 of the electric motor drive arrangement is located within a housing 384 which is secured to the rotor housing 4 by means of a plurality of screw threaded fasteners 180' (only one of which is shown in FIG. 35). The motor housing 384 is comprised of upper and lower parts 386,388 which are secured to one another with appropriate fastening means and with an O-ring seal 390 located at the interface therebetween. The O-ring seal 390 prevents an undesirable leakage into the space within the housing 384 of dirt, water and/or other foreign matter located exteriorly of the housing 384. In this way, electronic components (including printed circuit boards and/or other circuitry) are isolated from matter which may result in their damage and subsequent malfunction.

The upper part 386 of the housing 384 is provided with a downwardly projecting cylindrical wall 392 defining a central aperture in said upper part 386. The cylindrical wall 392 is arranged to locate concentrically with the rotary shaft 78" in the assembled separator. A deflector washer 139" is retained on the rotary shaft 78" by a circlip 404". The deflector washer 139' thereby presses upwardly against a radially inner bearing race of the bottom bearing unit, as in the prior art ALFDEX' separator 2. The deflector washer 139" has a radially outer perimeter edge radially spaced from the cylindrical wall 392 so as to allow for a passage of contaminate oil therebetween.

An upper end of a further separate part 394 of the motor housing 384 (having a generally frusto-conical shape) is located at and sealed to a lower end of the cylindrical wall 392 of the upper part 386. The seal between the cylindrical wall 392 and the frusto-conical part 394 defines a closed loop shape and is provided by means of a further O-ring seal 396. A lower end of the frusto-conical part 394 (having a diameter greater than the upper end thereof) is sealed against the lower part 388 of the motor housing 384 by means of a yet further O-ring seal 398. This seal also defines a closed loop shape.

Thus, on one side of the frusto-conical part 394, said part 394 and the lower part 388 thereby form a space in which the electric motor 380 is located and into which the lower end of the rotary shaft 78" extends. On the other side of the frusto-conical part 394, said part 394 and the upper part 386 and remainder of lower part 388 form an entirely enclosed and sealed space/compartment 406 in which electronic/electrical components (for example, a Printed Circuit Board 408) are housed for supplying electrical power and control signals to the electric motor 380. The compartment 406 is sealed from not only the exterior of the motor housing 384, but also from the space in which the electric motor 380 is located. Contaminate oil which flows through this space in use of the separator is therefore prevented from gaining access to the electronic/electrical components and causing damage thereto.

Furthermore, the frusto-conical part 394 is provided with an aperture (not shown) through which electrical leads 410 (connecting the motor 380 and said electrical supply/control components) extend and to which said leads are sealed.

A connector 412 also extends through an aperture 414 in the motor housing 384 so as to allow one or more electrical leads (not shown) located to the exterior of the separator (for example, associated with a vehicle with which the separator is used) to connect to said electrical supply/control components housed within the compartment 406. In other words, the electrical lead or leads may be provided with a plug for mechanically and electrically connecting with the connector 412. The lead or leads may carry electrical power and/or control signals for the electric motor drive arrangement. The connector 412 is sealed to the housing 384 so as to prevent an undesirable ingress of foreign matter into the compartment 406.

Whilst the compartment 406 has a generally annular shape concentric with the rotor assembly of the separator, it will be understood that the compartment 406 may be of a different shape.

A stator 400 of the electric motor 380 is secured to the lower part 388 of the motor housing 384. A radially inner portion of said frusto-conical part 394, which seals with the cylindrical wall 392, defines an aperture having a diameter substantially equal to the innermost diameter of the stator 400 of the electric motor 380.

During use of a separator provided with the electric motor drive arrangement of FIG. 35, a supply of electricity is connected to the brushless electric motor 380 so as to operate the rotor 382 thereof and thereby rotate the rotary shaft 78". As explained above, separated oil passes from the rotor housing 4 downwardly through the bottom bearing unit 90. In a separator provided with the electric motor drive arrangement of FIG. 35, this separated oil is ejected from the bottom bearing unit into the interior of the motor housing 384, and more particular into the space within the cylindrical wall 392 of the upper housing part 386. The separated oil then passes through the rotor 380 of the electric motor 380 and exits the motor housing 384 via a port 402 located beneath the electric motor 380 in the lower housing part 388. Oil passing through the rotor 382 (or through a space between the rotor 382 and the stator 400) and coming into contact with said rotor 382 and the stator 400 does not adversely affect the operation of the electric motor 380 because the electrical leads of the stator 400 are covered by a layer of epoxy lacquer.

With further regard to the manufacture of the improved separator 2' and, in particular, to the assembly of the top bearing unit 50' to the rotor housing 4', reference is now made to FIGS. 37 to 41 of the accompanying drawings. These Figures show a process for spin welding the top bearing unit 50' to the rotor housing 4' in a position which is in axial alignment with the bottom bearing unit 90' when the bearing plate 70' is assembled in abutment with the lower end shoulder 148' of the rotor housing 4'. The assembly process ensures axial alignment of the top and bottom bearing units 50',90' despite geometry variations resulting from a warping of the rotor housing 4' following injection moulding of said housing 4'.

Figure 40:
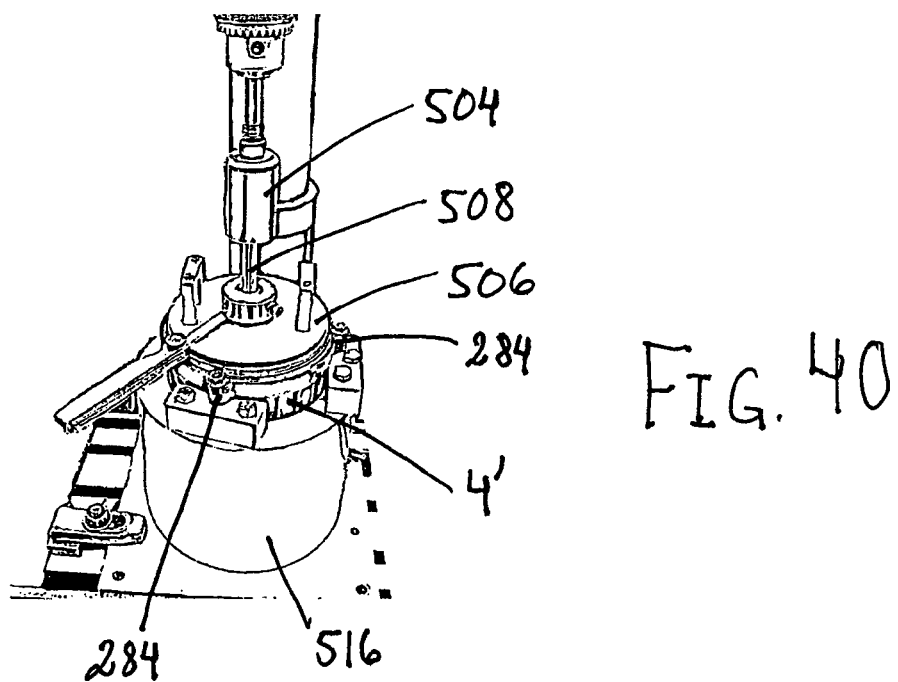
FIG. 40 is a perspective view of the assembly shown in FIG. 39 located within the interior of a rotor housing of the first embodiment prior to a spin welding of a top bearing unit to the interior of said housing.

The process makes use of a spin welding jig 500 comprising a stator part 502 and a rotor part 504 rotatably mounted to the stator part 502. The stator part 502 comprises a circular disc 506 having a diameter equal to the bearing plate 70'. The geometry of the circular disc 506 is such as to allow said circular disc 506 to locate in abutment with the rotor housing 4' in the same way as the bearing plate 70' in the assembled separator 2' (as shown in FIG. 40). The rotor part 504 comprises a shaft 508 which extends through the centre of the circular disc 506 and is oriented perpendicularly to said circular disc 506. The shaft 504 is mounted relative to the circular disc 506 by means of a bearing assembly (not shown).

One end of the shaft 508 is provided with a head 510 for receiving the top bearing unit 50'. The head 510 is provided as a circular disc concentric with the circular disc 506 of the stator part 502 and centred on the axis about which the rotor part 504 rotates. The diameter of the head 510 is essentially equal to the diameter of the radially inner surface of the downwardly projecting cylindrical wall 58' of the top bearing unit 50'. In this way, the cylindrical wall 58' of the top bearing unit 50' may locate about the head 510 with little or no relative lateral movement between the top bearing unit 50' and the shaft 508. Relative rotational movement between the top bearing unit 50' and the shaft 508 is prevented by projections 512 upstanding from the circular disc of the head 510. The head 510 comprises three projections 512 which are identical to one another and equi-spaced about the rotary axis of the shaft 508. The projections 512 are each of a part-circular shape and are positioned and sized so as to locate in the part-circular slots 66' of the top bearing unit 50'. The projections 512 are substantially of the same size and shape as said slots 66' and, as such, rotational movement of the top bearing unit 50' relative to the head 510 of the shaft 508 is substantially prevented when the projections 512 are received by said slots 66 (see FIGS. 37 and 38 in particular).

A second end of the shaft 508 distal to the end provided with the head 501 is provided with means 514 for connecting the rotor part 504 to a motor for driving rotary movement of the rotor part 504 relative to the stator part 502.

Figure 39:
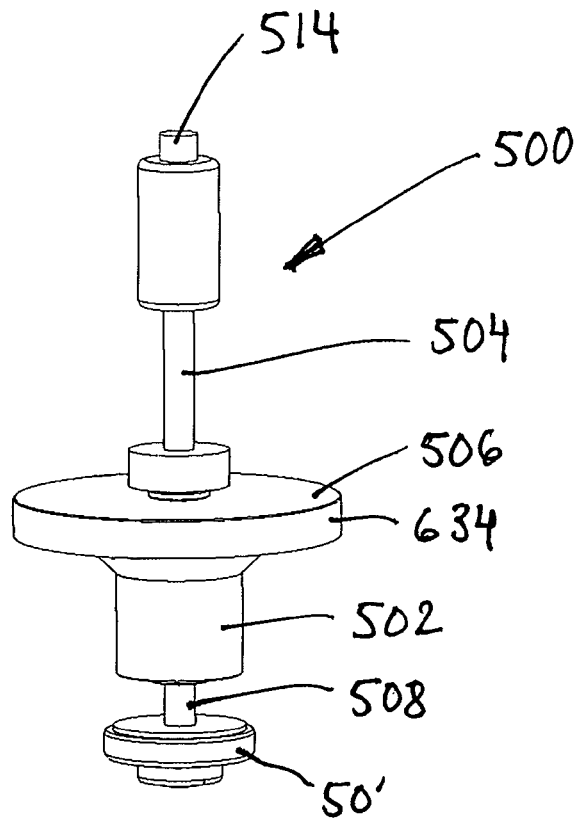
FIG. 39 is a perspective side view of a top bearing unit mounted to the spin welding jig of FIGS. 37 and 38.

The spin welding jig 500 with a top bearing unit 50' located on the head 510 thereof is shown in FIG. 39 of the accompanying drawings. With the top bearing unit 50' located on the head 510, the shaft 508 and top bearing unit 50' are inserted into a rotor housing 4' as shown in FIG. 40. The circular disc 506 is located in abutment with the lower shoulder 148' of the rotor housing 4'. More specifically, a radially outermost circumferential edge surface 634 (forming a datum surface) of the circular disc 506 registers in abutment with the cylindrical inner surface 632 encircling the lower open end of the rotor housing 4'. In this way, the lateral positioning of the top bearing unit 50' relative to the rotor housing 4' is determined. With the spin welding jig 500 located in this way within the rotor housing 4', the rotational axis of the rotor part 504 is coincident with the previously described central axis 64' of the rotor housing 4'.

The rotor part 504 may be arranged so as to be moveable relative to the stator part 502 in an axial direction so that the top bearing unit 50' may move from a first position, in which said bearing unit 50' is spaced from the upper part of the rotor housing 4', to a second position, in which the bearing unit 50' is pressed into abutment with the ridge 238 provided on the rotor housing 4' (see FIG. 34). During assembly of the top bearing unit 50' to the rotor housing 4', the rotor housing 4' is held stationary and, whilst the circular disc 506 of the stator part 502 is located in abutment with the lower shoulder 148' of the rotor housing 4', the rotor part 504 is rotated at relatively high speed and moved axially further into the rotor housing 4' so as to bring a spinning/rotating top bearing unit 50' into contact with said ridge 238. The spinning top bearing unit 50' is pressed forcefully against the ridge 238 so as to generate friction heat and thereby melt the abutting surfaces of plastics materials of the top bearing unit 50' and the ridge 238. Whilst pressing the bearing unit 50' against the ridge 238, the rotary motion of the shaft 508 is rapidly reduced and stopped so as to allow the bearing unit 50' and ridge 238 to bond with one another as the melted plastics materials cool. The top bearing unit 50' and rotor housing 4' are thereby spun welded to one another.

The rotor housing 4' may be held stationary during the spin welding process by means of screw threaded fasteners extending through bosses 284 in the rotor housing 4' and into a cylindrical mounting block 516 (see FIG. 40).

Figure 41:
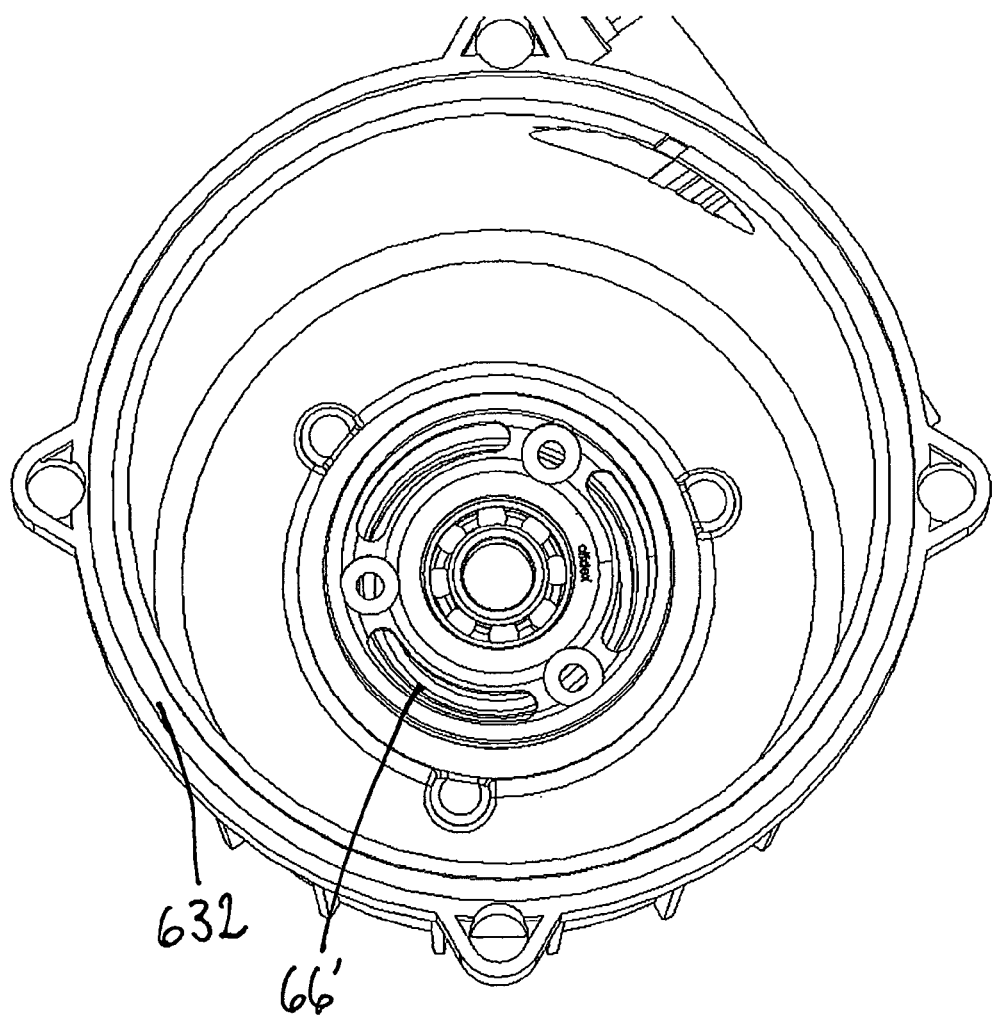
FIG. 41 is a perspective view of a top bearing unit having been attached to an interior surface to the housing shown in FIG. 40 by means of a spin welding operation.

Once the top bearing unit 50' has been secured to the rotor housing 4', the spin welding jig 500 may be removed from the rotor housing 4'. The top bearing unit 50' is thereby left correctly positioned and secured to the rotor housing 4' as shown in FIG. 41 of the accompanying drawings. It will be understood that the top bearing unit 50' is located in a position which is central relative to the lower circular shoulder 148' of the rotor housing 4'. Accordingly, when the internal components of the separator 2' are located within the housing 4', the abutment of the bearing plate 70' against said shoulder 148' ensures that the bottom bearing unit 90' also locates centrally with said shoulder 148'. The top and bottom bearing units 50',90' are thereby axially aligned despite any previous warping of the rotor housing 4' subsequent to injection moulding.

Figure 36:
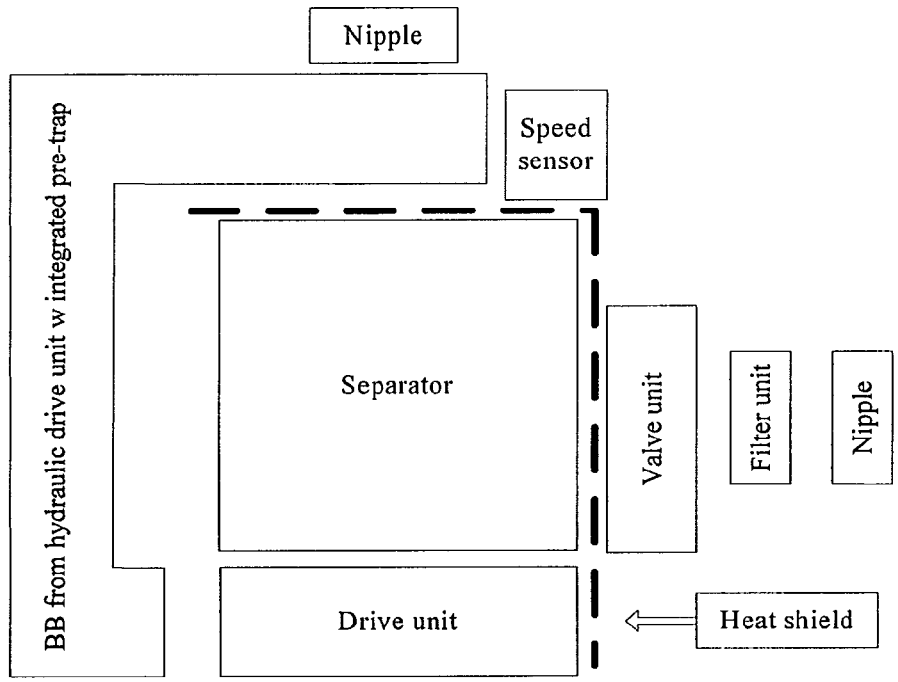
FIG. 36 is a schematic view showing the modular nature of the separator system shown in FIG. 13.
Figure 37:
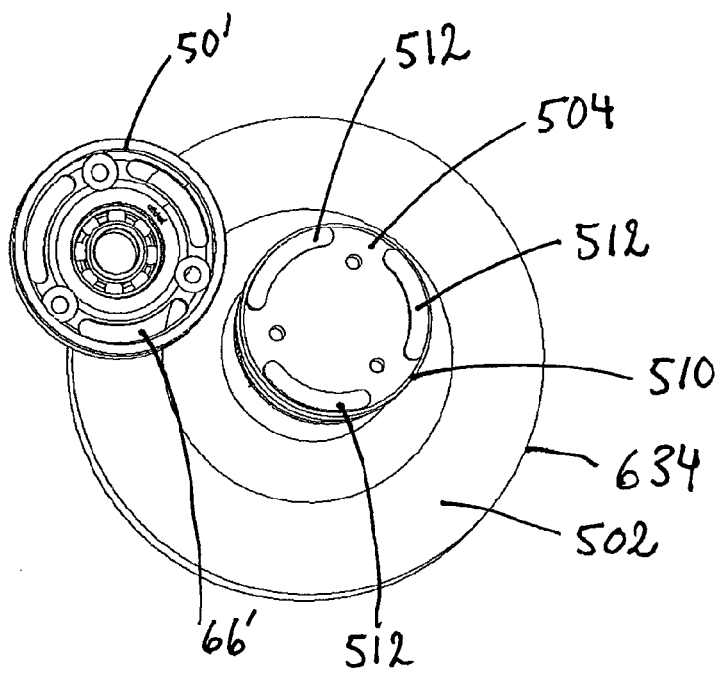
FIGS. 37 and 38 are views of a top bearing unit of the first embodiment being mounted to a spin welding jig.
Figure 38:
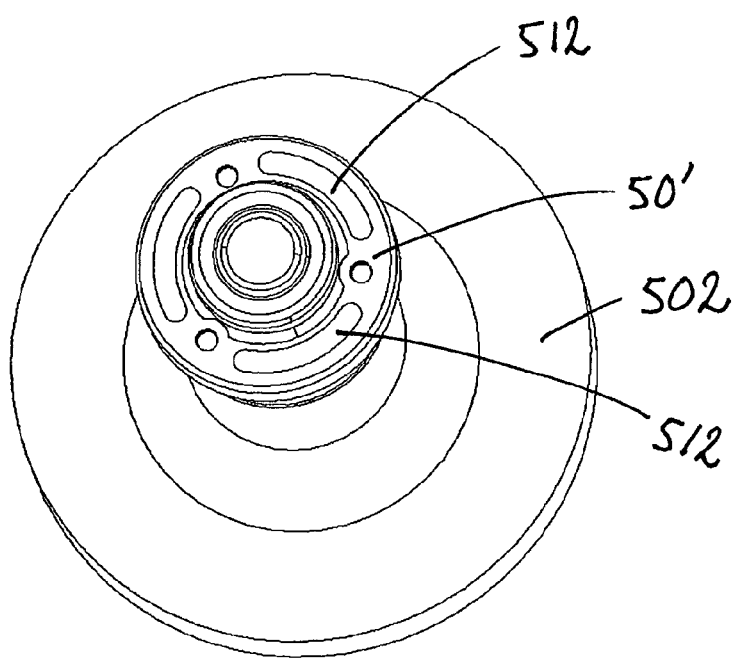

The versatility of the improved separator is enhanced as compared to the prior art separator 2 by virtue of certain modules/components thereof being interchangeable in different separator systems (see FIG. 36). The ability of the rotor housing 4' (i.e. one particular type of module) to receive different valve units 14' (i.e. different versions of another type of module) has already been discussed above. This modular approach is achieved by different versions of a given type of module/component (for example, a valve unit 14') having identical features for connecting/interfacing with other modules/components. By way of example, a separator system may be potentially use one of several different versions of valve unit, because these different versions are provided with common features which allow for mating with the rotor housing 4' even though the valve units may be different in many other respects. The table provided by FIG. 36 shows how different components/modules of a separator system may be optionally provided with a component/module or exchanged for a different version of a component/module.

The present invention is not limited to the specific embodiments described above. Alternative arrangements and suitable materials will be apparent to a reader skilled in the art.

What is claimed is:

1. A method of assembling a gas cleaning separator for separating a flowable mixture of substances of different densities; the separator comprising:
    a housing defining an inner space and having an aperture therein for providing fluid communication between said inner space and the exterior of said housing, and
    a fluid flow passage sealed about said aperture and in fluid communication therewith for conveying fluid through said passage and aperture between said inner space and the exterior of said housing, wherein the fluid flow passage is a nipple comprising an open end, distal to said abutting surface, for subsequent connection with a further fluid flow passage; and wherein
    the method of assembling said separator comprises the step of:
    bonding the material of the housing and fluid flow passage together along a closed loop formed by an intersection of abutting surfaces of the housing and fluid flow passage.

2. A method as claimed in claim 1, wherein said closed loop is of a circular shape.

3. A method as claimed in claim 1, wherein said bonding step comprises applying adhesive to at least one of said abutting surfaces.

4. A method as claimed in claim 1, wherein said bonding step comprises ultrasonic welding or vibration welding said abutting surfaces to one another.

5. A method as claimed in claim 1, wherein an internal surface of the nipple combines with a curved surface of a shoulder of the housing to define the fluid flow passage having a bend, and wherein the nipple combines with the curved surface of the shoulder to provide a smooth surface and a radius to an inner surface of the bend reducing fluid separation from the inner surface of the bend.

6. A method as claimed in claim 1, wherein said bonding step comprises spin welding said abutting surfaces to one another.

7. A method as claimed in claim 6, wherein the spin welding secures the nipple in any angular orientation relative to the housing and provides a closed loop seal.

8. A method as claimed in claim 1, wherein said bonding step comprises rotating the housing and fluid flow passage relative to one another whilst said surfaces thereof are in abutment with each other.

9. A method as claimed in claim 8, wherein said relative rotation of the housing and fluid flow passage is stopped with the housing and flow passage arranged in a required position relative to one another so as to allow said abutting surfaces to bond to one another.

10. A method as claimed in claim 9, wherein heat produced by friction forces acting between the abutting surfaces during the relative rotation causes surface melting, wherein when the relative rotation of the housing and fluid flow passage is stopped, the surfaces are allowed to solidify and bond to one another.

11. A gas cleaning separator for separating a flowable mixture of substances of different densities; the separator comprising:
    a housing defining an inner space and having an aperture therein for providing fluid communication between said inner space and the exterior of said housing, and
    a fluid flow passage sealed about said aperture and in fluid communication therewith for conveying fluid through said passage and aperture between said inner space and the exterior of said housing, wherein the fluid flow passage is a nipple comprising an open end, distal to said abutting surface, for subsequent connection with a further fluid flow passage; and wherein
    the material of the housing and fluid flow passage are bonded together along a closed loop formed by an intersection of abutting surfaces of the housing and fluid flow passage.

12. A separator as claimed in claim 11, wherein said closed loop is of a circular shape.

13. A separator as claimed in claim 11, wherein said bond is made by spin welding said abutting surfaces to one another.

14. A separator as claimed in claim 11, wherein said bond is made by applying adhesive to at least one of said abutting surfaces.

15. A separator as claimed in claim 11, wherein said bond is made by ultrasonic welding or vibration welding said abutting surfaces to one another.

16. A separator as claimed in claim 11, wherein said bond is made by rotating the housing and fluid flow passage relative to one another whilst said surfaces thereof are in abutment with each other.

17. A separator as claimed in claim 16, wherein said relative rotation of the housing and fluid flow passage is stopped with the housing and flow passage arranged in a required position relative to one another so as to allow said abutting surfaces to bond to one another.

18. A separator as claimed in claim 11, wherein an internal surface of the nipple combines with a curved surface of a shoulder of the housing to define the fluid flow passage having a bend.

19. A separator as claimed in claim 18, wherein the nipple combines with the curved surface of the shoulder to provide a smooth surface and a radius to an inner surface of the bend reducing fluid separation from the inner surface of the bend.

* * * * *